United States Patent
Ikuta

[19]

[11] Patent Number: 5,911,009
[45] Date of Patent: Jun. 8, 1999

[54] METHOD AND APPARATUS FOR BINARY CODING OF IMAGE DATA INCLUDING ADDING ERROR ACCUMULATED FOR A TARGET PIXEL AND A PIXEL IN THE VICINITY TO BE LATER CODED

[75] Inventor: Kunio Ikuta, Kyoto, Japan

[73] Assignee: Dainippon Screen Mfg. Co., Ltd., Japan

[21] Appl. No.: 08/787,587

[22] Filed: Jan. 22, 1997

[30] Foreign Application Priority Data

Jan. 25, 1996 [JP] Japan .................................. 8-032631
Jan. 31, 1996 [JP] Japan .................................. 8-038903
Jan. 31, 1996 [JP] Japan .................................. 8-038904
Mar. 25, 1996 [JP] Japan .................................. 8-096230

[51] Int. Cl.$^6$ .................................................. H04N 1/405
[52] U.S. Cl. ........................ 382/237; 382/252; 358/456
[58] Field of Search .................................. 382/237, 252, 382/270; 358/456, 457, 458, 466, 298; 395/109

[56] References Cited

U.S. PATENT DOCUMENTS 5,313,287  5/1994  Barton .

FOREIGN PATENT DOCUMENTS 0341984  11/1989  European Pat. Off. .
0531170   3/1993  European Pat. Off. .
0667704   2/1995  European Pat. Off. .
0696129   7/1995  European Pat. Off. .
7-114637   5/1995  Japan .
7288689  10/1995  Japan .
7-307866  11/1995  Japan .
91/09489   6/1991  WIPO .

OTHER PUBLICATIONS

"Output Image Characteristics by Modified Error Diffusion (MED) method", Bulletin of Image Electronics Society of Japan, vol. 20, No. 5, (1991), pp. 443–449.

Liu Yong–Kui: "2–Level Rendition of Continuous–Tone Pictures" Displays, vol. 12, No. 2, Apr. 1, 1991, pp. 84–85, XP000238519.

Floyd, Steinberg: "An Adaptive Algorithm for Spatial Greyscale" Proceedings of the SID, vol. 17, No. 2, Apr. 1976, pp. 75–77, XP000616372.

Eschback, Reiner, *Journal of Electronic Imaging*, "Reduction of Artifacts in Error Diffusion By Means of Input–Dependent Weights," vol. 2, No. 4, Oct. 1993, pp. 352–358.

Wong, P.W., IEEE, "Error Diffusion With Dynamically Adjusted Kernel," Proc. of Icassp, I: Image and Multidemensional Signal Processing, Adeliade, vol. 5, No. 19, Apr. 19, 1994, pp. V–113 — V–116.

*Primary Examiner*—Scott Rogers
*Attorney, Agent, or Firm*—Ostrolenk, Faber, Gerb & Soffen, LLP

[57] ABSTRACT

Error data $\Sigma e_P$ accumulated for a target pixel of binary coding or pixel of interest P is read from an error memory (20) and inputted into an adder (22). The adder (22) adds the error data to multi-valued image data regarding the pixel of interest P, so as to correct the multi-valued image data. A comparator (24) compares the corrected multi-valued image data outputted from the adder (22) with a predetermined reference value and outputs binary image data based on a result of the comparison. A bit converter (28) converts the one-bit binary image data to 8-bit data. A subtracter (26) subtracts the binary-coded image data from the image data prior to binary coding to obtain an error 'e'. An error distribution circuit (30) distributes the error 'e' into pixels A, C, D, and E, where the pixels A, C, and D are respectively located on the immediate right of, immediately below, and on the lower left of the pixel of interest P and the pixel E is located on the immediate left of the pixel D. The error memory (20) adds distributed portions of the error $e_A$, $e_C$, $e_D$, and $e_E$ to error data $\Sigma e_A$, $\Sigma e_C$, $\Sigma e_D$, and $\Sigma e_E$, so as to update the values of the error data $\Sigma e_A$, $\Sigma e_C$, $\Sigma e_D$, and $\Sigma e_E$. This method of distributing the error 'e' into the above peripheral pixels enables multi-valued image data for the pixel of interest P having a relatively low tone value or a relatively high tone value to be binary coded without damaging the quality of picture.

4 Claims, 48 Drawing Sheets

10%　　　　　　　　　DENSITY　　　　　　　　　0%

90%　　　　　　　　　DENSITY　　　　　　　　　100%

10%   DENSITY   0%

90%　　　　　　　　DENSITY　　　　　　　　100%

10%     DENSITY     0%

90%     DENSITY     100%

15%    DENSITY    0%

85%    DENSITY    100%

15%  85%
DENSITY

Fig. 36(a)
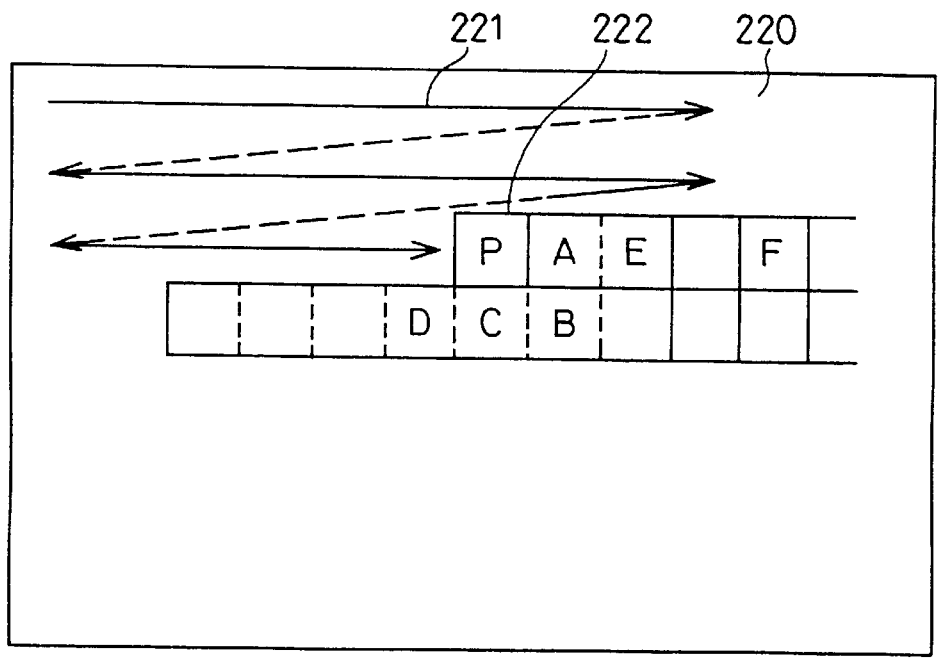
Fig. 36(b)
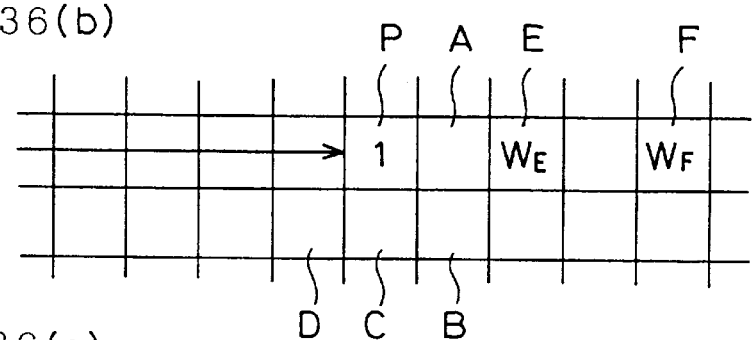
Fig. 36(c)
| VALUES OF MULTI-VALUED IMAGE DATA FOR PIXEL OF INTEREST P | RATIO OF ADDITION $W_E$ FOR PIXEL E | RATIO OF ADDITION $W_F$ FOR PIXEL F |
|---|---|---|
| 0~10 | 1/8 | 1/16 |
| 11~18 | 1/8 | 1/32 |
| 19~26 | 1/8 | 0 |
| 27~228 | 0 | 0 |
| 229~236 | 1/8 | 0 |
| 237~244 | 1/8 | 1/32 |
| 245~255 | 1/8 | 1/16 |

15%   DENSITY   0%

85%   DENSITY   100%

0%  10%                    DENSITY                    90% 100%

0%  10%                    DENSITY                    90% 100%

0% 10%    DENSITY    90% 100%

10%  DENSITY  0%

90%  DENSITY  100%

15%　　　　　　　DENSITY　　　　　　　0%

85%　　　　　　　DENSITY　　　　　　　100%

METHOD AND APPARATUS FOR BINARY CODING OF IMAGE DATA INCLUDING ADDING ERROR ACCUMULATED FOR A TARGET PIXEL AND A PIXEL IN THE VICINITY TO BE LATER CODED

BACKGROUND OF THE INVENTION

1. Field of the Invention

The present invention relates to a method of binary coding multi-valued image data and also to an apparatus for the same.

2. Description of the Related Art

An error diffusion method has widely been used for binary coding multi-valued image data, in order to record multi-tone images in a simulating manner with a binary recording device, such as an ink jet printer.

FIG. 57 is a block diagram illustrating a conventional image data binary device for which the error diffusion method is applied. Referring to FIG. 57, the image data binary device includes an error memory 120, an adder 122, a comparator 124, a subtracter 126, a bit converter 128, and an error distribution circuit 130.

Multi-valued image data has a dynamic range of 0 to 255. In the drawing of FIG. 57, the thick lines represent multi-bit data lines including symbol bit, integral bits, and decimal bits.

The error diffusion method distributes an error, which arises as a difference between image data for a specific pixel before and after binary coding, into pixels in the vicinity of the specific pixel at a predetermined ratio. FIGS. 58(a) and 58(b) show the principle of the error diffusion method. In the drawing of FIG. 58(a), the procedure of binary coding pixels 232 included in an image 230 is carried out in an order specified by an arrow 231.

In order to binary code multi-valued image data regarding a target pixel P of binary coding (hereinafter referred to as pixel of interest), the multi-valued image data is first corrected by adding error data accumulated for the pixel of interest P to the multi-valued image data. When X denotes a value of multi-valued image data regarding the pixel of interest P and $\Sigma e_P$ represents error data accumulated for the pixel of interest P, a value X' of corrected multi-valued image data is given as:

$$X' = X + \Sigma e_P \quad (1)$$

The error data accumulated for the pixel of interest P represents the total of errors distributed to the pixel of interest P from the peripheral pixels that have already undergone the binary coding as discussed later.

The value X' of corrected multi-valued image data is then compared with a predetermined threshold value (for example, 128), so that the multi-valued image data regarding the pixel of interest P is binary coded. When Y (0 or 255) represents a value of binary-coded image data, an error 'e' arising by binary coding the multi-valued image data for the pixel of interest P is expressed as:

$$e = X' - Y \quad (2)$$

The value of the error 'e' is subsequently distributed at a predetermined ratio (ratio of error distribution) into pixels that are located in the vicinity of the pixel of interest P and have not yet undergone the binary coding. As an example of the conventional error diffusion method, the value of the error 'e' is distributed into four pixels in the vicinity of the pixel of interest P; that is, pixels A, B, C, and D located on the immediate right of, on the lower right of, immediately below, and on the lower left of the pixel of interest P as shown in FIG. 58(b). The ratio of error distribution applied is 7/16 to the pixel A, 1/16 to the pixel B, 5/16 to the pixel C, and 3/16 to the pixel D as shown below:

Pixel A: $e_A = e \times 7/16$

Pixel B: $e_B = e \times 1/16$

Pixel C: $e_C = e \times 5/16$

Pixel D: $e_D = e \times 3/16 \quad (3)$

The error distributed into the pixels prior to the binary coding is accumulated as the error data for each pixel in the error memory 120.

The following describes the structure of the image data binary device shown in FIG. 57. The adder 122 receives multi-valued image data regarding the pixel of interest P. The error data $\Sigma e_P$ accumulated for the pixel of interest P is read from the error memory 120 and inputted into the adder 122. The adder 122 adds the error data to the input multi-valued image data to correct the multi-valued image data.

The comparator 124 receives the corrected multi-valued image data from the adder 122, compares the corrected multi-valued image data with a separately input reference value, and outputs one-bit data or binary image data based on the results of comparison. This process binary codes the corrected multi-valued image data sent from the adder 122. The bit converter 128 converts the one-bit binary image data outputted from the comparator 124 to 8-bit binary image data (0 or 255).

The subtracter 126 receives the corrected multi-valued image data (image data before the binary coding) outputted from the adder 122 and the image data (image data after the binary coding) outputted from the bit converter 128, subtracts the image data after the binary coding from the image data before the binary coding, and calculates the error 'e' arising in the process of binary coding the multi-valued image data for the pixel of interest P.

The error distribution circuit 130 distributes the error 'e' obtained by the subtracter 126 into the pixels A, B, C, and D, which are located in the vicinity of the pixel of interest P and have not yet undergone the binary coding, at a predetermined distribution ratio as discussed above with the drawing of FIG. 58. In accordance with a concrete procedure, the error distribution circuit 130 multiplies the error 'e' by predetermined coefficients corresponding to the pixels A, B, C, and D, for example, those shown in Equations (3) given above, and adds the results of operations $e_A$, $e_B$, $e_C$, and $e_D$ to error data $\Sigma e_A$, $\Sigma e_B$, $\Sigma e_C$, and $\Sigma e_D$ for the pixels A, B, C, and D accumulated in the error memory 120, so as to update the values of the respective error data $\Sigma e_A$, $\Sigma e_B$, $\Sigma e_C$, and $\Sigma e_D$.

The image data binary device shown in FIG. 57 utilizes the error diffusion method to binary code the multi-valued image data. This allows the image to be expressed in quasi multi-tones even when the multi-valued image data has been binary coded.

In the conventional image data binary device, when the input multi-valued image data has a relatively low tone value, the pixels having the value '1' as the binary-coded image data are arranged as dotted lines in the image. When the input multi-valued image data has a relatively high tone value, on the other hand, the pixels having the value '0' as the binary-coded image data are arranged as dotted lines in the image. These dotted lines significantly deteriorate the quality of picture.

When the image data binary device shown in FIG. 57 is applied, for example, to a printer, the tone value of the multi-valued image data corresponds to the density in the resulting recorder image. This means that the input of the multi-valued image data having a relatively low tone value gives a printed image of a relatively low density, whereas the input of the multi-valued image data having a relatively high tone value gives a printed image of a relatively high density.

FIGS. 59, 60, 61, and 62 show the printing results with a printer when the image data binary device of FIG. 57 is applied. FIG. 59 shows the printing result for a low-density area of 0% to 10%; FIG. 60 shows the printing result for a high-density area of 90% to 100%; FIG. 61 shows the printing result for a low-density area of 0% to 15%; and FIG. 62 shows the printing result for a high-density area of 85% to 100%. In these drawings, the density continuously varies in the respective ranges along the width of the image.

The binary coding process in these examples is carried out in the manner shown in FIG. 58(a); that is, starting from the upper left corner of the image and scanning from the left to the right one line by one line. This is also applied to the binary coding process in the examples below.

FIG. 63 shows the printing result specifically selected for the density of 3% among the low-density area of FIG. 59; FIG. 64 shows the printing result specifically selected for the density of 97% among the high-density area of FIG. 60; FIG. 65 shows the printing result specifically selected for the density of 1% among the low-density area of FIG. 59; and FIG. 66 shows the printing result specifically selected for the density of 99% among the high-density area of FIG. 60. In these drawings, the whole image has a homogeneous density.

As shown in FIGS. 59, 61, 63, and 65, black dots (that is, the pixels having the value '1') are partially arranged as dotted lines running from the upper right to the lower left in the relatively low-density area of 0% to 5%. In a similar manner, as shown in FIGS. 60, 62, 64, and 66, white dots (that is, the pixels having the value '0') are partially arranged as dotted lines running from the upper right to the lower left in the relatively high-density area of 95% to 100%. In either cases, the black dots or the white dots are not homogeneously dispersed and such dotted lines remarkably deteriorate the quality of picture.

FIG. 67 shows the printing result with a printer for the whole density range of 0% to 100% when the image data binary device of FIG. 57 is applied. In the drawing of FIG. 67, the density continuously varies from the left to the right in the range of 0% to 100% along the width of the image. FIG. 68 shows the printing result with a printer for an intermediate-density range of 15% to 85% when the image data binary device of FIG. 57 is applied. In the drawing of FIG. 68, the density continuously varies in the above range along the width of the image.

In the conventional image data binary device discussed above, when the input image data has an intermediate tone value, textures are often observed in the intermediate-density area of 15% to 85% in the image obtained as the binary-coded image data as shown in FIGS. 67 and 68, thereby deteriorating the quality of picture. The textures herein denote patterns having some regularity and included in a planar distribution of depth.

As disclosed in the paper 'Output Image Characteristics by Modified Error Diffusion (MED) method', pp443–449, Bulletin of Image Electronics Society of Japan, Vol. 20, No. 5 (1991), the proposed method to prevent textures in the intermediate-density area adds dither data to the input image data prior to binary coding and varies the ratio of error distribution for distributing the value of the error 'e' at random according to random numbers.

The known technique disclosed in the above paper depresses the occurrence of textures irrespective of the tone value of the input image data prior to binary coding. The processing is thus carried out even for the image data having a relatively low tone value or a relatively high tone value, wherein no significant textures are originally generated. This significantly deteriorates the quality of picture in the low-density area and in the high-density area.

Another proposed method removes the textures observed in the intermediate-density area by adding a random number to a reference value used in the binary-coding means. This method, however, can not remove the textures observed in the low-density area or the high-density area.

The textures observed in the low-density area or the high-density area can be improved by distributing the error, which arises in the process of binary coding the multi-valued image data for the pixel of interest, into a larger number of pixels which have not yet undergone the binary coding. This method, however, undesirably increases the scale of the hardware and lengthens the required processing time for binary coding.

SUMMARY OF THE INVENTION

The object of the present invention is thus to provide an improved method of binary coding multi-valued image data without damaging the quality of picture as well as an improved apparatus for the same.

At least part of the above and the other related objects is realized by a first method of binary coding multi-valued image data for each pixel. The first method includes the steps of: (a) adding error data accumulated for a target pixel of binary coding to multi-valued image data for the target pixel to correct the multi-valued image data; (b) comparing the corrected multi-valued image data with a predetermined reference value and binary coding the corrected multi-valued image data based on a result of the comparison; (c) obtaining an error that is difference between the corrected multi-valued image data and the binary-coded image data for the target pixel; (d) distributing the error obtained for the target pixel at a predetermined ratio into a first pixel that is located one pixel after the target pixel in order of binary coding, a second pixel that is located one line after the target pixel, a third pixel that is located one pixel before the second pixel, and a fourth pixel that is located one pixel before the third pixel; (e) accumulating the distributed errors as error data for each pixel; and (f) repeating the steps (a) through (e) while updating the target pixel.

While one destination of the distribution of the error is a pixel that is located one pixel after the second pixel in order of binary coding in the conventional structure, the destination is a pixel that is located one pixel before the third pixel in the present invention. This structure enables image data having a relatively low tone value or a relatively high tone value to be binary coded without deteriorating the quality of picture. Even when the input image data has a relatively low tone value or a relatively high tone value, the binary-coded pixels having the value '1' or those having the value '0' are not arranged continuously but are dispersed in a substantially homogeneous manner in the resulting image.

In accordance with one preferable application of the present invention, a second method of binary coding multi-valued image data for each pixel includes the steps of: (a) providing a plurality of error distribution windows, each the error distribution window specifying positions of objective pixels relative to a target pixel of binary coding as well as a distribution ratio to the objective pixels, the objective pixels being to be processed by binary coding after the target pixel; (b) adding error data accumulated for the target pixel to multi-valued image data for the target pixel to correct the multi-valued image data; (c) comparing the corrected multi-valued image data with a predetermined reference value and binary coding the corrected multi-valued image data based on a result of the comparison; (d) obtaining the error that is difference between the corrected multi-valued image data and the binary-coded image data for the target pixel; (e) selecting one of the plurality of error distribution windows, based on the multi-valued image data and the binary-coded image data for the target pixel; (f) distributing the error obtained for the target pixel into the objective pixels according to the positions and the distribution ratio specified by the selected error distribution window; (g) accumulating the distributed errors as error data for each pixel; and (h) repeating the steps (b) through (g) while updating the target pixel.

The error is distributed according to the error distribution window appropriately selected corresponding to the multi-valued image data and the binary-coded image data for the target pixel. This remarkably improves the quality of the image expressed by the binary-coded image data.

In accordance with another preferable application of the present invention, a third method of binary coding multi-valued image data for each pixel includes the steps of: (a) adding first error data accumulated for a target pixel of binary coding and at least part of second error data accumulated for a specific pixel which is located in the vicinity of the target pixel and which is to be processed by binary coding after the target pixel, so as to correct the multi-valued image data; (b) comparing the corrected multi-valued image data with a predetermined reference value and binary coding the corrected multi-valued image data based on a result of the comparison; (c) obtaining an error that is difference between the corrected multi-valued image data and the binary-coded image data for the target pixel; (d) distributing the error obtained for the target pixel into pixels which are to be processed by binary coding after the target pixel; (e) accumulating the distributed errors as error data for each pixel; and (f) repeating the steps (a) through (e) while updating the target pixel.

In the third method of the present invention, the multi-valued image data for the target pixel is corrected by adding not only the error data accumulated for the target pixel but the error data accumulated for a specific pixel which is located in the vicinity of the target pixel and which is to be processed by binary coding after the target pixel. This remarkably improves the quality of the image expressed by the binary-coded image data.

In accordance with still another preferable application of the present invention, a fourth method of binary coding multi-valued image data includes the steps of: (a) generating a random number; (b) converting the random number according to a value of the multi-valued image data; and (c) binary coding the multi-valued image data based on at least the multi-valued image data and the converted random number, wherein the step (b) comprises the step of converting the random number so that the converted random number has a narrower range as the value of the multi-valued image data becomes closer to a minimum value or a maximum value, and that the converted random number has a wider range as the value of the multi-valued image data becomes closer to an intermediate value.

In the fourth method of the present invention, the multi-valued image data is binary coded, based on the random number which has been converted according to the value of the multi-valued image data. This effectively destroys the regularity. Even when the input image data has an intermediate tone value, this structure prevents textures from occurring in the image obtained as the binary-coded image data.

The random number is converted in such a manner that allows the converted random number to have a narrower dynamic range when the multi-valued image data becomes closer to a minimum value or a maximum value and to have a wider dynamic range when the multi-valued image data becomes closer to an intermediate value. Namely the effect of depressing the occurrence of textures is little on the multi-valued image data having a relatively low tone value or a relatively high tone value wherein no significant textures are originally observed. Even when the input multi-valued image data has a relatively low tone value, this structure preferably maintains the quality of picture.

At least part of the above and the other related objects is also realized by a first apparatus for binary coding multi-valued image data for each pixel. The first apparatus includes: correction means for adding error data accumulated for a target pixel of binary coding to multi-valued image data for said target pixel to correct the multi-valued image data; binary coding means for comparing the corrected multi-valued image data with a predetermined reference value and binary coding the corrected multi-valued image data based on a result of the comparison; error calculation means for obtaining an error that is difference between the corrected multi-valued image data and the binary-coded image data for said target pixel; error distribution means for distributing the error obtained for said target pixel at a predetermined ratio into a first pixel that is located one pixel after said target pixel in order of binary coding, a second pixel that is located one line after said target pixel, a third pixel that is located one pixel before said second pixel, and a fourth pixel that is located one pixel before said third pixel; and error accumulation means for accumulating the distributed errors as error data for each pixel.

Like the first method, the structure of the first apparatus enables image data having a relatively low tone value or a relatively high tone value to be binary coded without deteriorating the quality of picture.

The present invention is also directed to a second apparatus for binary coding multi-valued image data for each pixel, which includes: correction means for adding error data accumulated for a target pixel of binary coding to multi-valued image data for said target pixel to correct the multi-valued image data; binary coding means for comparing the corrected multi-valued image data with a predetermined reference value and binary coding the corrected multi-valued image data based on a result of the comparison; error calculation means for obtaining an error that is difference between the corrected multi-valued image data and the binary-coded image data for said target pixel; error distribution window selecting means having a plurality of error distribution windows, each said error distribution window specifying positions of objective pixels relative to said target pixel as well as a distribution ratio to said objective pixels, said objective pixels being to be processed by binary coding after said target pixel, said error distribution window selecting means selecting one of said plurality of error distribution windows, based on the multi-valued image data and the binary-coded image data for said target pixel; error distribution means for distributing the error obtained for said target pixel into said objective pixels according to the positions and the distribution ratio specified by the selected error distribution window; and error accumulation means for accumulating the distributed errors as error data for each pixel.

The error is distributed according to the error distribution window appropriately selected corresponding to the multi-valued image data and the binary-coded image data for the target pixel. This remarkably improves the quality of the image expressed by the binary-coded image data.

In accordance with another preferable application of the present invention, a third apparatus for binary coding multi-valued image data for each pixel includes: correction means for adding first error data accumulated for a target pixel of binary coding and at least part of second error data accumulated for a specific pixel which is located in the vicinity of said target pixel and which is to be processed by binary coding after said target pixel, so as to correct the multi-valued image data; updating means for updating said first error data and said second error data according to a specified rule; binary coding means for comparing the corrected multi-valued image data with a predetermined reference value and binary coding the corrected multi-valued image data based on a result of the comparison; error calculation means for obtaining an error that is difference between the corrected multi-valued image data and the binary-coded image data for said target pixel; error distribution means for distributing the error obtained for said target pixel into pixels which are to be processed by binary coding after said target pixel; and error accumulation means for accumulating the distributed errors as error data for each pixel.

In the third apparatus of the present invention, the multi-valued image data for the target pixel is corrected by adding not only the error data accumulated for the target pixel but the error data accumulated for a specific pixel which is located in the vicinity of said target pixel and which is to be processed by binary coding after said target pixel. This remarkably improves the quality of the image expressed by the binary-coded image data.

The present invention is further directed to a fourth apparatus for binary coding multi-valued image data, which includes: random number generating means for generating a random number; random number converting means for converting said random number according to a value of the multi-valued image data; and binary coding means for binary coding the multi-valued image data based on at least the multi-valued image data and said converted random number, wherein said random number converting means comprises means for converting said random number so that said converted random number has a narrower range as the value of the multi-valued image data becomes closer to a minimum value or a maximum value, and that said converted random number has a wider range as the value of the multi-valued image data becomes closer to an intermediate value.

In the fourth apparatus of the present invention, the binary coding means binary codes the multi-valued image data based on the random number which has been converted by the random number converting means. This effectively destroys the regularity. Even when the input image data has an intermediate tone value, this structure prevents textures from occurring in the image obtained as the binary-coded image data.

The random number converting means converts the random number in such a manner that allows the converted random number to have a narrower dynamic range when the multi-valued image data becomes closer to a minimum value or a maximum value and to have a wider dynamic range when the multi-valued image data becomes closer to an intermediate value. Namely the effect of depressing the occurrence of textures is little on the multi-valued image data having a relatively low tone value or a relatively high tone value wherein no significant textures are originally observed. Even when the input multi-valued image data has a relatively low tone value, this structure preferably maintains the quality of picture.

These and other objects, features, aspects, and advantages of the present invention will become more apparent from the following detailed description of the preferred embodiments with the accompanying drawings.

BRIEF DESCRIPTION OF THE DRAWINGS

FIGS. 36(a) through 36(c) show an error diffusion process applied for the fourth embodiment;

DESCRIPTION OF THE PREFERRED EMBODIMENTS

Figure 1:
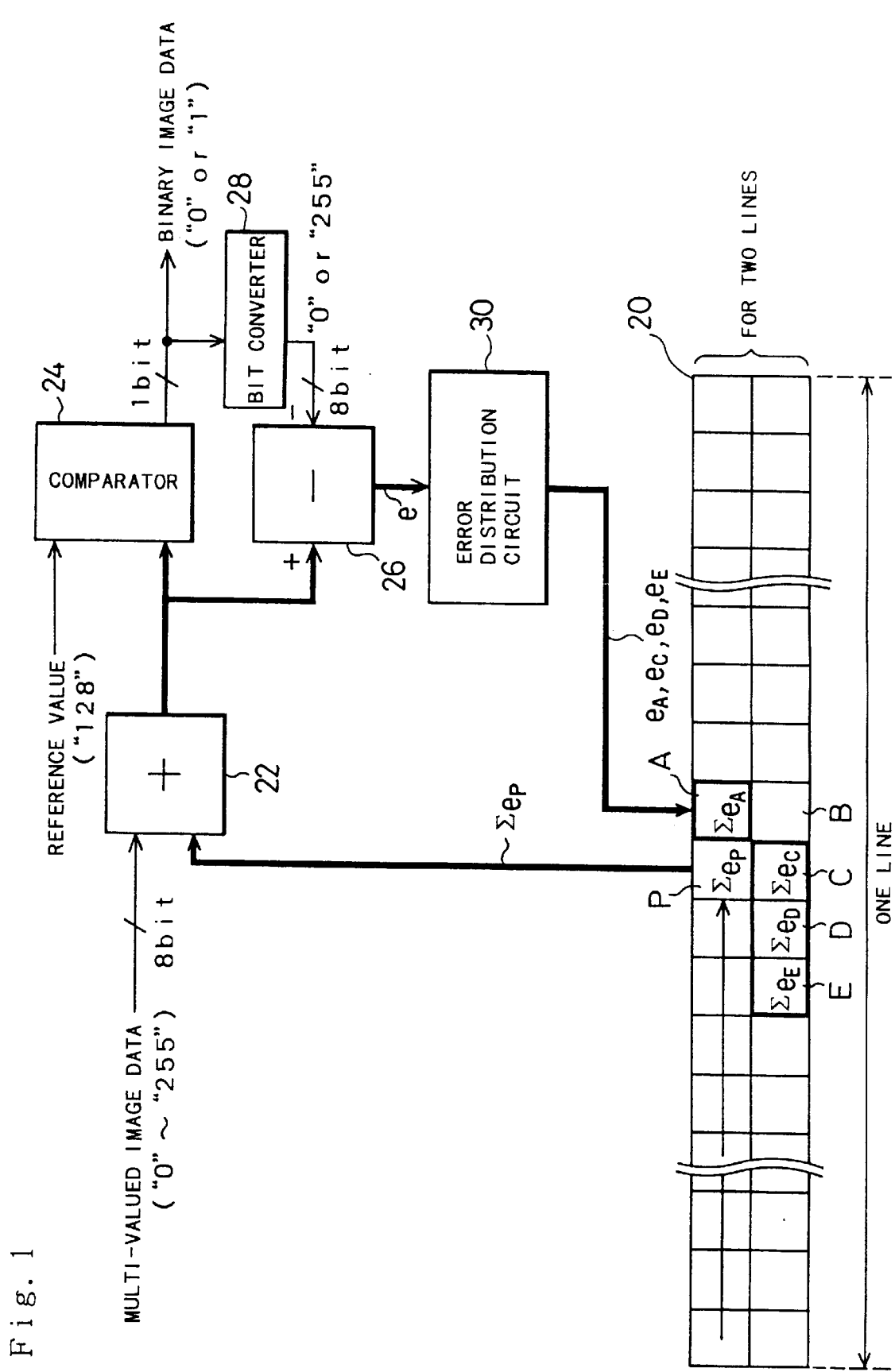
FIG. 1 is a block diagram illustrating an image data binary device as a first embodiment according to the present invention.

Modes of carrying out the present invention are described as preferred embodiments. FIG. 1 is a block diagram illustrating an image data binary device as a first embodiment according to the present invention. Referring to FIG. 1, the image data binary device of the first embodiment includes an error memory 20, an adder 22, a comparator 24, a subtracter 26, a bit converter 28, and an error distribution circuit 30.

Figure 2:
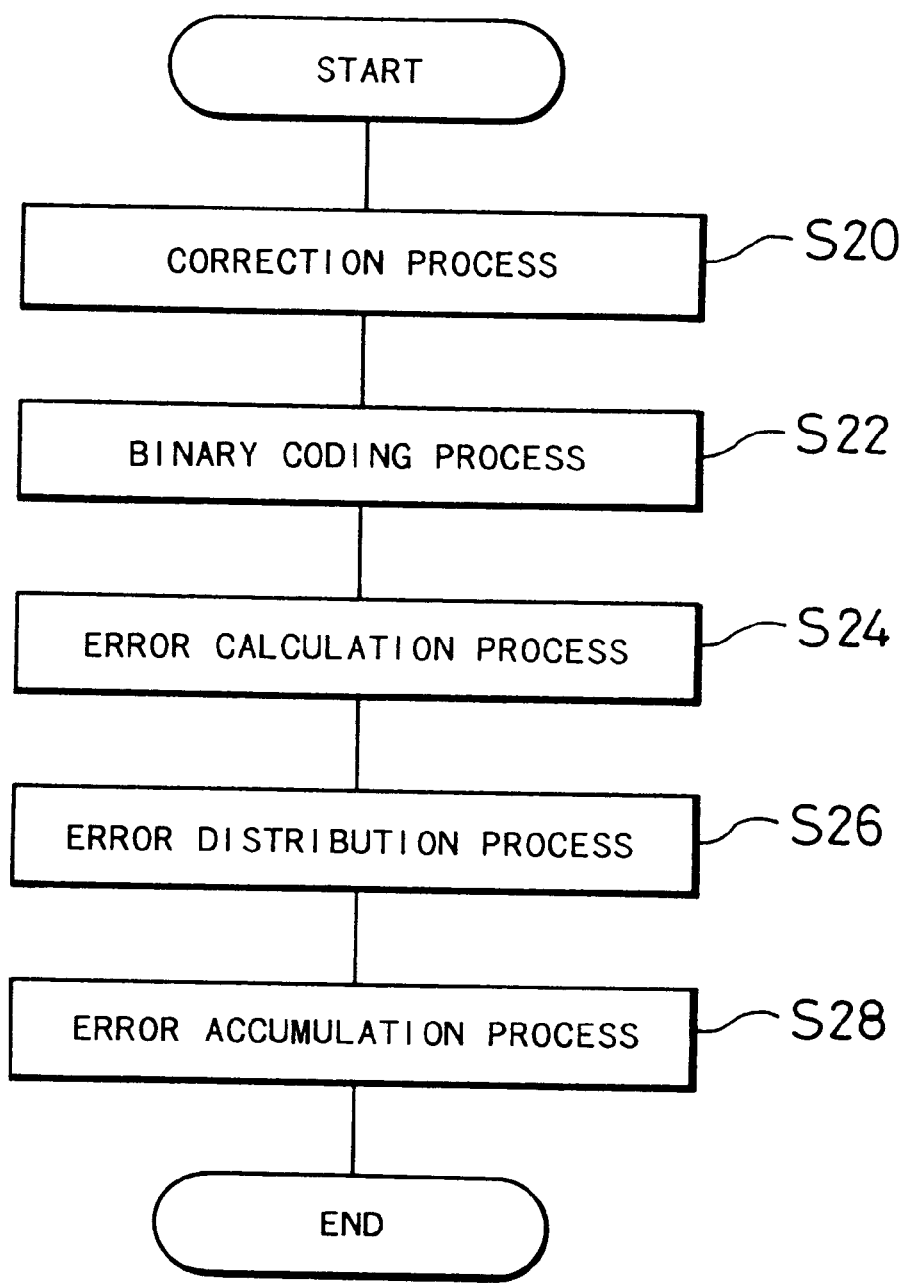
FIG. 2 is a flowchart showing an image data binary coding routine executed by the image data binary device of FIG. 1.

FIG. 2 is a flowchart showing an image data binary coding routine executed by the image data binary device of FIG. 1.

Prior to the description of the image data binary device shown in FIG. 1, the primary difference between the structure of this embodiment and the conventional structure is discussed briefly. In the conventional image data binary device shown in FIG. 57, the value of the error 'e' between the image data before and after the binary coding is distributed into the four pixels in the vicinity of the pixel of interest P; that is, the pixels A, B, C, and D located on the immediate right of, on the lower right of, immediately below, and on the lower left of the pixel of interest P as shown in FIG. 58. In the image data binary device of the first embodiment, on the other hand, the value of the error 'e' is distributed into four pixels; that is, pixels A, C, and D located on the immediate right of, immediately below, and on the lower left of the pixel of interest P as well as a pixel E located on the immediate left of the pixel D as shown in FIG. 3.

Figure 3:
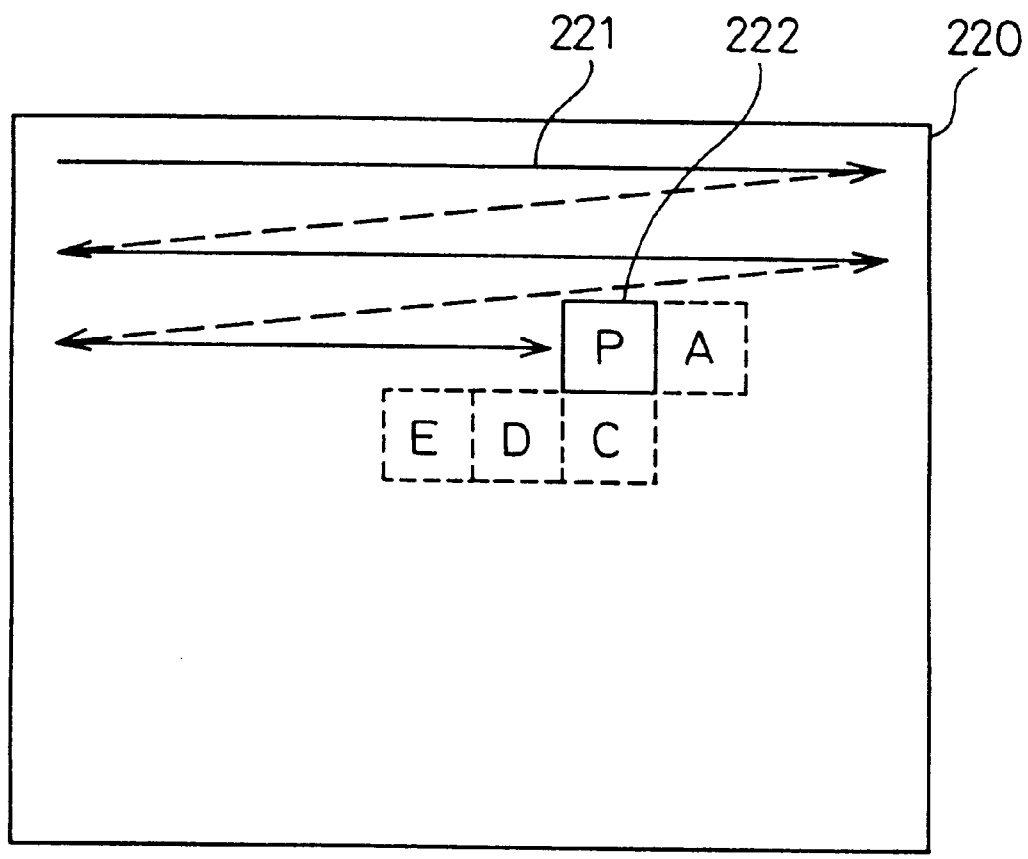
FIG. 3 shows an error diffusion process applied for the first embodiment.

FIG. 3 shows an error diffusion process applied for the first embodiment. In the drawing of FIG. 3, the procedure of binary coding pixels 222 included in an image 220 is carried out in an order specified by an arrow 221.

The structure of this embodiment selects the following pixels for the distribution of the value of the error 'e': that is, the pixel A that is located one pixel after the target pixel of binary coding or the pixel of interest P in order of binary coding, the pixel C that is located one line after the pixel of interest P, the pixel D that is located one pixel before the pixel C, and the pixel E that is located one pixel before the pixel D. Namely the process of the embodiment selects the pixel E for the distribution of the value of the error 'e', in place of the pixel B in the conventional process.

The ratio of error distribution applied in this embodiment is 7/16 to the pixel A, 5/16 to the pixel C, 3/16 to the pixel D, and 1/16 to the pixel E as shown below:

Pixel $A: e_A = e \times 7/16$

Pixel $C: e_C = e \times 5/16$

Pixel $D: e_D = e \times 3/16$

Pixel $E: e_E = e \times 1/16$     (4)

The following describes the processes carried out in the image data binary device shown in FIG. 1, based on the drawings.

Referring to FIG. 1, error data for each pixel is accumulated in the error memory 20. Although the error memory 20 has the storage capacity corresponding to only two lines of an image, the two-line storage area is utilized in a circular manner, so that the error data for each pixel included in one image can be accumulated sequentially.

In case that P is the pixel of interest in the embodiment of FIG. 1, the adder 22 receives multi-valued image data regarding the pixel P. The multi-valued image data is, for example, 8-bit data and may take any value of 0 to 255 as the tone value.

The error data $\Sigma e_P$ distributed from the binary-coded peripheral pixels and accumulated for the pixel of interest P is read from the error memory 20 and inputted into the adder 22. After the error data $\Sigma e_P$ is readout, the value of the error data $\Sigma e_P$ accumulated in the error memory 20 is initialized to zero.

When the program enters the image data binary coding routine of FIG. 2, a correction process is first carried out at step S20. Namely the adder 22 adds the error data to the input multi-valued image data regarding the pixel of interest P, so as to correct the multi-valued image data for the pixel of interest P.

In a binary coding process executed at step S22, the comparator 24 receives the corrected multi-valued image data from the adder 22, compares the corrected multi-valued image data with a separately input reference value, and outputs one-bit data or binary image data based on the results of comparison. The value '128' that is an intermediate value between the value '0' and the value '255' is used as the reference value. The comparator 24 outputs the value '1' when the value of the corrected multi-valued image data outputted from the adder 22 is equal to or greater than the reference value '128'. The comparator 24 outputs the value '0', on the other hand, when the value of the corrected multi-valued image data is smaller than the reference value '128'. This process binary codes the corrected multi-valued image data outputted from the adder 22.

The bit converter 28 converts the one-bit binary image data outputted from the comparator 24 to 8-bit binary image data. When the value of the image data outputted from the comparator 24 is equal to '0', the bit converter 28 outputs data of the value '0' as the 8-bit image data. When the value of the image data outputted from the comparator 24 is equal to '1', on the contrary, the bit converter 28 outputs data of the value '255' as the 8-bit image data. The bit converter 28 can be realized easily, for example, by distributing a one-bit image data line obtained from the output of the comparator 24 into eight lines and connecting them to the input of the subtracter 26 as 8-bit image data lines.

In an error calculation process executed at step S24, the subtracter 26 receives the corrected multi-valued image data (image data before the binary coding) outputted from the adder 22 and the image data (image data after the binary coding) outputted from the bit converter 28, subtracts the image data after the binary coding from the image data before the binary coding, and calculates the error 'e' arising in the process of binary coding the multi-valued image data for the pixel of interest P.

In an error distribution process executed at subsequent step S26, the error distribution circuit 30 distributes the error 'e' obtained by the subtracter 26 into the pixels A, C, D, and E, which are located in the vicinity of the pixel of interest P and have not yet undergone the binary coding, as discussed above with the drawing of FIG. 3. An error accumulation process executed at step S28 then accumulates the distributed errors into the error memory 20 as error data for each pixel. In accordance with a concrete procedure, the error distribution circuit 30 multiplies the error 'e' by predetermined coefficients corresponding to the pixels A, C, D, and E, for example, those shown in Equations (4) given above, and adds the results of operations $e_A$, $e_C$, $e_D$, and $e_E$ to error data $\Sigma e_A$, $\Sigma e_C$, $\Sigma e_D$, and $\Sigma e_E$ for the pixels A, C, D, and E accumulated in the error memory 20, so as to update the values of the respective error data $\Sigma e_A$, $\Sigma e_C$, $e_D$, and $\Sigma e_E$.

After the series of processes are concluded for the pixel of interest P, the target of the binary coding shifts from the pixel P to the next pixel A and the same processes are repeated for the next pixel of interest A.

Figure 4:
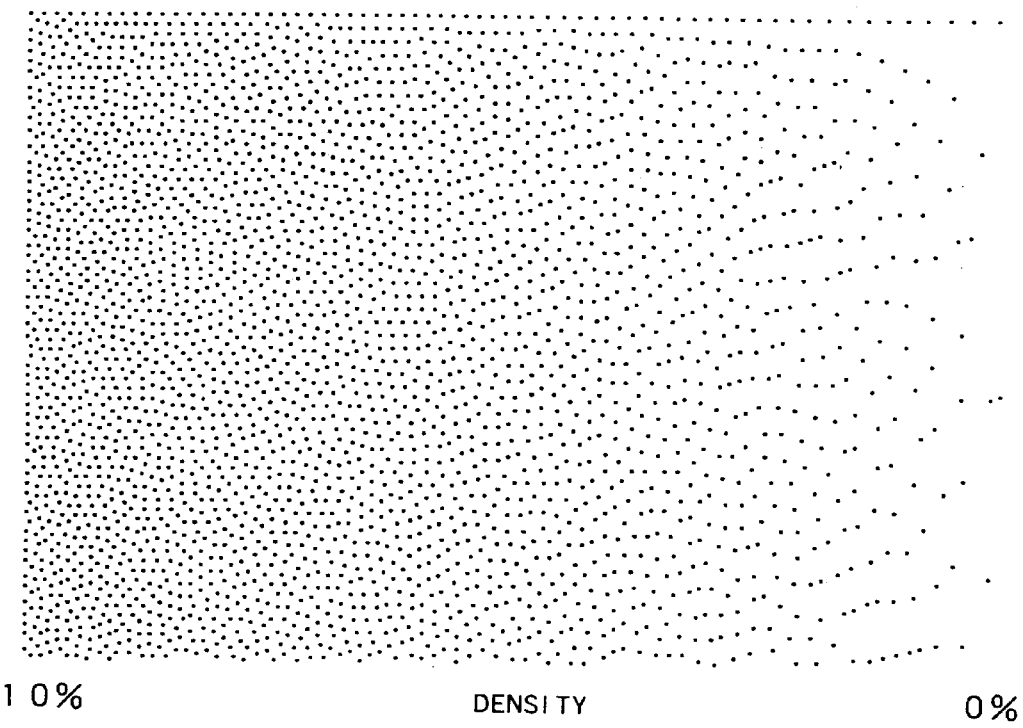
FIG. 4 shows the printing result with a printer for a low-density area of 0% to 10% when the image data binary device of FIG. 1 is applied.
Figure 5:
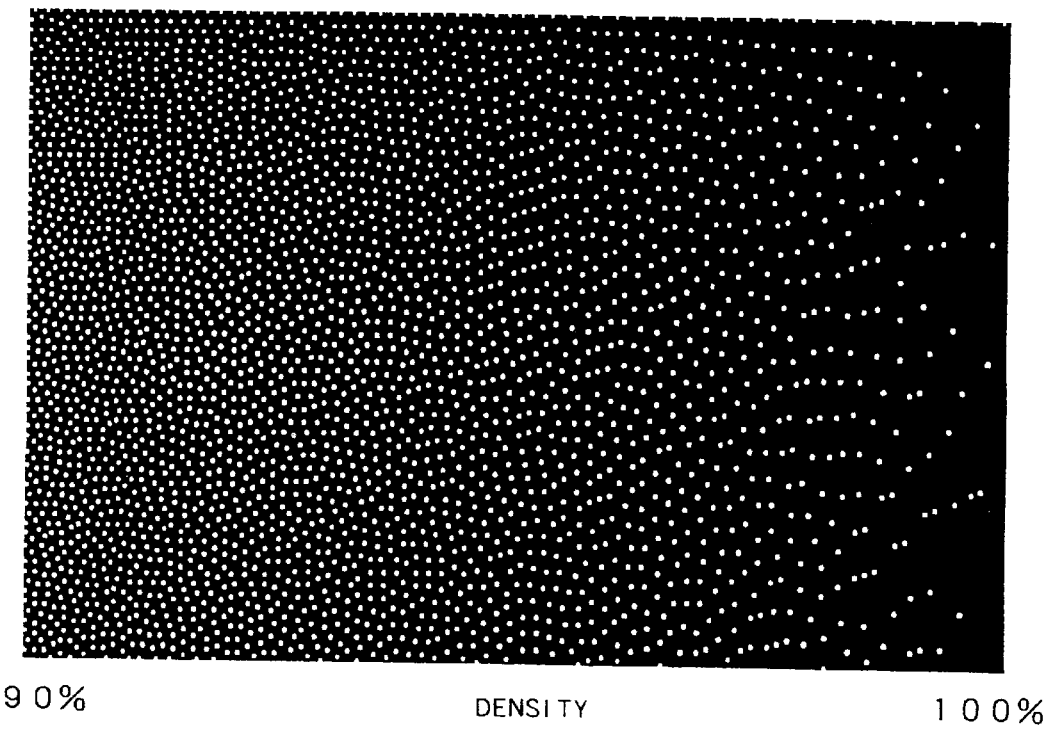
FIG. 5 shows the printing result with a printer for a high-density area of 90% to 100% when the image data binary device of FIG. 1 is applied.

FIGS. 4 and 5 respectively show the results of printing with a printer when the image data binary device of FIG. 1 is applied. FIG. 4 shows the printing result for a low-density area of 0% to 10%, whereas FIG. 5 shows the printing result for a high-density area of 90% to 100%. In these drawings, the density continuously varies in the respective ranges along the width of the image.

Figure 6:
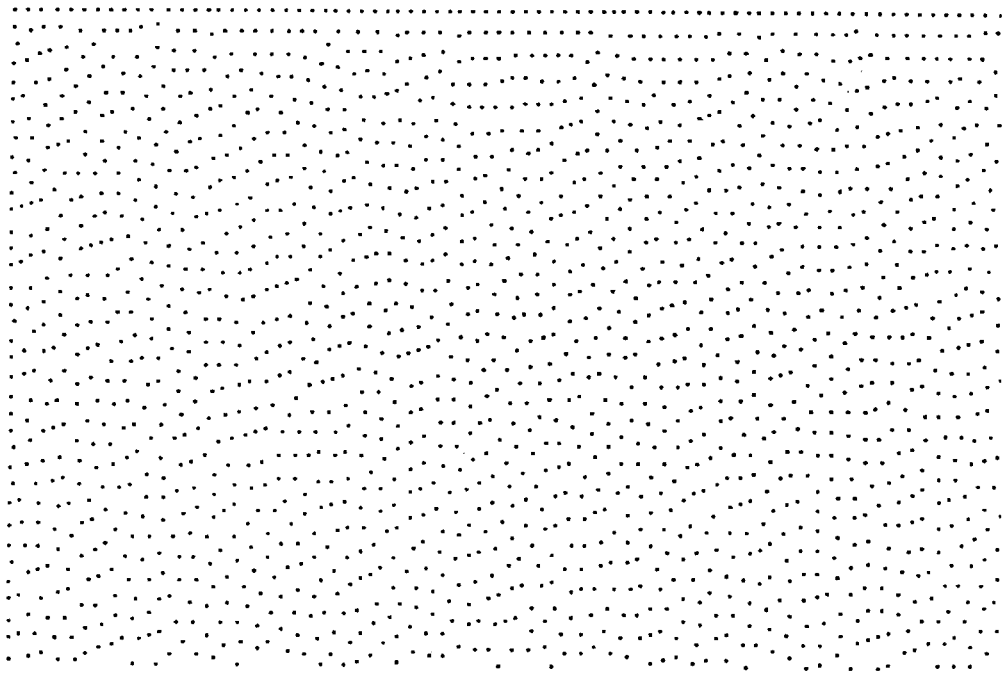
FIG. 6 shows the printing result with a printer for the density of 3% when the image data binary device of FIG. 1 is applied.
Figure 7:
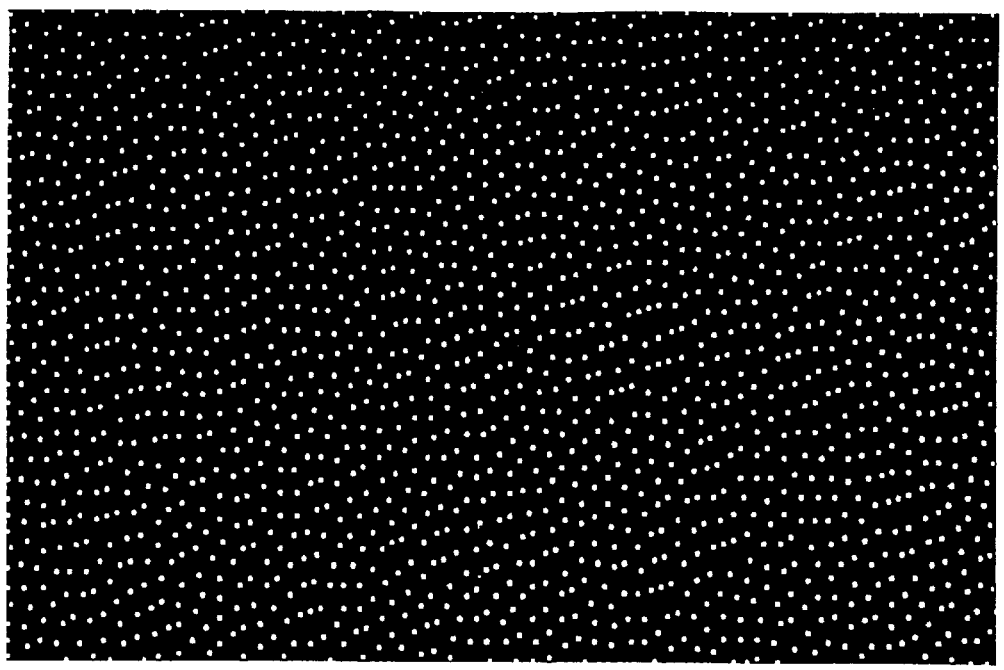
FIG. 7 shows the printing result with a printer for the density of 97% when the image data binary device of FIG. 1 is applied.

FIG. 6 shows the printing result specifically selected for the density of 3% among the low-density area of FIG. 4, and FIG. 7 shows the printing result specifically selected for the density of 97% among the high-density area of FIG. 5.

The process of the embodiment enables black dots to be dispersed in a substantially homogeneous manner in the relatively low-density area of 0% to 5% as shown in FIGS. 4 and 6. Unlike the result by the conventional process, black dots are not arranged as dotted lines. Similarly, the process of the embodiment allows white dots to be dispersed in a substantially homogeneous manner in the relatively high-density area of 95% to 100% as shown in FIGS. 5 and 7. Unlike the result by the conventional process, white dots are not arranged as dotted lines. Namely the quality of picture can be maintained in both the relatively low-density area and the relatively high-density area.

Although one destination of distribution for the value of the error 'e' is changed from the pixel located on the lower right of the pixel of interest to the pixel located on the immediate left of the lower left-side pixel of the pixel of interest in this embodiment, the number of pixels into which the value of the error 'e' is distributed is not changed from the conventional method but is kept equal to four. This does not expand the scale of the circuit structure nor lengthen the processing time.

The following simply and qualitatively describes the reasons why the black dots or white dots are arranged in dotted lines in the conventional method and why the black dots or white dots are dispersed in a substantially homogeneous manner in this embodiment.

FIGS. 8(a) through 8(f) show a process of distributing errors by the conventional error diffusion method. Squares in the drawing of FIG. 8 represent a plurality of pixels included in an arbitrary portion of an image. Scanning is carried out in the traverse direction from the left to the right in the same manner as that shown in FIG. 3.

Figure 8A:
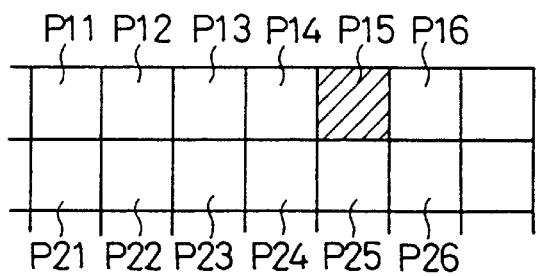
FIGS. 8(a) through 8(f) show a process of distributing errors by the conventional error diffusion method.

As an example shown in FIG. 8(a), pixels in a first row are expressed as P11 through P16 and those in a second row as P21 through P26. The pixels filled with slant lines represent those which are changed to black dots by the binary coding process (that is, pixels having values equal to or greater than a reference value). The other blank pixels represent those which are changed to white dots by the binary coding process (that is, pixels having values less than the reference value). The example of FIG. 8 shows an image having a relatively low density. These definitions are also applied to the drawing of FIG. 9 described later.

In this example, it is assumed that only the pixel P15 in the first row is changed to a black dot by the binary coding process as shown in FIG. 8(a).

Figure 8B:
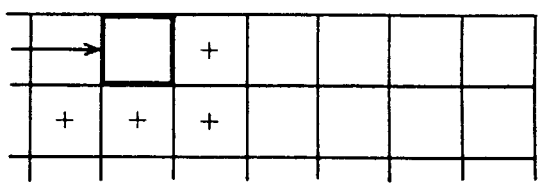
Figure 57:
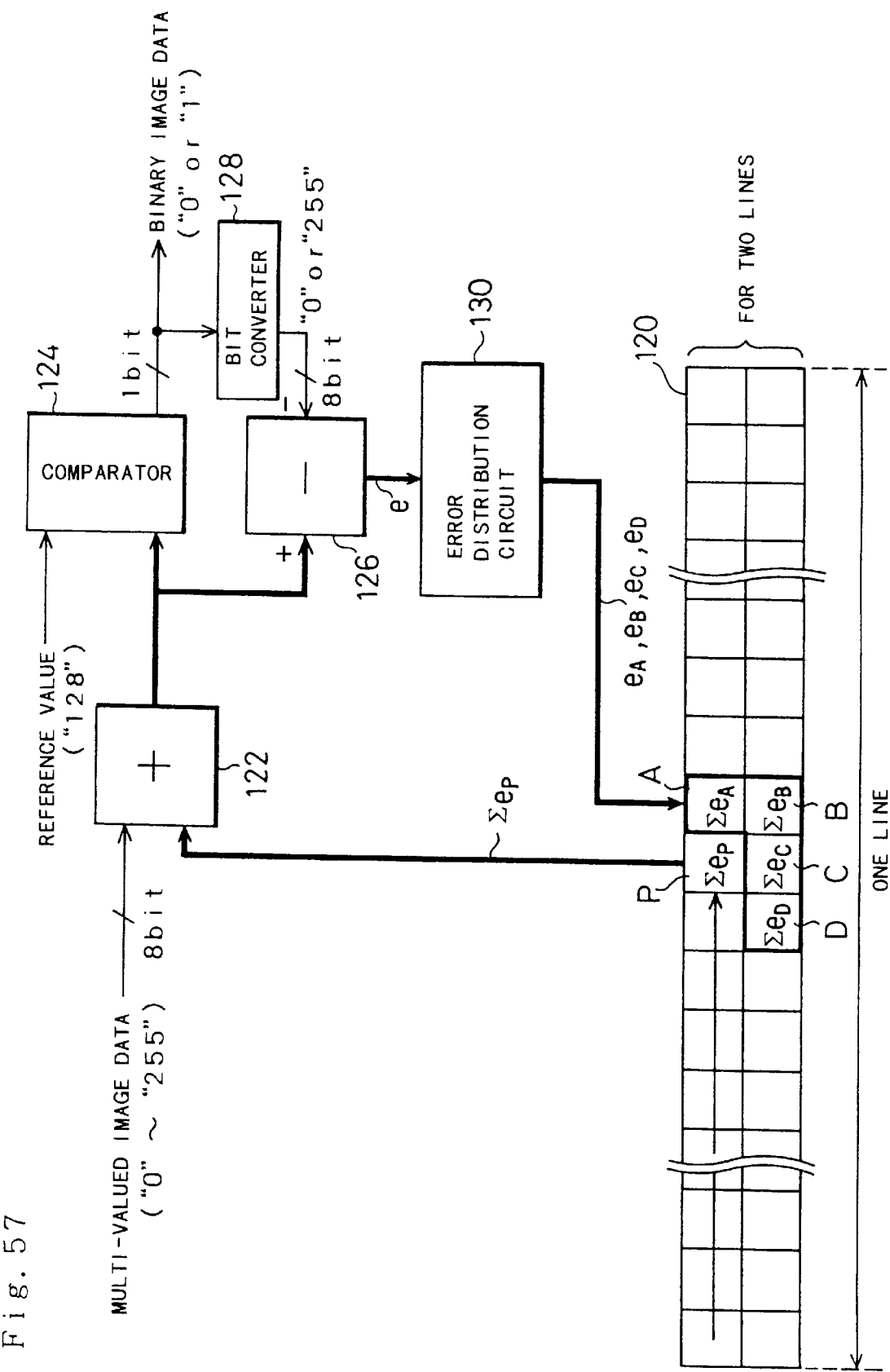
FIG. 57 is a block diagram illustrating a conventional image data binary device.
Figure 58A:
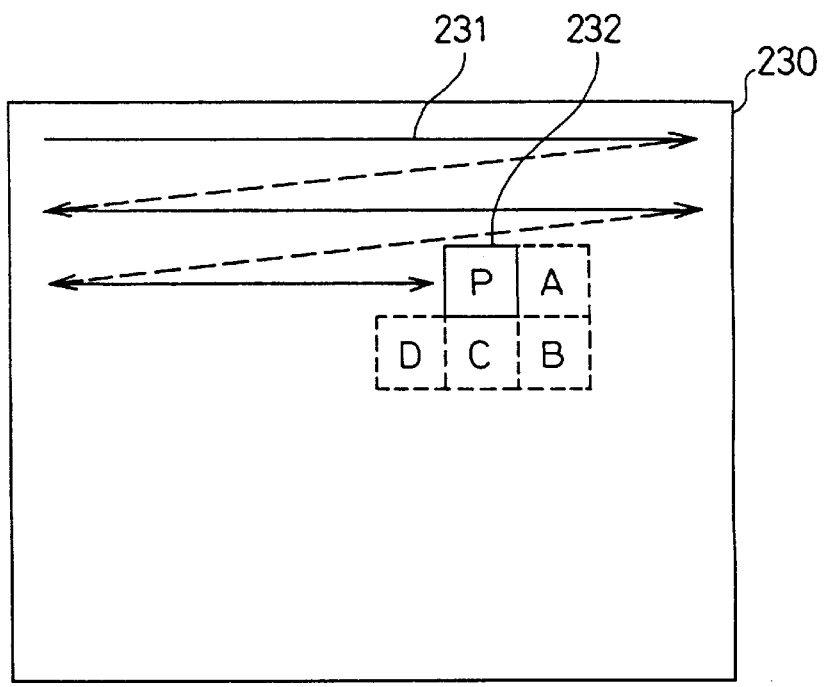
FIGS. 58(a) and 58(b) show the principle of the conventional error diffusion method.
Figure 58B:
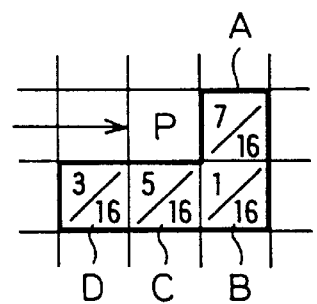
Figure 59:
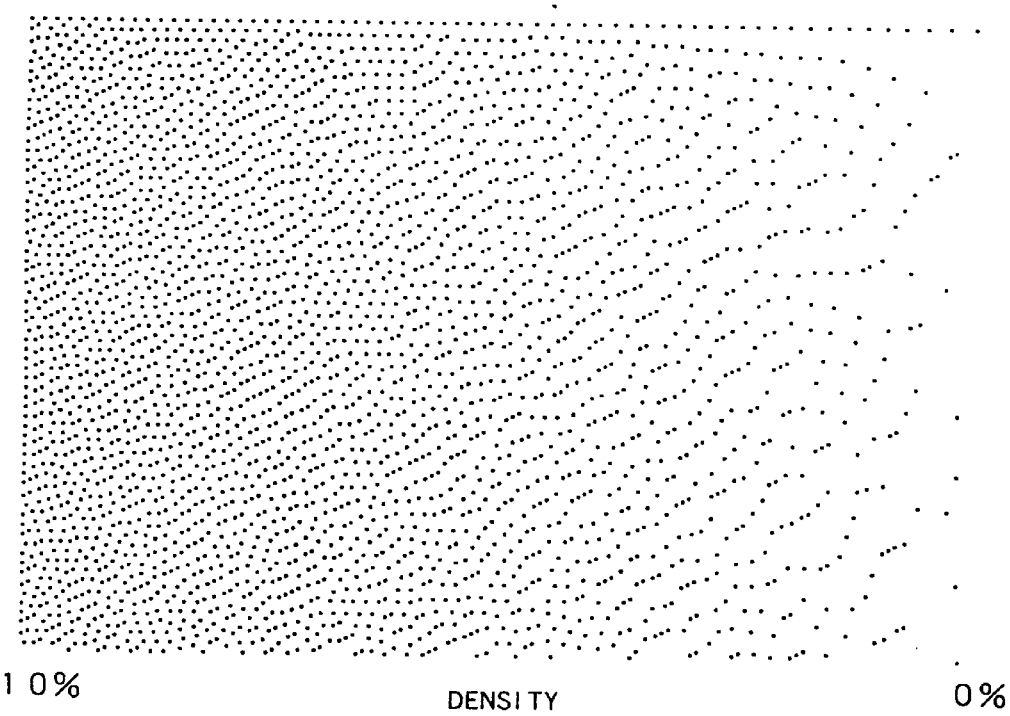
FIG. 59 shows the printing result with a printer for a low-density area of 0% to 10% when the conventional image data binary device is applied.
Figure 60:
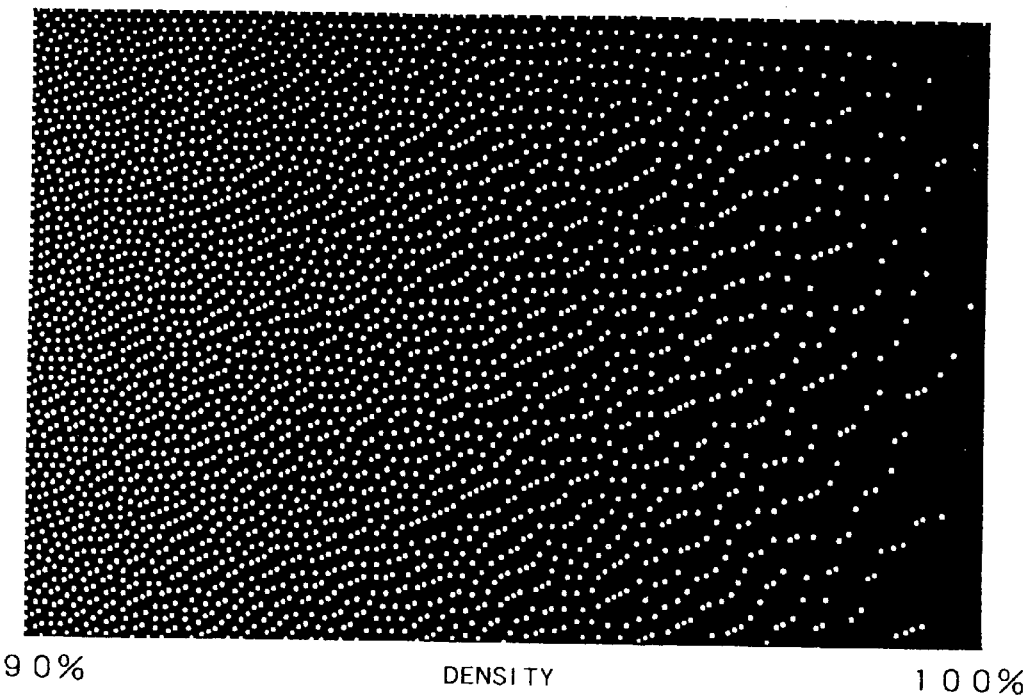
FIG. 60 shows the printing result with a printer for a high-density area of 90% to 100% when the conventional image data binary device is applied.
Figure 61:
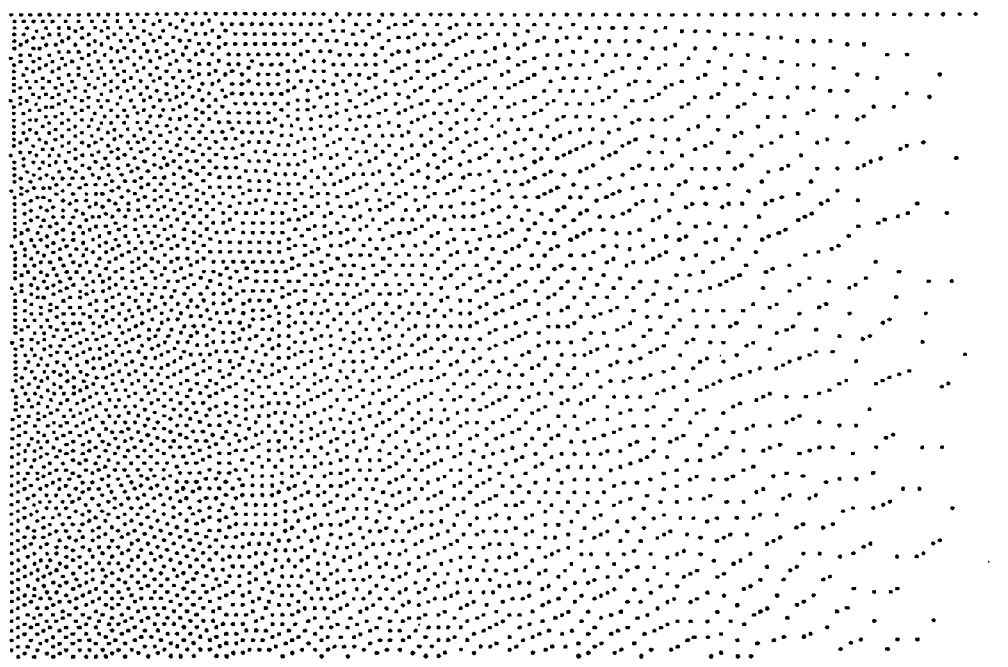
FIG. 61 shows the printing result with a printer for a low-density area of 0% to 15% when the conventional image data binary device is applied.
Figure 62:
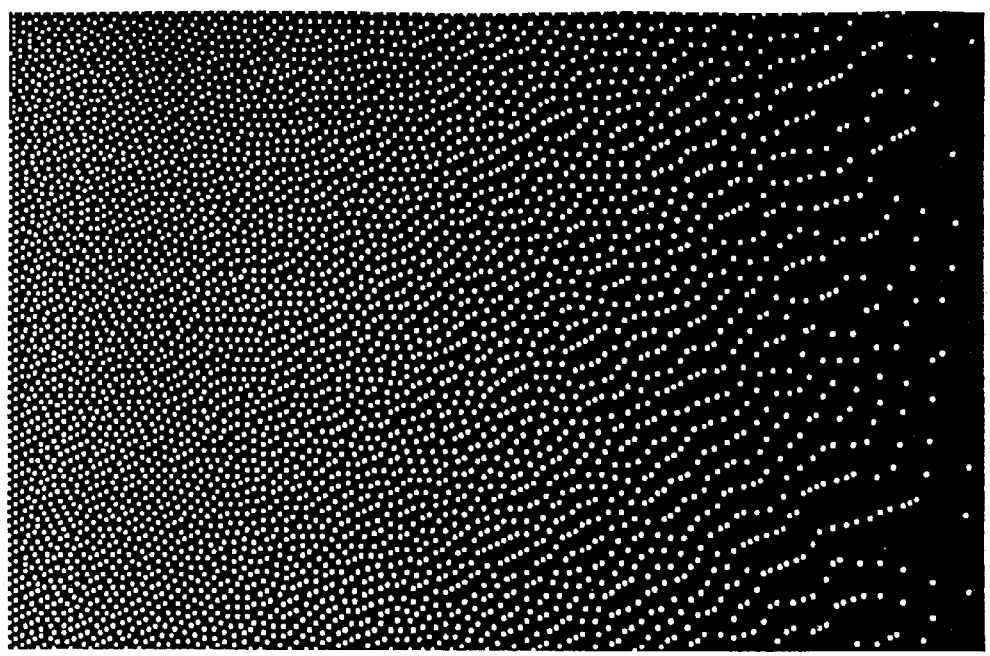
FIG. 62 shows the printing result with a printer for a high-density area of 85% to 100% when the conventional image data binary device is applied.
Figure 63:
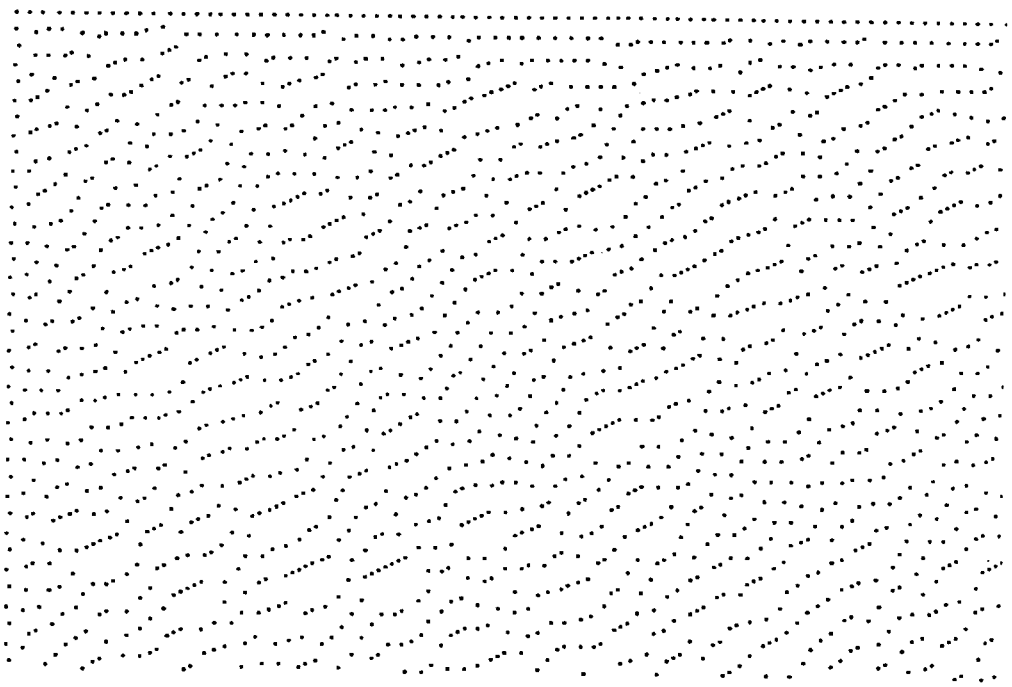
FIG. 63 shows the printing result with a printer for the density of 3% when the conventional image data binary device is applied.
Figure 64:
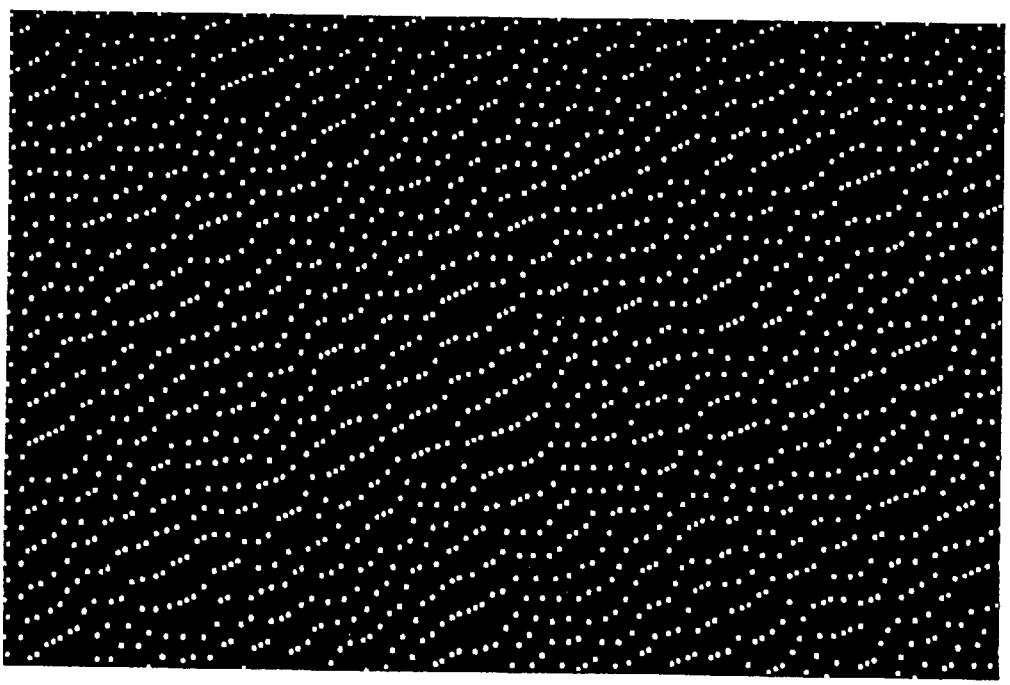
FIG. 64 shows the printing result with a printer for the density of 97% when the conventional image data binary device is applied.
Figure 65:
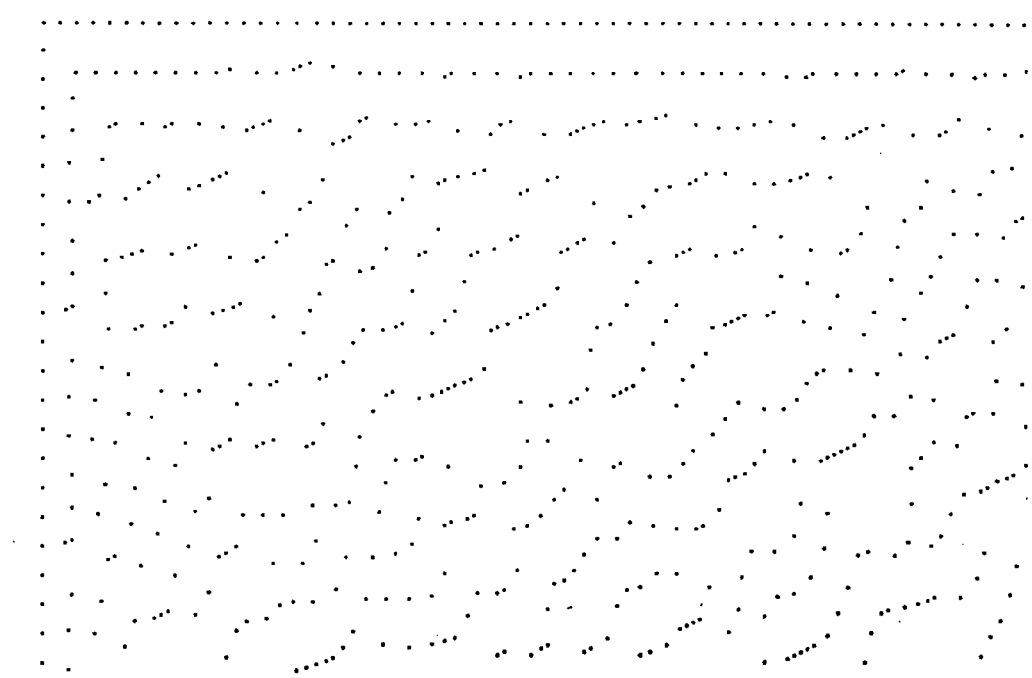
FIG. 65 shows the printing result with a printer for the density of 1% when the conventional image data binary device is applied.
Figure 66:
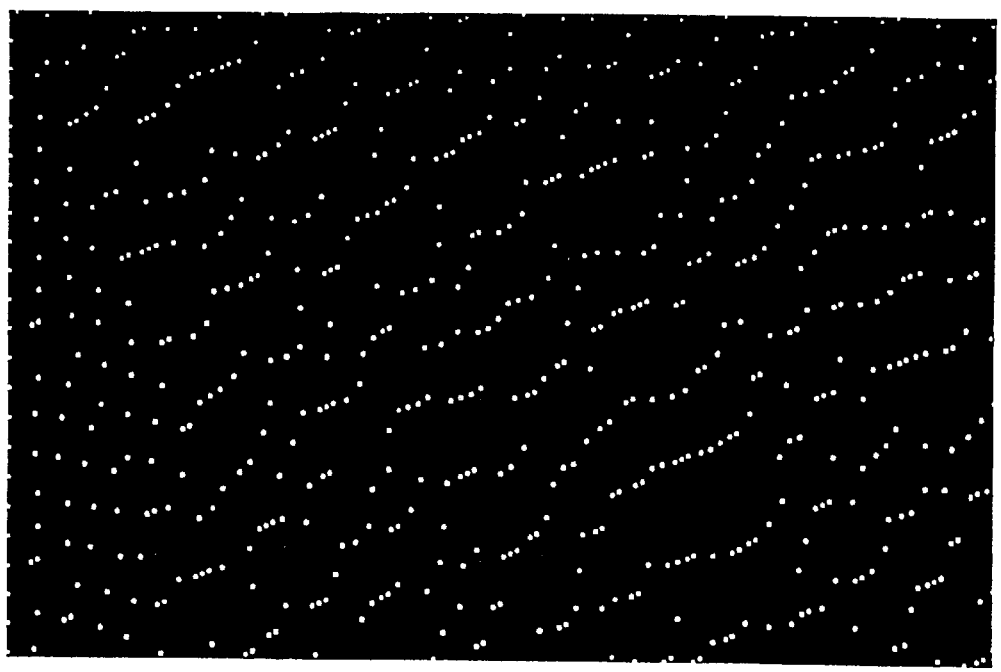
FIG. 66 shows the printing result with a printer for the density of 99% when the conventional image data binary device is applied.

Referring to FIG. 8(b), when the pixel of interest being scanned is P12 that is changed to a white dot by the binary coding process, in the conventional structure of FIG. 57, the comparator 124 outputs the binary image data having the value '0' and the subtracter 126 accordingly receives the value '0'. In case that the value of the error data with respect to the pixel P12 read from the error memory 120 is, for example, equal to '0', the image data outputted from the adder 122 to the subtracter 126 has a positive value, so that the subtracter 126 outputs a positive (+) error 'e'. The error distribution circuit 130 then distributes the respective portions of the positive (+) error to the pixels P13, P23, P22, and P21 in the vicinity of the pixel of interest P12 as shown in FIG. 8(b).

Figure 8C:
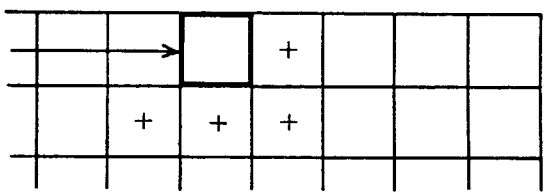

Referring to FIG. 8(c), when the pixel of interest being scanned is shifted to P13, the adder 122 generates a positive (+) output since a portion of the positive error has been distributed to the pixel P13 and the error data with respect to the pixel P13 read from the error memory 120 accordingly has a positive value. Since the pixel P13 is changed to a white dot by the binary coding process, the comparator 124 recognizes the pixel P13 as the pixel having a value smaller than the reference value and outputs the value '0', and the subtracter 126 then receives the value '0'. The image data outputted from the adder 122 to the subtracter 126, on the other hand, has a positive value, so that the subtracter 126 outputs a positive (+) error 'e'. The error distribution circuit 130 then distributes the respective portions of the positive (+) error to the pixels P14, P24, P23, and P22 in the vicinity of the pixel of interest P13 as shown in FIG. 8(c).

Figure 8D:
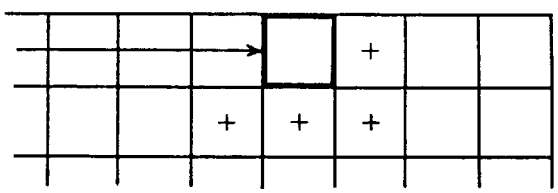

Referring to FIG. 8(d), when the pixel of interest being scanned is shifted to P14, the respective portions of the positive (+) error are distributed to the pixels P15, P25, P24, and P23 in the vicinity of the pixel of interest P14.

Figure 8E:
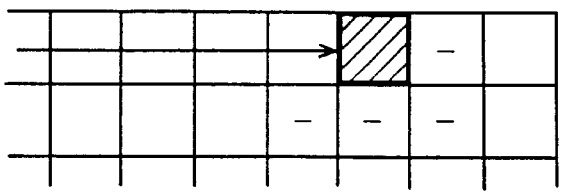

Referring to FIG. 8(e), when the pixel of interest being scanned is further shifted to the pixel P15 that is changed to a black dot by the binary coding process, however, in the conventional structure of FIG. 57, the comparator 124 outputs the binary image data having the value '1' and the subtracter 126 accordingly receives the value '255'. The image data outputted from the adder 122 to the subtracter 126, on the other hand, has the value of not greater than '255', so that the subtracter 126 outputs a negative (−) error 'e'. The error distribution circuit 130 then distributes the respective portions of the negative (−) error to the pixels P16, P26, P25, and P24 in the vicinity of the pixel of interest P15 as shown in FIG. 8(e).

Figure 8F:
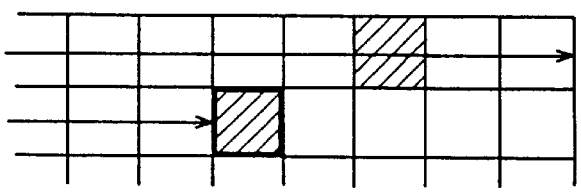

After the processing discussed above, the pixel in the second row that probably has the largest value of accumulated error data is the pixel P23 to which portions of positive (+) errors have been distributed at least three times. When scanning is carried out for the pixels in the second row, the pixel P23 is thus most likely to be changed to a black dot by the binary coding process as shown in FIG. 8(f).

FIGS. 9(a) through 9(f), on the other hand, show a process of distributing errors by the error diffusion method in accordance with the first embodiment. As an example shown in FIG. 9(a), additional pixels are arranged on the left end, and pixels in a first row are expressed as P10 through P16 and those in a second row as P20 through P26.

Figure 9A:
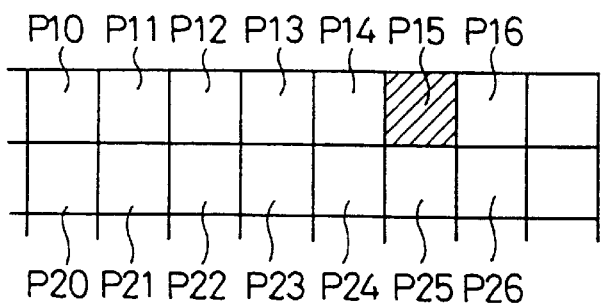
FIGS. 9(a) through 9(f) show a process of distributing errors by the error diffusion method in accordance with the first embodiment.
Figure 9B:
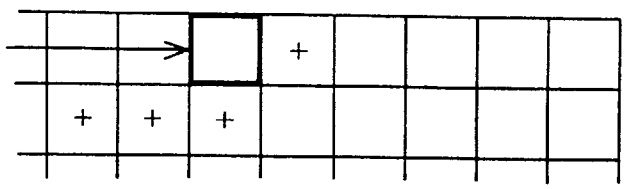

Referring to FIG. 9(b), when the pixel of interest being scanned is P12 that is changed to a white dot by the binary coding process, in the structure of the embodiment shown in FIG. 1, the comparator 24 outputs the binary image data having the value '0' and the subtracter 26 accordingly receives the value '0'. In case that the value of the error data with respect to the pixel P12 read from the error memory 20 is, for example, equal to '0', the image data outputted from the adder 22 to the subtracter 26 has a positive value, so that the subtracter 26 outputs a positive (+) error 'e'. In this embodiment, the pixel located on the immediate left of the lower left-side pixel of the pixel of interest is selected in place of the pixel located on the lower right of the pixel of interest, as one destination of distribution carried out by the error distribution circuit 30 for the value of the error 'e'. The respective portions a of the positive (+) error are thus distributed to the pixels P13, P22, P21, and P20 in the vicinity of the pixel of interest P12.

Figure 9C:
Figure 9C:
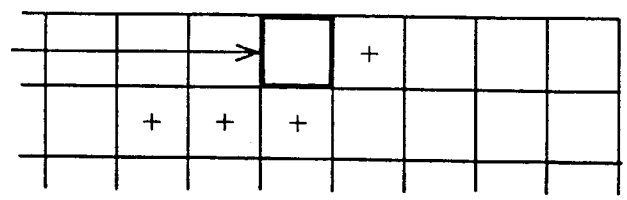
Figure 9D:
Figure 9D:
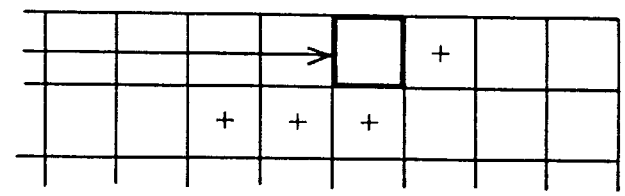

As the pixel of interest being scanned is shifted to the pixels P13 and P14, the destinations of distribution for the error 'e' are sequentially shifted. But in any case, the portions of the distributed error are all positive (+) as shown in FIGS. 9(c) and 9(d).

Figure 9E:
Figure 9E:
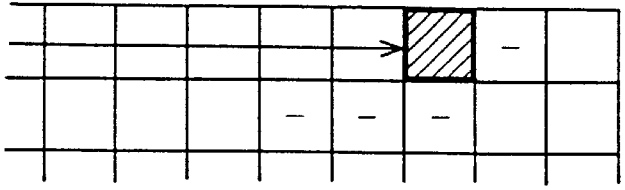

Referring to FIG. 9(e), when the pixel of interest being scanned is further shifted to the pixel P15 that is changed to a black dot by the binary coding process, however, in the structure of the embodiment shown in FIG. 1, the subtracter 26 receives the value '255'. The image data outputted from the adder 22 to the subtracter 26, on the other hand, has the value of not greater than '255', so that the subtracter 26 outputs a negative (−) error 'e'. The error distribution circuit 30 then distributes the respective portions of the negative (−) error to the pixels P16, P25, P24, and P23 in the vicinity of the pixel of interest P15 as shown in FIG. 9(e).

After the processing discussed above, the pixel in the second row that probably has the largest value of accumulated error data is the pixel P22 to which portions of positive (+) errors have been distributed at least three times. When scanning is carried out for the pixels in the second row, the pixel P22 is thus most likely to be changed to a black dot by the binary coding process as shown in FIG. 9(f).

Figure 9F:
Figure 9F:
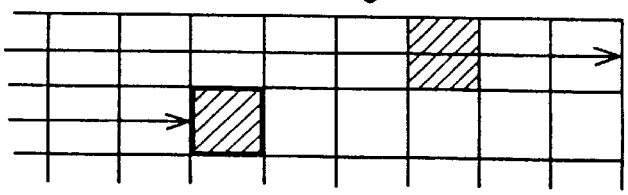
Figure 10A:
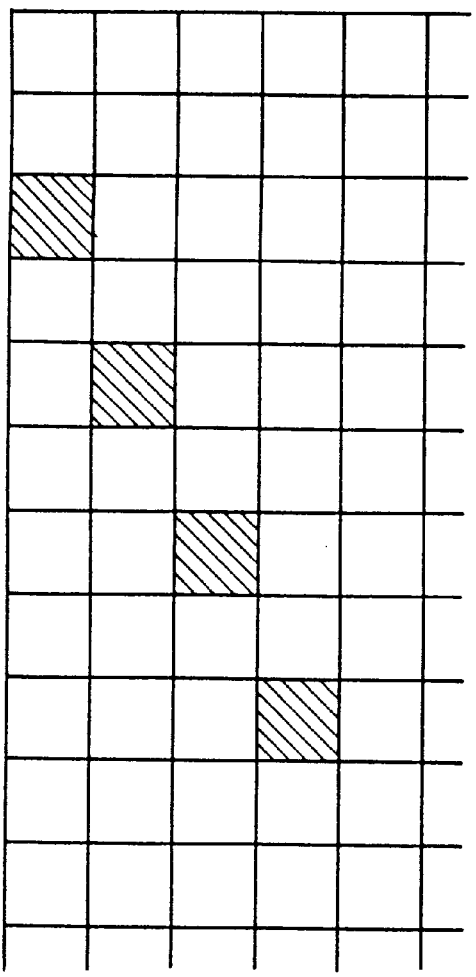
FIGS. 10(a) and 10(b) show arrangements of black dots in the printing results in accordance with the conventional method and the method of the first embodiment.
Figure 10B:
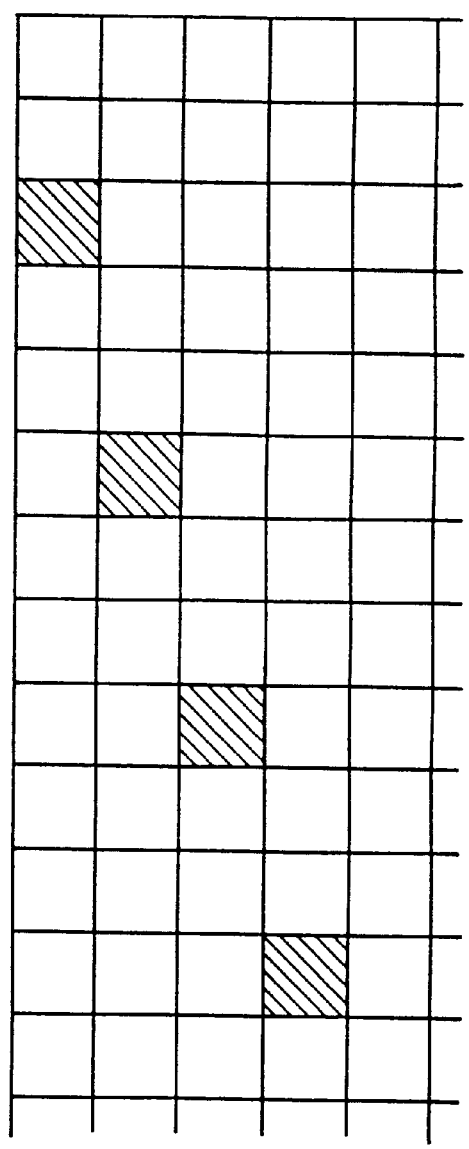

The state of FIG. 8(f) in accordance with the conventional method is compared with the state of FIG. 9(f) in accordance with the method of the first embodiment. In the conventional method, the pixel P23 located on the immediate left of the lower left-side pixel P24 of the black-dot pixel P15 is most likely to be changed to a black dot. In the method of the first embodiment, on the other hand, the pixel P22 located on the second left of the lower left-side pixel P24 of the black-dot pixel P15 is most likely to be changed to a black dot. Namely the method of the first embodiment ensures a greater interval between a plurality of black dots. This is clearly shown in the drawings of FIG. 10. The conventional method gives a smaller interval between a plurality of black dots as shown in FIG. 10(a), so that the black dots tend to be recognized as a dotted line running from the upper right to the lower left. The method of the first embodiment, on the contrary, gives a relatively large interval between a plurality of black dots as shown in FIG. 10(b), so that the black dots are not likely to be recognized as a dotted line.

The primary difference between the present invention and the prior art technique is discussed above for the image having a relatively low density (that is, in the case of black dots). This is also applied to the image having a relatively high density (that is, in the case of white dots).

In the above embodiment, the ratio of error distribution applied is 7/16 to the pixel A, 5/16 to the pixel C, 3/16 to the pixel D, and 1/16 to the pixel E (see FIG. 3). The present invention is not restricted to this specific value, but any value may be applicable as the ratio of error distribution.

Figure 11:
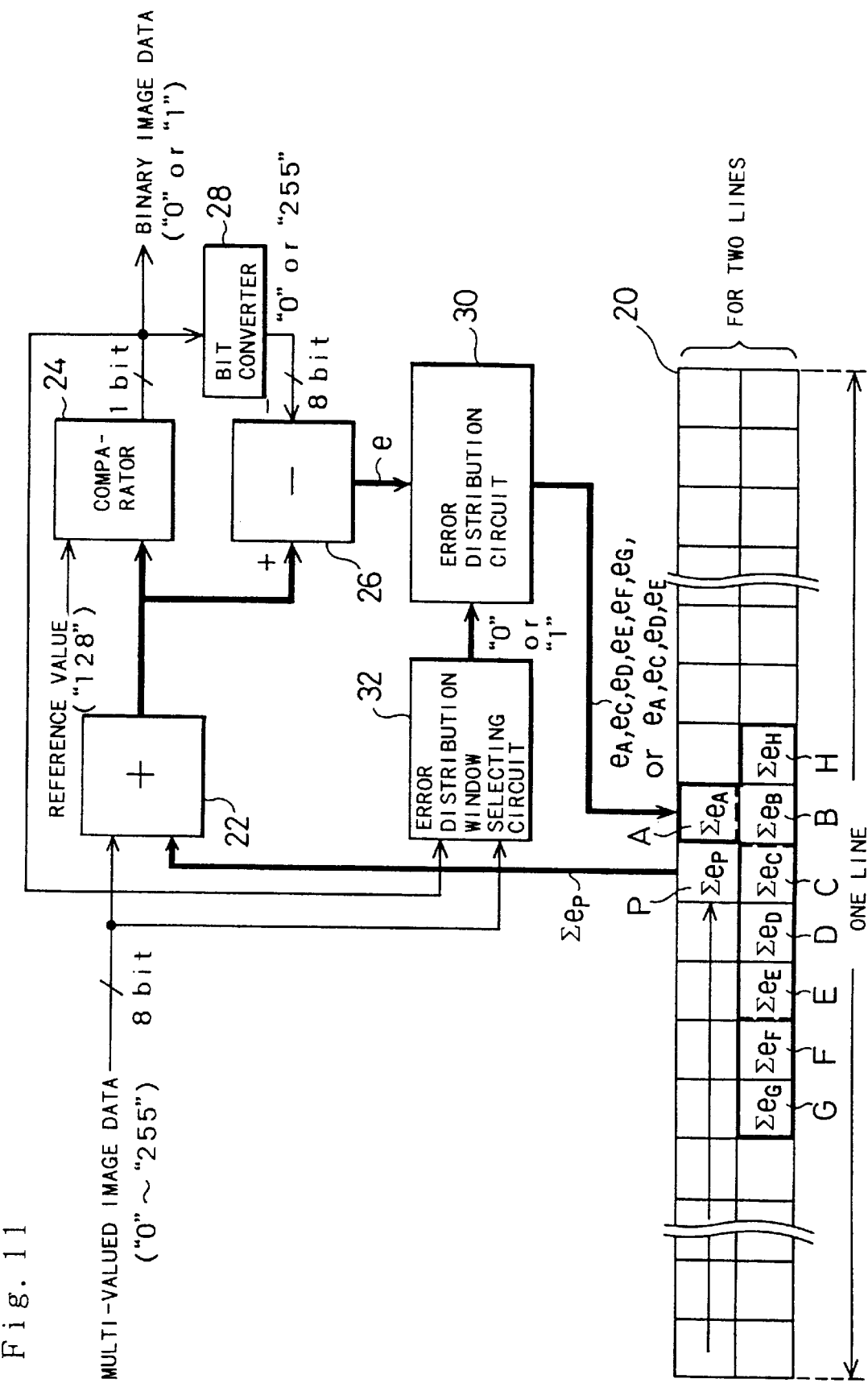
FIG. 11 is a block diagram illustrating another image data binary device as a second embodiment according to the present invention.

FIG. 11 is a block diagram illustrating another image data binary device as a second embodiment according to the present invention. Referring to FIG. 11, the image data binary device of the second embodiment includes an error memory 20, an adder 22, a comparator 24, a subtracter 26, a bit converter 28, an error distribution circuit 30, and an error distribution window selection circuit 32.

Figure 12:
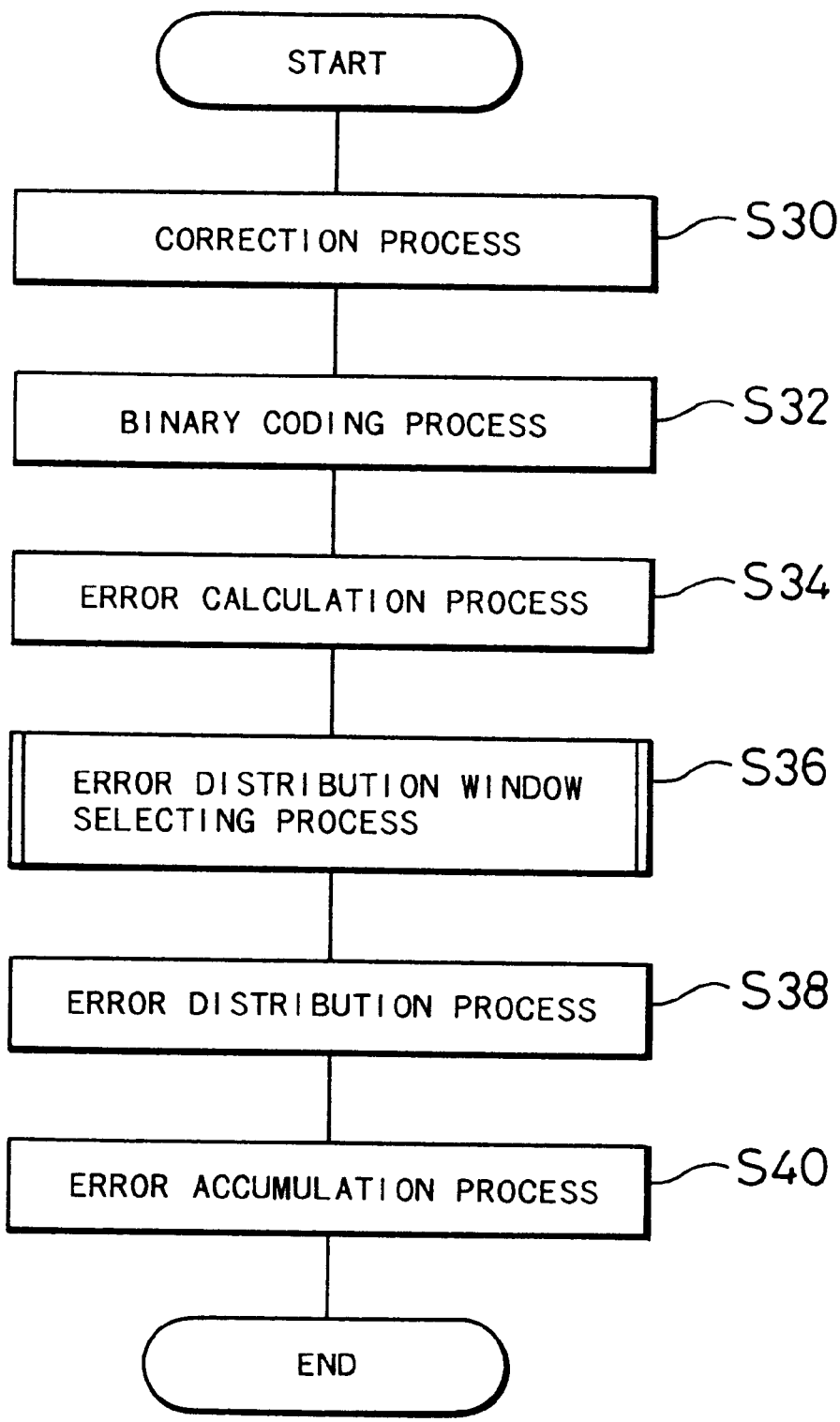
FIG. 12 is a flowchart showing an image data binary coding routine executed by the image data binary device of FIG. 11.

FIG. 12 is a flowchart showing an image data binary coding routine executed by the image data binary device of FIG. 11.

Prior to the description of the image data binary device shown in FIG. 11, error distribution windows used in the second embodiment are discussed briefly. In the conventional image data binary device shown in FIG. 57, the value of the error 'e' between the image data before and after the binary coding is distributed into the four pixels in the vicinity of the target pixel of binary coding or the pixel of interest P; that is, the pixels A, B, C, and D located on the immediate right of, on the lower right of, immediately below, and on the lower left of the pixel of interest P as shown in FIG. 58. In the second embodiment, however, either one of two available error distribution windows shown in FIGS. 13(b) and 13(c) is selected and the error 'e' is distributed according to the selected error distribution window.

Figure 13A:
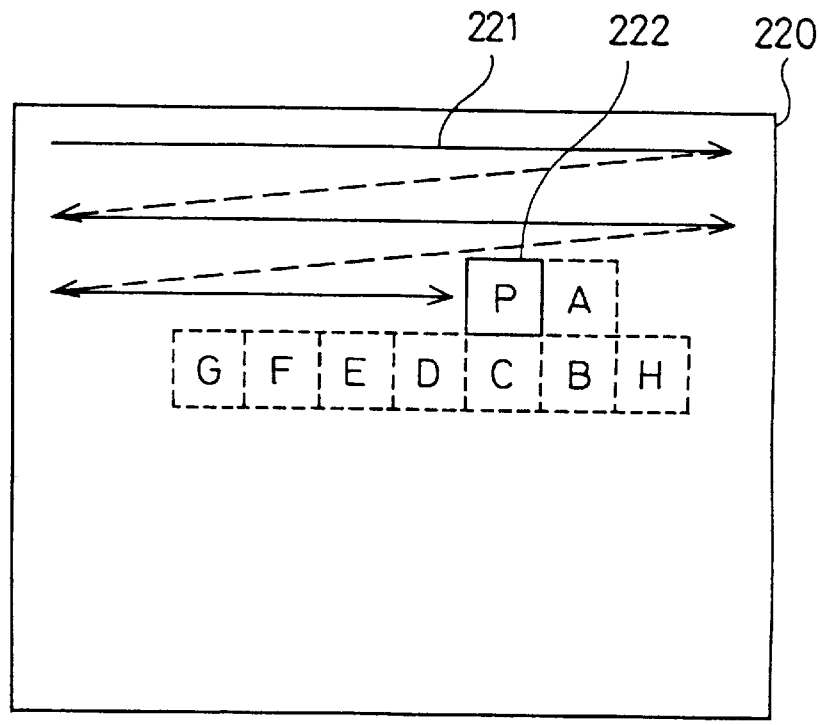
FIGS. 13(a) through 13(c) show an error diffusion process applied for the second embodiment.
Figure 13B:
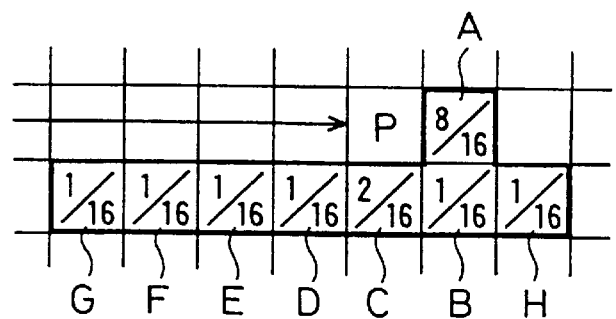
Figure 13C:
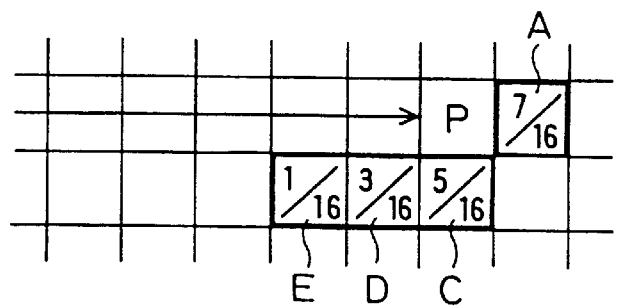

FIGS. 13(a) through 13(c) show an error diffusion process applied for the second embodiment. In the drawing of FIG. 13(a), the procedure of binary coding pixels 222 included in an image 220 is carried out in an order specified by an arrow 221.

In the second embodiment, one of the two available error distribution windows shown in FIGS. 13(b) and 13(c) is selected according to the values of the image data before binary coding the pixel of interest P and the binary-coded image data. The error distribution window herein specifies positions of objective pixels, into which the error 'e' generated for the pixel of interest P is distributed, relative to the pixel of interest P as well as a distribution ratio (ratio of error distribution) to the respective objective pixels.

When the error distribution window shown in FIG. 13(b) is selected, the error 'e' is distributed into the objective pixels as defined below:

Pixel A: $e_A = e \times 8/16$

Pixel B: $e_B = e \times 1/16$

Pixel C: $e_C = e \times 2/16$

Pixel D: $e_D = e \times 1/16$

Pixel E: $e_E = e \times 1/16$

Pixel F: $e_F = e \times 1/16$

Pixel G: $e_G = e \times 1/16$

Pixel H: $e_H = e \times 1/16$     (5)

When the error distribution window shown in FIG. 13(c) is selected, on the other hand, the error 'e' is distributed into the objective pixels as defined below:

Pixel A: $e_A = e \times 7/16$

Pixel C: $e_C = e \times 5/16$

Pixel D: $e_D = e \times 3/16$

Pixel E: $e_E = e \times 1/16$     (6)

The following discussion relates to the case when one of the two available error distribution windows is selected according to the value of the binary-coded image data. By way of example, in case that the value of the binary-coded image data for the pixel of interest P is equal to '1', the distribution of the error 'e' is carried out in accordance with the error distribution window of FIG. 13(b). In case that the value of the binary-coded image data is equal to '0', on the contrary, the distribution of the error 'e' is carried out in accordance with the error distribution window of FIG. 13(c). The switch of the two error distribution windows in this manner improves the quality of picture in a relatively low-density area.

Figure 14:
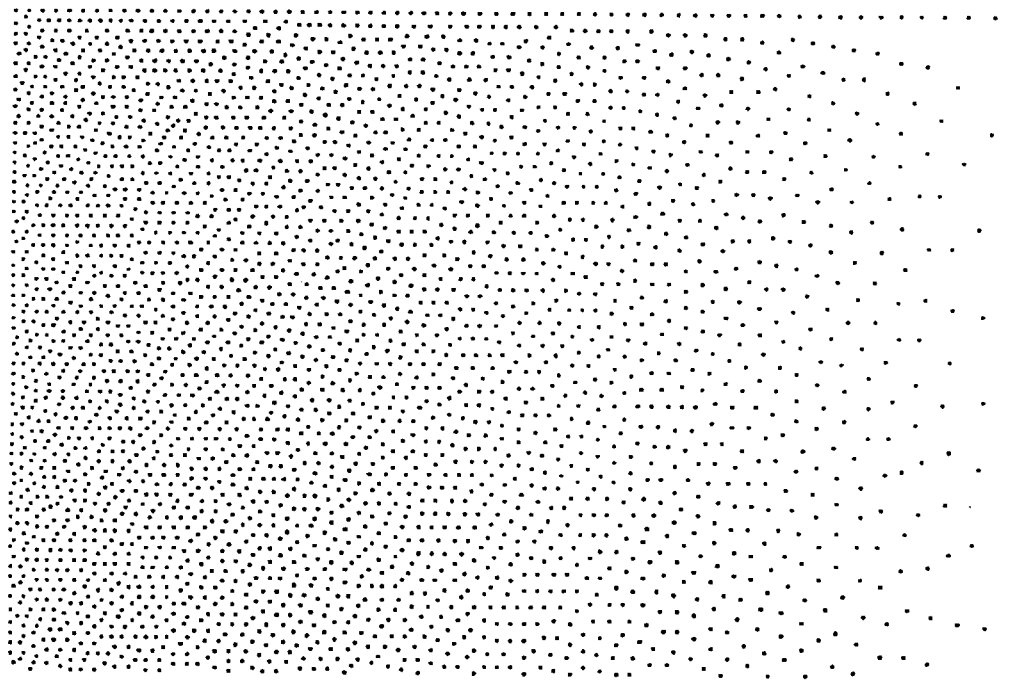
FIG. 14 shows the printing result with a printer for a low-density area of 0% to 10% when the value of the error 'e' is distributed in accordance with the error distribution window of FIG. 13(b) for the binary-coded image data having the value '1' and in accordance with the error distribution window of FIG. 13(c) for the binary-coded image data having the value '0'.
Figure 15:
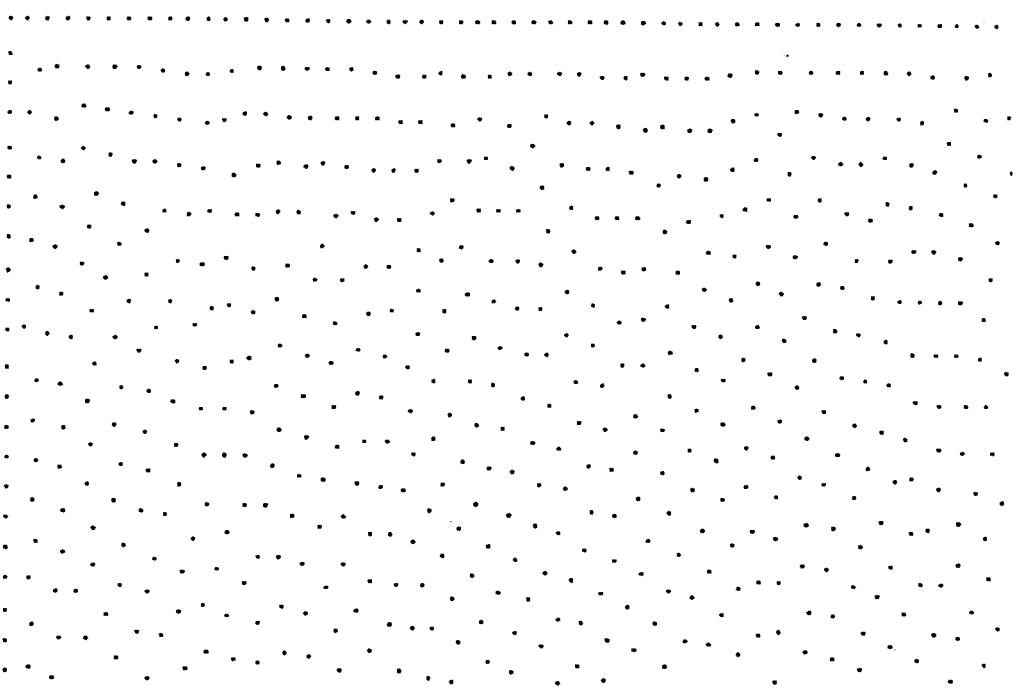
FIG. 15 shows the printing result with a printer for the density of 1% when the value of the error 'e' is distributed in accordance with the error distribution window of FIG. 13(b) for the binary-coded image data having the value '1' and in accordance with the error distribution window of FIG. 13(c) for the binary-coded image data having the value '0'.

FIG. 14 shows the printing result with a printer for a low-density area of 0% to 10% when the value of the error 'e' is distributed in accordance with the error distribution window of FIG. 13(b) for the binary-coded image data having the value '1' and in accordance with the error distribution window of FIG. 13(c) for the binary-coded image data having the value '0'. In the drawing of FIG. 14, the density continuously varies from right to left in the range of 0% to 10% along the width of the image. FIG. 15 shows the printing result specifically selected for the density of 1% among the low-density area of FIG. 14. In the drawing of FIG. 15, the whole image has a homogeneous density.

When the value of the error 'e' is distributed in accordance with the error distribution window of FIG. 13(b) for the binary-coded image data having the value '1' and in accordance with the error distribution window of FIG. 13(c) for the binary-coded image data having the value '0', black dots are dispersed in a substantially homogeneous manner in the relatively low-density area of 0% to 3% as shown in FIGS. 14 and 15. Unlike the result by the conventional process, black dots are not arranged as dotted lines.

This method of distribution, however, causes textures in a relatively high intermediate-density area close to 80%, which result in deteriorating the quality of picture. The textures herein denote patterns having some regularity and included in a planar distribution of depth.

Figure 16:
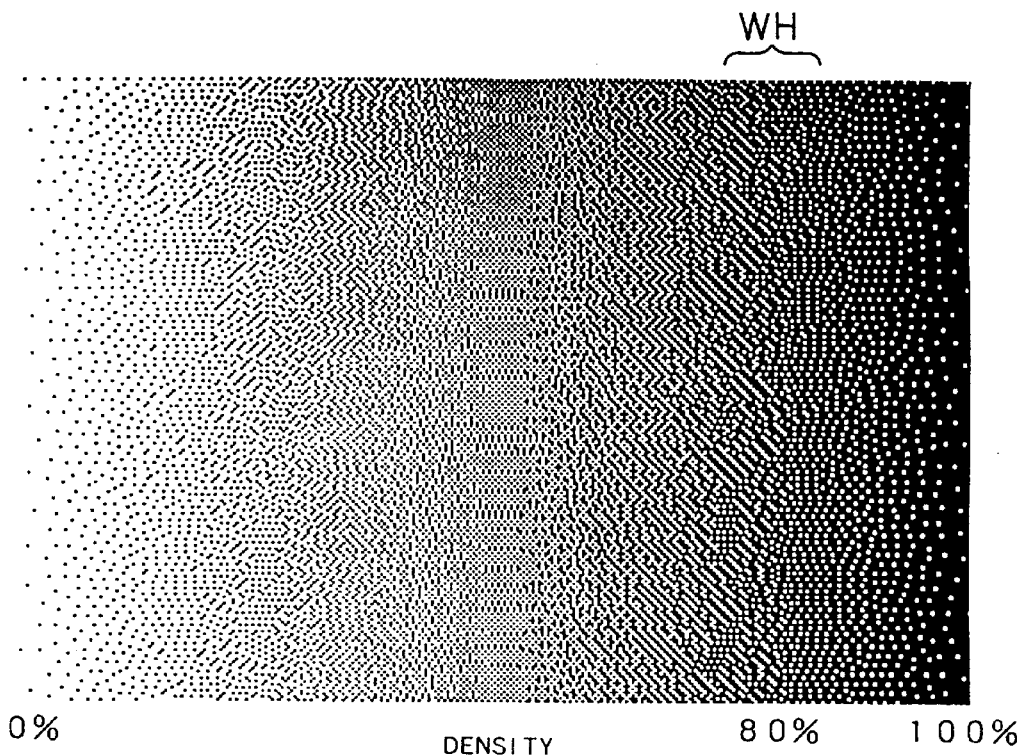
FIG. 16 shows the printing result with a printer for the whole density range of 0% to 100% when the value of the error 'e' is distributed in accordance with the error distribution window of FIG. 13(b) for the binary-coded image data having the value '1' and in accordance with the error distribution window of FIG. 13(c) for the binary-coded image data having the value '0'.
Figure 17:
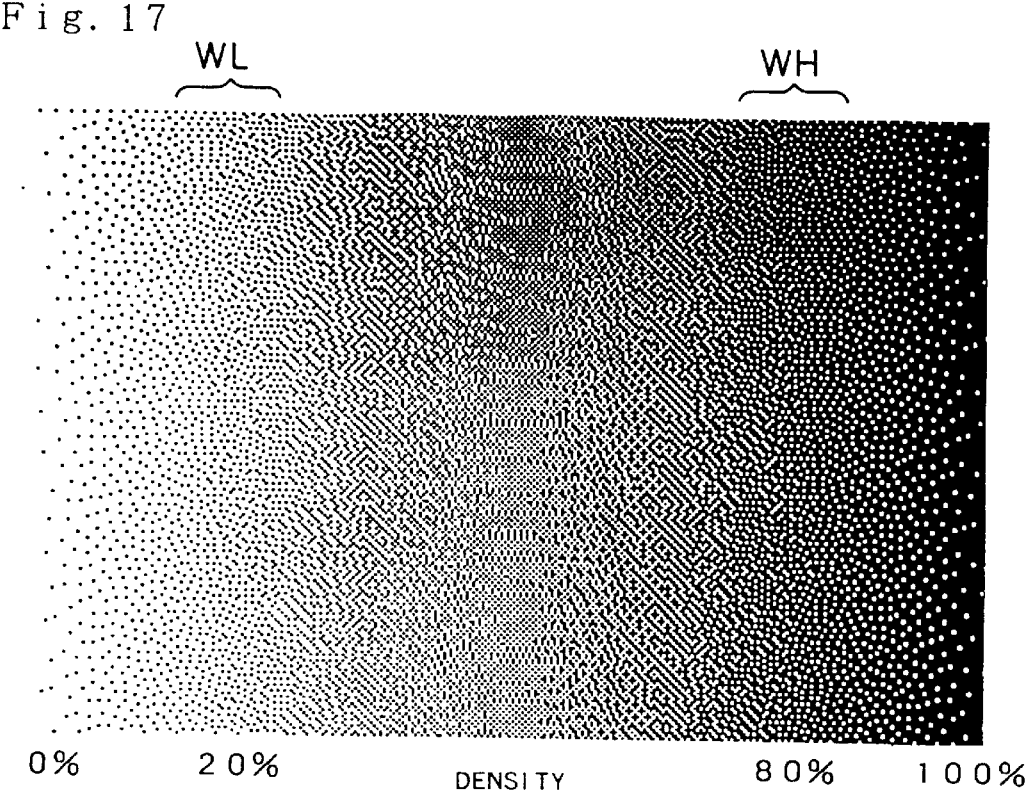
FIG. 17 shows the printing result with a printer for the whole density range of 0% to 100% when the error distribution window of FIG. 13(c) is consistently applied irrespective of the value of the binary-coded image data.

FIG. 16 shows the printing result with a printer for the whole density range of 0% to 100% when the value of the error 'e' is distributed in accordance with the error distribution window of FIG. 13(b) for the binary-coded image data having the value '1' and in accordance with the error distribution window of FIG. 13(c) for the binary-coded image data having the value '0'. FIG. 17 shows the printing result with a printer for the whole density range of 0% to 100% when the error distribution window of FIG. 13(c) is consistently applied irrespective of the value of the binary-coded image data. In the drawings of FIGS. 16 and 17, the density continuously varies from left to right in the range of 0% to 100% along the width of the image.

When the value of the error 'e' is distributed in accordance with the error distribution window of FIG. 13(b) for the binary-coded image data having the value '1' and in accordance with the error distribution window of FIG. 13(c) for the binary-coded image data having the value '0', textures are observed in an area WH close to the density of 80% as shown in FIG. 16. Compared with the printing result of FIG. 17 consistently using the error distribution window of FIG. 13(c), the printing result of FIG. 16 has the poorer quality of picture in the area WH.

In contrast with the above procedure, when the value of the error 'e' is distributed in accordance with the error distribution window of FIG. 13(b) for the binary-coded image data (regarding the pixel of interest P) having the value '0' and in accordance with the error distribution window of FIG. 13(c) for the binary-coded image data having the value '1', the quality of picture can be improved in a relatively high-density area.

Figure 18:
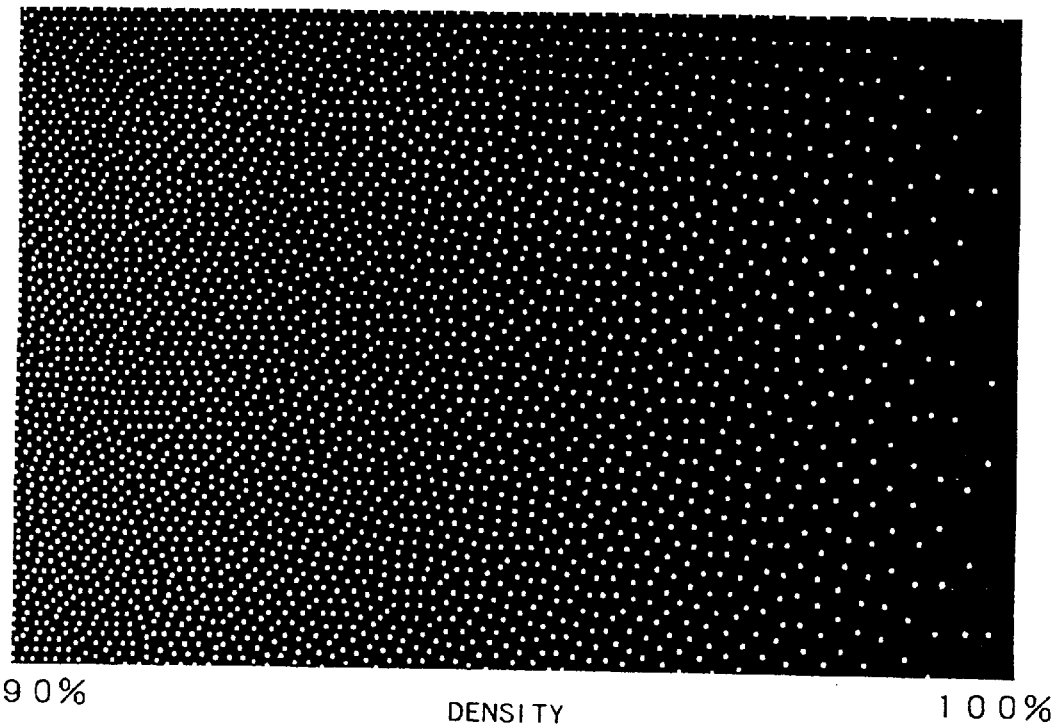
FIG. 18 shows the printing result with a printer for a high-density area of 90% to 100% when the value of the error 'e' is distributed in accordance with the error distribution window of FIG. 13(b) for the binary-coded image data having the value '0' and in accordance with the error distribution window of FIG. 13(c) for the binary-coded image data having the value '1'.
Figure 19:
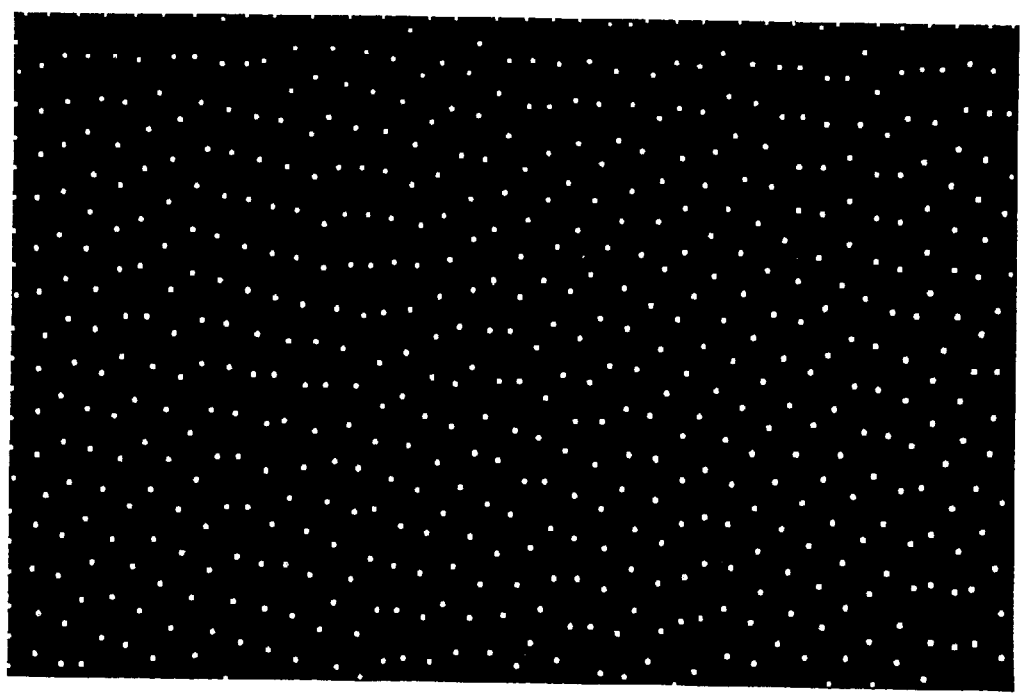
FIG. 19 shows the printing result with a printer for the density of 99% when the value of the error 'e' is distributed in accordance with the error distribution window of FIG. 13(b) for the binary-coded image data having the value '0' and in accordance with the error distribution window of FIG. 13(c) for the binary-coded image data having the value '1'.

FIG. 18 shows the printing result with a printer for a high-density area of 90% to 100% when the value of the error 'e' is distributed in accordance with the error distribution window of FIG. 13(b) for the binary-coded image data having the value '0' and in accordance with the error distribution window of FIG. 13(c) for the binary-coded image data having the value '1'. In the drawing of FIG. 18, the density continuously varies from left to right in the range of 90% to 100% along the width of the image. FIG. 19 shows the printing result specifically selected for the density of 99% among the high-density area of FIG. 18. In the drawing of FIG. 19, the whole image has a homogeneous density.

When the value of the error 'e' is distributed in accordance with the error distribution window of FIG. 13(b) for the binary-coded image data having the value '0' and in accordance with the error distribution window of FIG. 13(c) for the binary-coded image data having the value '1', white dots are dispersed in a substantially homogeneous manner in the relatively high-density area of 97% to 100% as shown in FIGS. 18 and 19. Unlike the result by the conventional process, white dots are not arranged as dotted lines.

Figure 20:
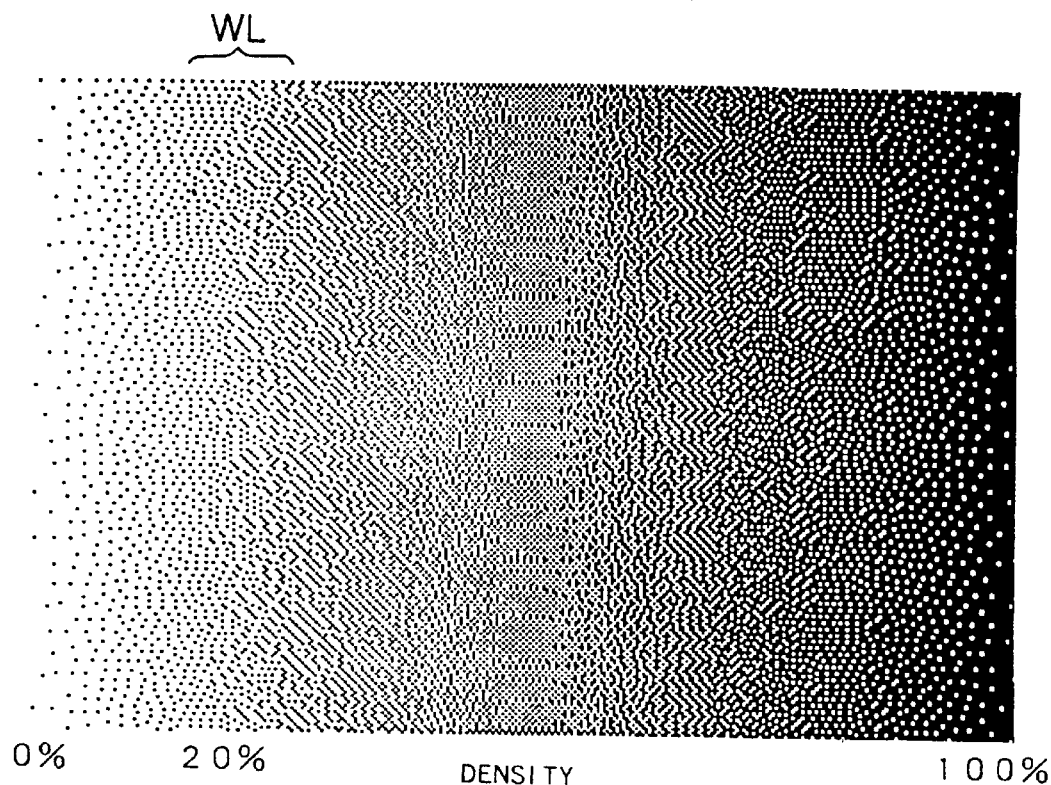
FIG. 20 shows the printing result with a printer for the whole density range of 0% to 100% when the value of the error 'e' is distributed in accordance with the error distribution window of FIG. 13(b) for the binary-coded image data having the value '0' and in accordance with the error distribution window of FIG. 13(c) for the binary-coded image data having the value '1'.

This method of distribution, however, causes textures in a relatively low intermediate-density area close to 20%, which result in deteriorating the quality of picture. FIG. 20 shows the printing result with a printer for the whole density range of 0% to 100% when the value of the error 'e' is distributed in accordance with the error distribution window of FIG. 13(b) for the binary-coded image data having the value '0' and in accordance with the error distribution window of FIG. 13(c) for the binary-coded image data having the value '1'. Like FIGS. 16 and 17, in the drawing of FIG. 20, the density continuously varies from left to right in the range of 0% to 100% along the width of the image.

When the value of the error 'e' is distributed in accordance with the error distribution window of FIG. 13(c) for the binary-coded image data having the value '1', textures are observed in an area WL close to the density of 20% as shown in FIG. 20. Compared with the printing result of FIG. 17 consistently using the error distribution window of FIG. 13(c), the printing result of FIG. 20 has the poorer quality of picture in the area WL.

When the two error distribution windows are not switched according to the value of the binary-coded image data but when the distribution of the error 'e' is carried out consistently in accordance with the error distribution window of FIG. 13(c), that is, irrespective of the value of the binary-coded image data, the quality of picture is improved in an intermediate-density area.

Based on the above facts, the structure of the second embodiment carries out the distribution of the error 'e' in accordance with the error distribution window of FIG. 13(b) only when the binary-coded image data has the value '1' in a relatively low-density area of 0% to approximately 5% or has the value '0' in a relatively high-density area of approximately 95% to 100%. Otherwise, the error distribution window of FIG. 13(c) is applied for the distribution of the error 'e'. The density is proportional to the value of the image data prior to the binary coding (that is, the tone value). In case that the image data prior to the binary coding is 8-bit data (that is, 256 tones), the above definition can be expressed in another way. The error distribution window of FIG. 13(b) is applied for the distribution of the error 'e' only when the image data prior to the binary coding has the value of '0' to '13' and the binary-coded image data has the value '1' or when the image data prior to the binary coding has the value of '242' to '255' and the binary-coded image data has the value '0'. Otherwise, the error distribution window of FIG. 13(c) is applied for the distribution of the error 'e'.

Figure 21:
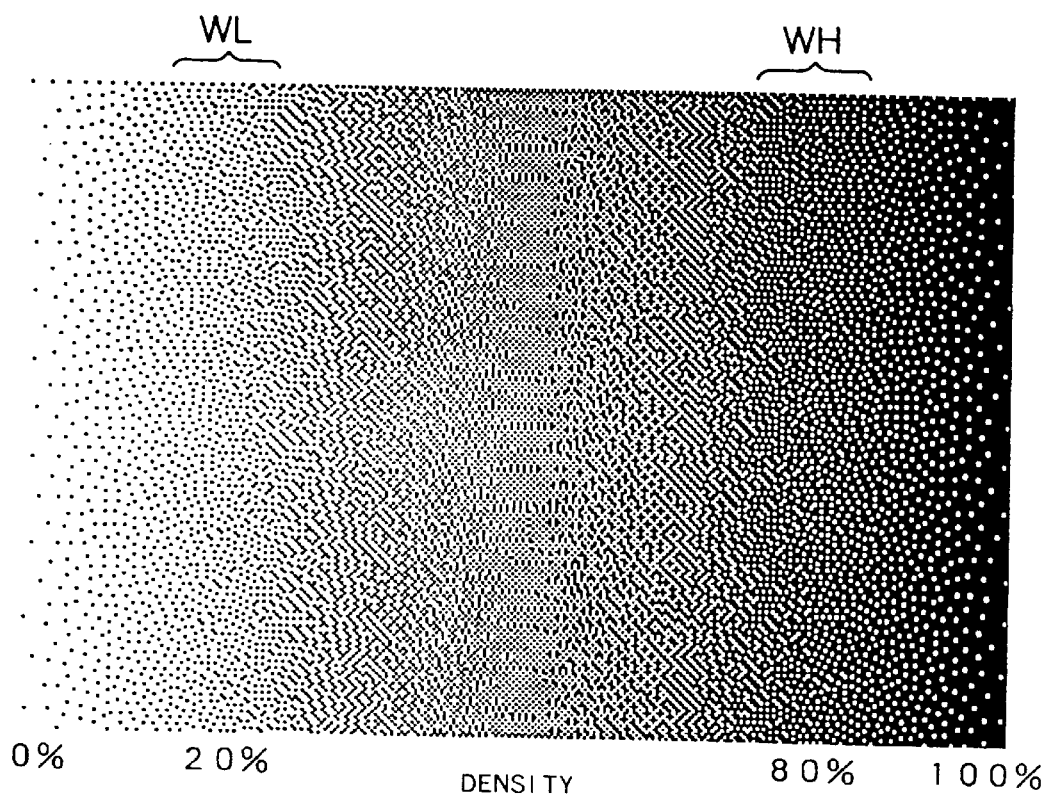
FIG. 21 shows the printing result with a printer for the whole density range of 0% to 100% when the error distribution window applied for the distribution of the error 'e' is switched according to the values of the image data prior to the binary coding and the binary-coded image data.

FIG. 21 shows the printing result with a printer for the whole density range of 0% to 100% when the error distribution window applied for the distribution of the error 'e' is switched according to the values of the image data prior to the binary coding and the binary-coded image data. In the drawing of FIG. 21, the density continuously varies from left to right in the range of 0% to 100% along the width of the image.

The comparison between the printing result of FIG. 21 and those of FIGS. 16 and 20 clearly shows that the method of switching the error distribution window applied for the distribution of the error 'e' according to the values of the image data prior to the binary coding and the binary-coded image data effectively prevents textures from occurring in the area WL close to the density of 20% and the area WH close to the density of 80%. The comparison between the printing result of FIG. 21 and that of FIG. 67 by the conventional process clearly shows that the quality of picture can be maintained even in a relatively low-density area of 0% to 3% and in a relatively high-density area of 97% to 100%.

The image data binary device of the second embodiment is discussed in a greater detail based on the drawings of FIGS. 11 and 12.

In case that P is the pixel of interest in the embodiment of FIG. 11, the adder 22 receives multi-valued image data regarding the pixel P. The multi-valued image data is, for example, 8-bit data and may take any value of 0 to 255 as the tone value.

The error data $\Sigma e_P$ distributed from the binary-coded peripheral pixels and accumulated for the pixel of interest P is read from the error memory 20 and inputted into the adder 22. After the error data $\Sigma e_P$ is readout, the value of the error data $\Sigma e_P$ accumulated in the error memory 20 is initialized to zero.

As discussed previously, the error distribution window selection circuit 32 has the two available error distribution windows of FIGS. 13(b) and 13(c) that have been set in advance.

When the program enters the image data binary coding routine of FIG. 12, a correction process is first carried out at step S30. Namely the adder 22 adds the error data to the input multi-valued image data regarding the pixel of interest P, so as to correct the multi-valued image data for the pixel of interest P.

In a binary coding process executed at step S32, the comparator 24 receives the corrected multi-valued image data from the adder 22, compares the corrected multi-valued image data with a separately input reference value, and outputs one-bit data or binary image data based on the results of comparison. The value '128' that is an intermediate value between the value '0' and the value '255' is used as the reference value. The comparator 24 outputs the value '1' when the value of the corrected multi-valued image data outputted from the adder 22 is equal to or greater than the reference value '128'. The comparator outputs the value '0', on the other hand, when the value of the corrected multi-valued image data is smaller than the reference value '128'. This process binary codes the corrected multi-valued image data outputted from the adder 22.

The bit converter 28 converts the one-bit binary image data outputted from the comparator 24 to 8-bit binary image data. When the value of the image data outputted from the comparator 24 is equal to '0', the bit converter 28 outputs data of the value '0' as the 8-bit image data. When the value of the image data outputted from the comparator 24 is equal to '1', on the contrary, the bit converter 28 outputs data of the value '255' as the 8-bit image data.

In an error calculation process executed at step S34, the subtracter 26 receives the corrected multi-valued image data (image data before the binary coding) outputted from the adder 22 and the image data (image data after the binary coding) outputted from the bit converter 28, subtracts the image data after the binary coding from the image data before the binary coding, and calculates the error 'e' arising in the process of binary coding the multi-valued image data for the pixel of interest P.

In an error distribution window selecting process executed at step S36, the error distribution window selection circuit 32 receives the multi-valued image data regarding the pixel of interest P as well as the binary-coded image data for the pixel of interest P outputted from the comparator 24, selects one of the two available error distribution windows according to the values of the input image data (that is, the tone values), and outputs an identification code representing the selected error distribution window as control data to the error distribution circuit 30. In accordance with a concrete procedure, the error distribution window selection circuit 32 outputs the control data '1' only when the image data prior to the binary coding has the value of '0' to '13' and the binary-coded image data has the value '1' or when the image data prior to the binary coding has the value of '242' to '255' and the binary-coded image data has the value '0'. Otherwise, the error distribution window selection circuit 32 outputs the control data '0'.

In an error distribution process executed at subsequent step S38, the error distribution circuit 30 distributes the error 'e' obtained by the subtracter 26 into the pixels which are located in the vicinity of the pixel of interest P and have not yet undergone the binary coding. In accordance with a concrete procedure, the error distribution circuit 30 receives the control data from the error distribution window selection circuit 32, actually selects one of the two available error distribution windows based on the input control data, and distributes the error 'e' in accordance with the selected error distribution window. An error accumulation process executed at step S40 then accumulates the distributed errors into the error memory 20 as error data for each pixel.

In case that the error distribution window selection circuit 32 outputs the control data '1', the error 'e' is distributed into the eight pixels A, B, C, D, E, F, G, and H in the vicinity of the pixel of interest P as shown in FIG. 13(b). In accordance with a concrete procedure, the error distribution circuit 30 multiplies the error 'e' by predetermined coefficients corresponding to the pixels A, B, C, D, E, F, G, and H, for example, those shown in Equations (5) given above, and adds the results of operations $e_A$, $e_B$, $e_C$, $e_D$, $e_E$, $e_F$, $e_G$, and $e_H$ to error data $\Sigma e_A$, $\Sigma e_B$, $\Sigma e_C$, $\Sigma e_D$, $\Sigma e_E$, $\Sigma e_F$, $\Sigma e_G$, and $\Sigma e_H$ for the pixels A, B, C, D, E, F, G, and H accumulated in the error memory 20, so as to update the values of the respective error data $\Sigma e_A$, $\Sigma e_B$, $\Sigma e_C$, $\Sigma e_D$, $e_E$, $\Sigma e_F$, $\Sigma e_G$, and $e_H$.

In case that the error distribution window selection circuit 32 outputs the control data '0', on the other hand, the error 'e' is distributed into the less number of pixels, that is, into the four pixels A, C, D, and E in the vicinity of the pixel of interest P as shown in FIG. 13(c). In accordance with a concrete procedure, the error distribution circuit 30 multiplies the error 'e' by predetermined coefficients corresponding to the pixels A, C, D, and E, for example, those shown in Equations (6) given above, and adds the results of operations $e_A$, $e_C$, $e_D$, and $e_E$ to error data $\Sigma e_A$, $\Sigma e_C$, $\Sigma e_D$, and $\Sigma e_E$ for the pixels A, C, D, and E accumulated in the error memory 20, so as to update the values of the respective error data $\Sigma e_A$, $\Sigma e_C$, $\Sigma e_D$, and $\Sigma e_E$.

After the series of processes are concluded for the pixel of interest P, the target of the binary coding shifts from the pixel P to the next pixel A and the same processes are repeated for the next pixel of interest A.

Figure 22:
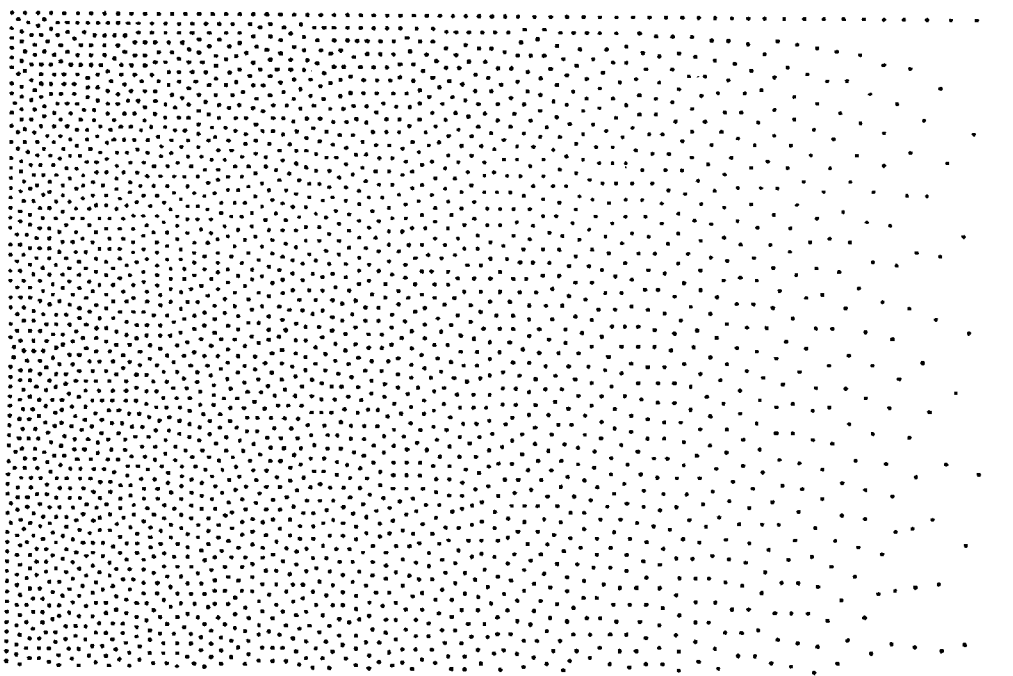
FIG. 22 shows the printing result with a printer for a low-density area of 0% to 10% when the image data binary device of FIG. 11 is applied.
Figure 23:
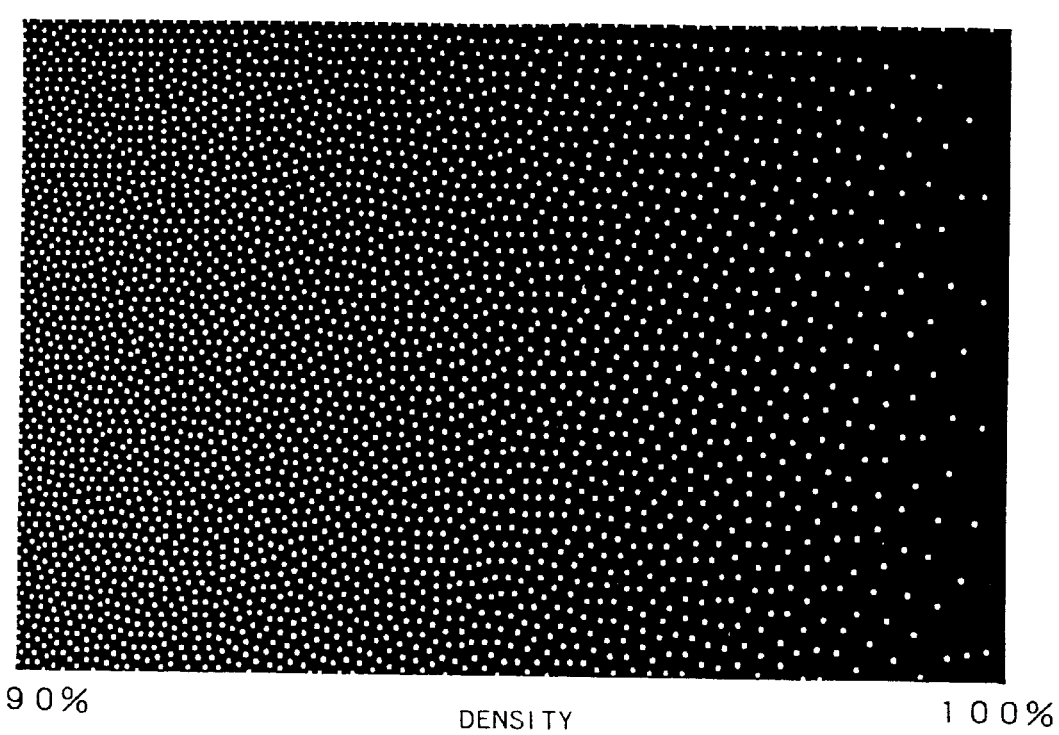
FIG. 23 shows the printing result with a printer for a high-density area of 90% to 100% when the image data binary device of FIG. 11 is applied.

FIGS. 22 and 23 respectively show the results of printing with a printer when the image data binary device of FIG. 11 is applied. FIG. 22 shows the printing result for a low-density area of 0% to 10%, whereas FIG. 23 shows the printing result for a high-density area of 90% to 100%. In these drawings, the density continuously varies in the respective ranges along the width of the image.

The process of the embodiment enables black dots to be dispersed in a substantially homogeneous manner in the relatively low-density area of 0% to 3% as shown in FIG. 22. Unlike the result by the conventional process, black dots are not arranged as dotted lines. Similarly, the process of the embodiment allows white dots to be dispersed in a substantially homogeneous manner in the relatively high-density area of 97% to 100% as shown in FIG. 23. Unlike the result by the conventional process, white dots are not arranged as dotted lines.

As discussed above, the structure of the second embodiment carries out the distribution of the error 'e' in accordance with the error distribution window shown in FIG. 13(b) only when the binary-coded image data has the value '1' in a relatively low-density area or has the value '0' in a relatively high-density area. This effectively prevents black dots or white dots from being arranged in dotted lines as often observed in the printing result by the conventional process, thereby maintaining the quality of picture in both the relatively low-density area and the relatively high-density area. The error 'e' is distributed in accordance with the error distribution window shown in FIG. 13(c) in the intermediate-density area. This effectively prevents textures from occurring in the area close to the density of 20% or the area close to the density of 80%.

The processing time is lengthened when the error 'e' is distributed into the eight pixels. Since the probability (that is, the frequency of occurrence) that the binary-coded image data has the value '1' in a relatively low-density area or has the value '0' in a relatively high-density area is not greater than $\frac{1}{20}$, however, the actual increase in processing time is insignificant.

In the second embodiment discussed above, the two error distribution windows are switched and applied for the distribution of the error, corresponding to the three density areas and the binary-coded image data regarding the pixel of interest. A better printing result can be obtained, however, by dividing the density range into a greater number of areas and carrying out the distribution of the error in accordance with error distribution windows appropriately selected corresponding to the respective density areas and the binary-coded image data regarding the pixel of interest.

As an extreme example, it is possible to set appropriate error distribution windows corresponding to all the tone values (ranging from 0 to 255) and the binary-coded image data for the pixel of interest. In this case, the error distribution window selection circuit 32 can be omitted from the structure of FIG. 11, and the image data prior to the binary processing and the binary-coded image data for the pixel of interest directly control the error distribution circuit 30. Under such conditions, the error distribution process executed at step S38 can be skipped for the pixels having the distribution ratio of equal to zero.

In order to increase the speed of the binary coding process, it is accordingly essential to decrease the number of pixels having the distribution ratio of not equal to zero to such an extent that does not damage the quality of the recorded image and reduce the window size.

In the second embodiment discussed above, one of the two available error distribution windows is selected according to the values of the image data for the pixel of interest before and after the binary coding. As another possible structure, the appropriate error distribution window may be selected according to the image data which has undergone the filtering process.

Figure 24:
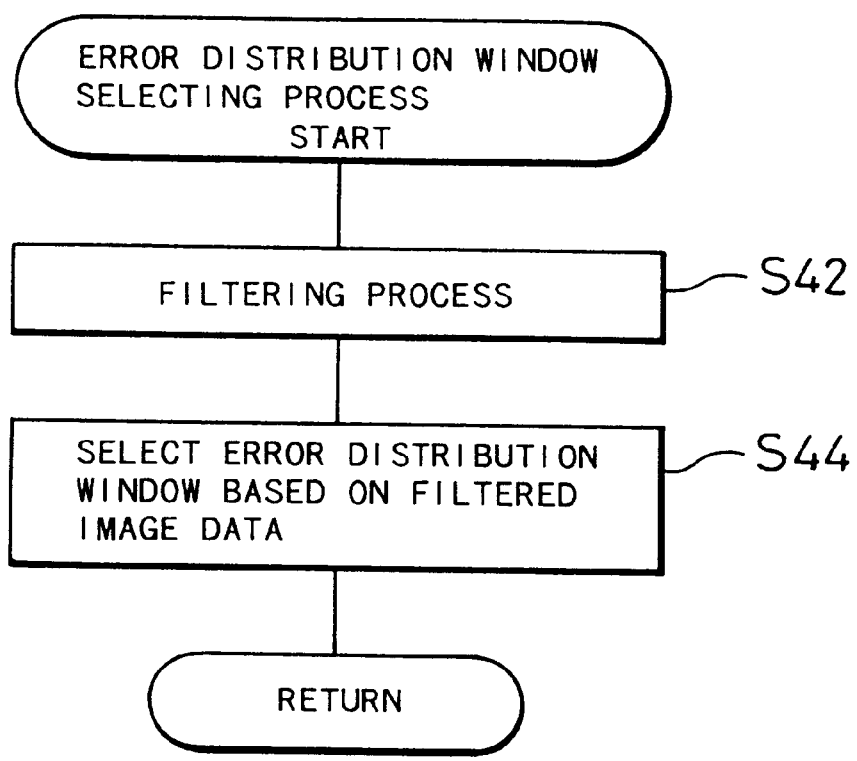
FIG. 24 is a flowchart showing another error distribution window selecting process that may be executed at step S36 in the flowchart of FIG. 12.

FIG. 24 is a flowchart showing another error distribution window selecting process that may be executed at step S36 in the flowchart of FIG. 12. When the program enters the routine of FIG. 24, a filtering process is carried out for the image data regarding the pixel of interest prior to the binary coding (that is, the multi-valued image data) at step S42, and one among a plurality of available error distribution windows is selected at step S44 according to the filtered image data (that is, a filtered signal value) and the binary-coded image data. This method can effectively prevent a turbulence of the recorded image due to an abrupt change in characteristics of the error distribution window in the image plane.

In this modified structure, a filtering process circuit is disposed before the error distribution window selection circuit 32 in the drawing of FIG. 11. The filtering process circuit carries out the filtering process for the multi-valued image data regarding the pixel of interest and outputs the filtered multi-valued image data to the error distribution window selection circuit 32.

Figure 25:
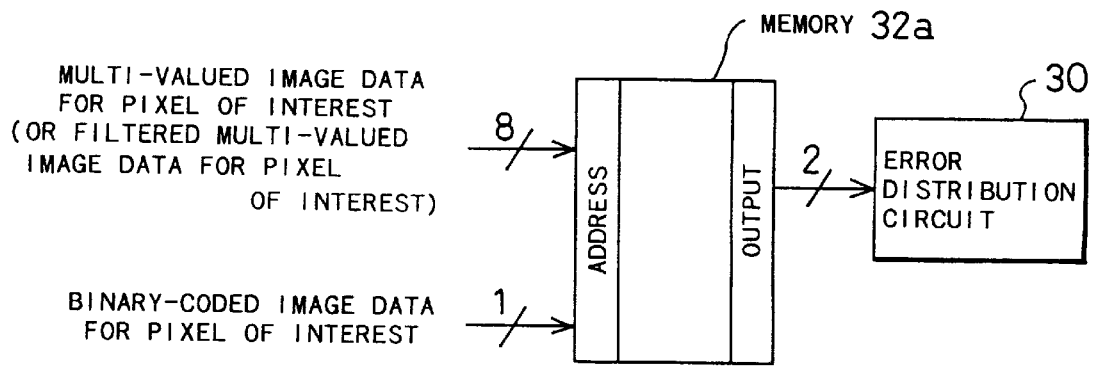
FIG. 25 is a block diagram illustrating a memory included in the error distribution window selection circuit 32 of FIG. 11.

FIG. 25 is a block diagram illustrating a memory included in the error distribution window selection circuit 32 of FIG. 11. Referring to FIG. 25, the error distribution window selection circuit 32 has a memory 32a that receives, as address inputs, the multi-valued image data or the filtered multi-valued image data for the pixel of interest prior to the binary coding and the binary-coded image data for the pixel of interest and stores at the respective addresses, identification codes representing error distribution windows selected corresponding to these image data.

Figure 26:
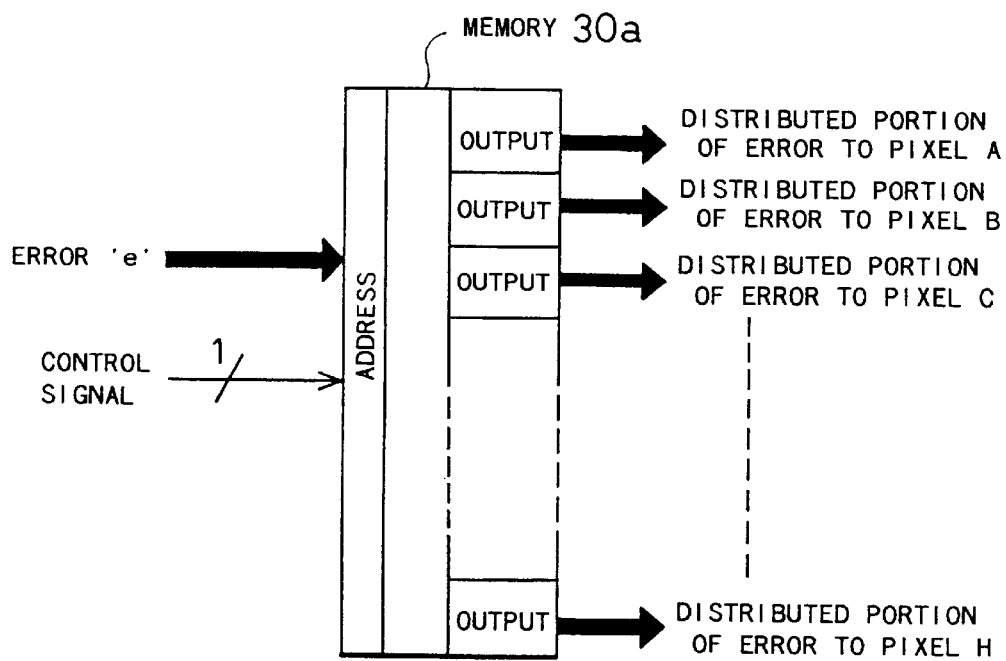
FIG. 26 is a block diagram illustrating a memory included in the error distribution circuit 30 of FIG. 11.

FIG. 26 is a block diagram illustrating a memory included in the error distribution circuit 30 of FIG. 11. Referring to FIG. 26, the error distribution circuit 30 has a memory 30a that receives, as address inputs, an identification code representing the selected error distribution window and an error arising in the course of binary coding the pixel of interest and stores at the respective addresses, distributed portions of the error (distributed errors) to be distributed into the objective pixels corresponding to these input data.

In the second embodiment, the multi-valued image data that is the target of binary coding process is supplied from an image reading device or an image data storage device, such as a CD-ROM. The binary-coded image data is recorded with an ink jet printer, a thermal transfer printer, or the like.

The black dots or white dots are dispersed in a substantially homogeneous manner in this embodiment for the same reason given in the first embodiment, by referring to FIGS. 9 and 10.

Figure 27:
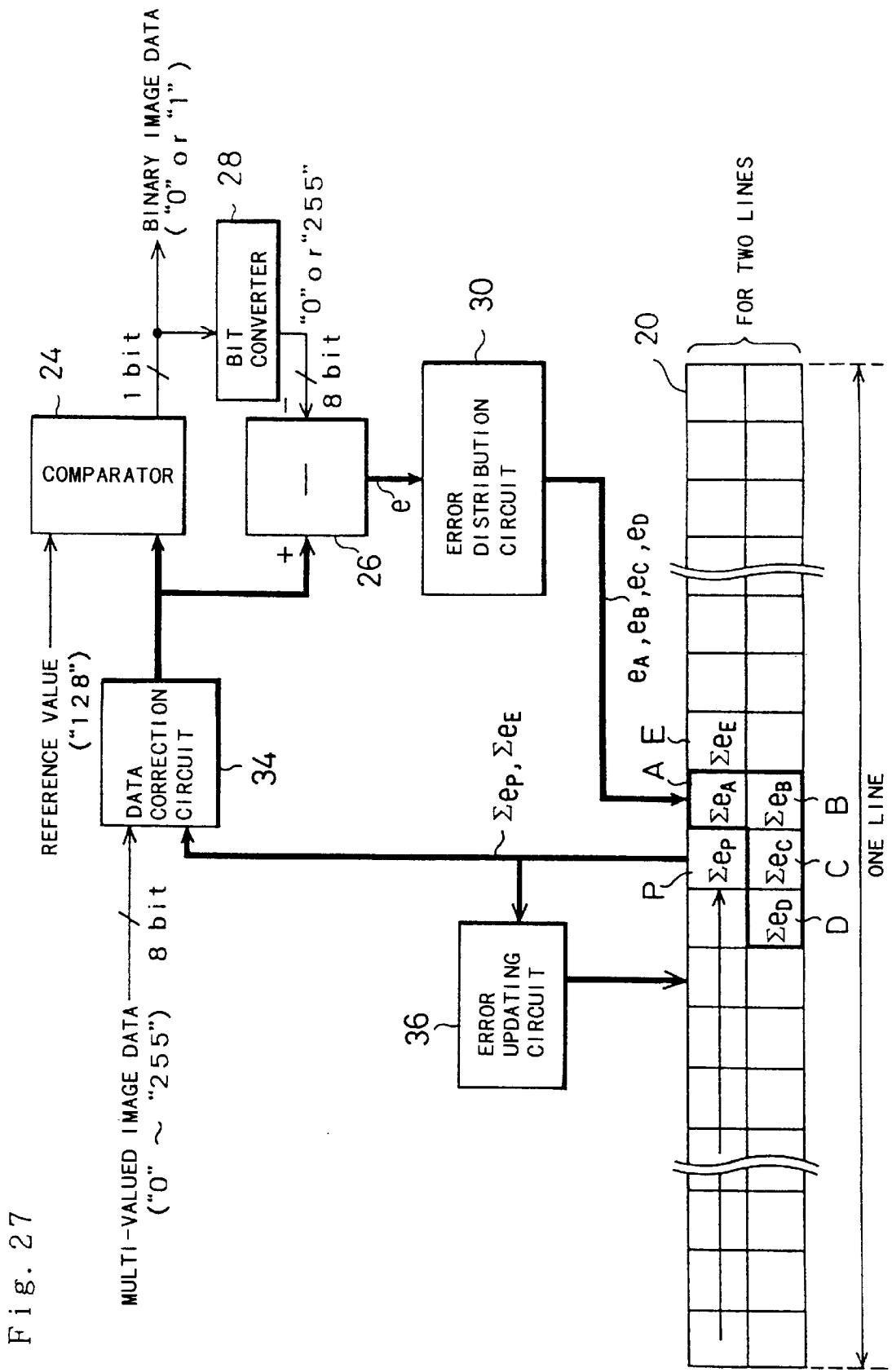
FIG. 27 is a block diagram illustrating still another image data binary device as a third embodiment according to the present invention.

FIG. 27 is a block diagram illustrating still another image data binary device as a third embodiment according to the present invention. Referring to FIG. 27, the image data binary device of the third embodiment includes an error memory 20, a comparator 24, a subtracter 26, a bit converter 28, an error distribution circuit 30, a data correction circuit 34, and an error updating circuit 36.

Figure 28:
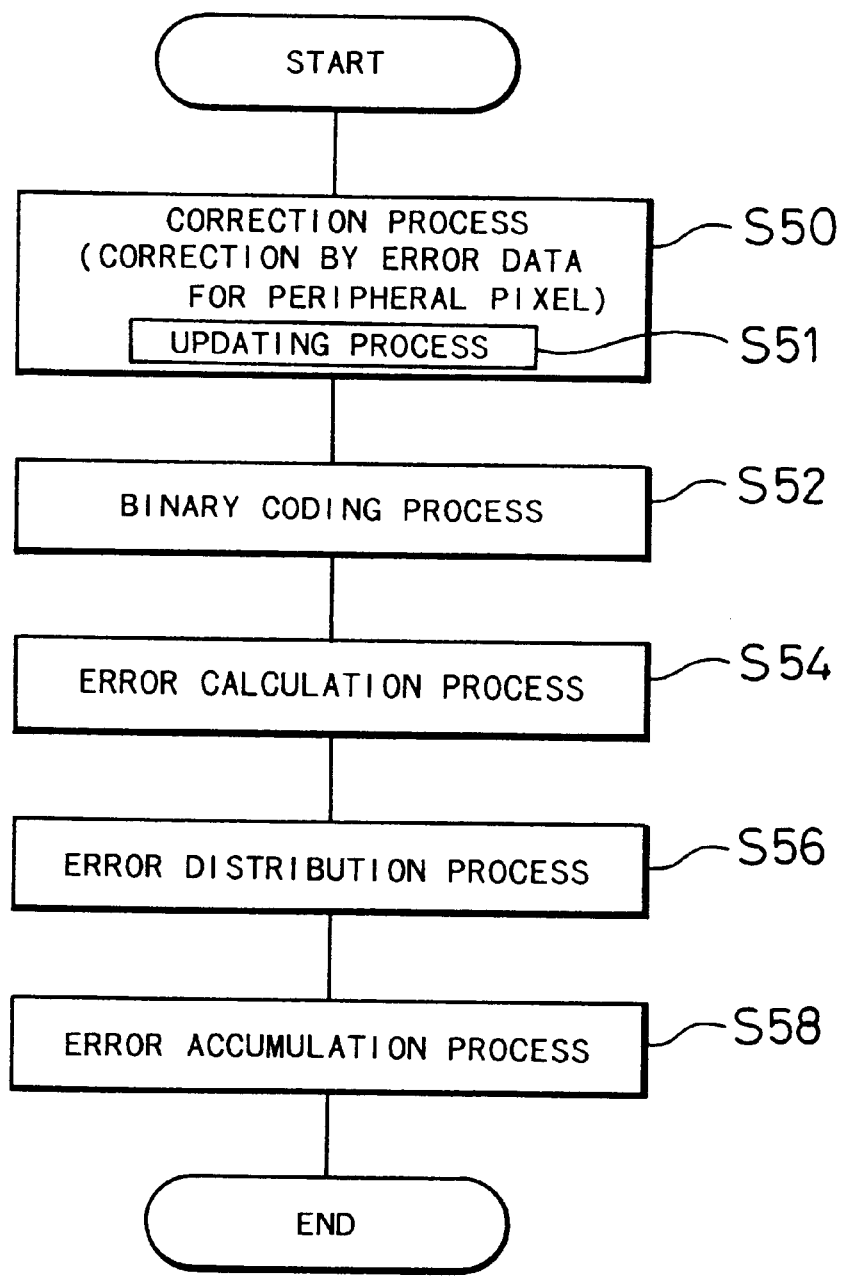
FIG. 28 is a flowchart showing an image data binary coding routine executed by the image data binary device of FIG. 27.

FIG. 28 is a flowchart showing an image data binary coding routine executed by the image data binary device of FIG. 27.

Figure 29A:
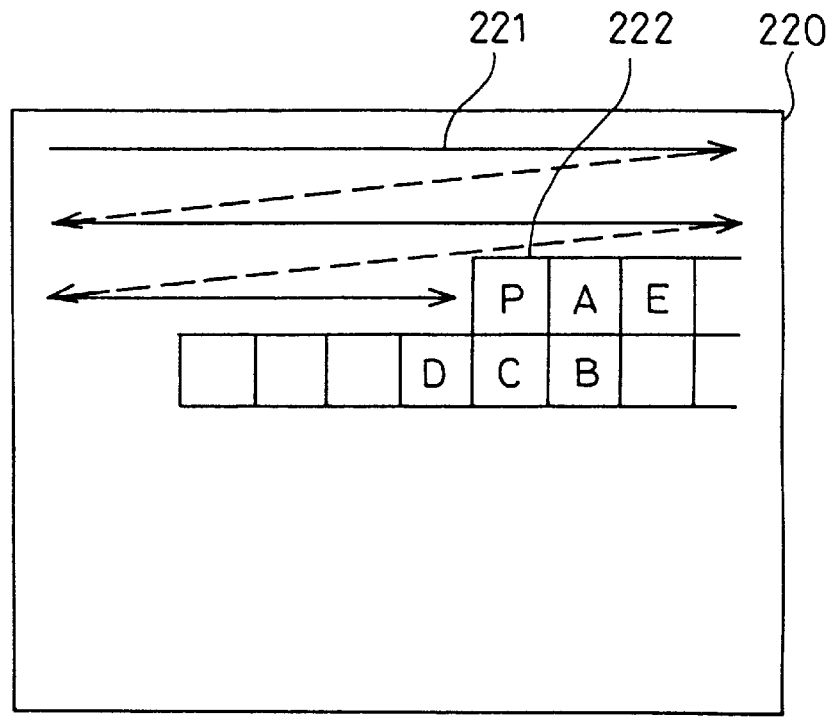
FIGS. 29(a) through 29(c) show an error diffusion process applied for the third embodiment.
Figure 29B:
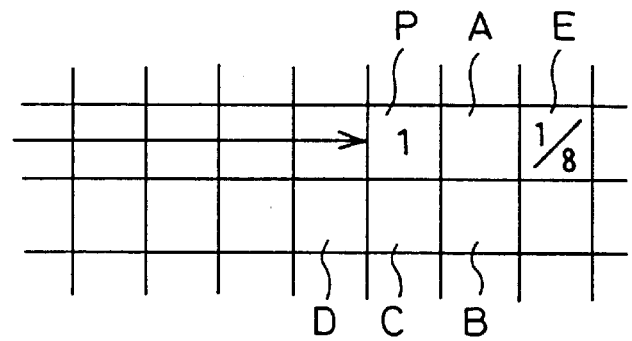
Figure 29C:
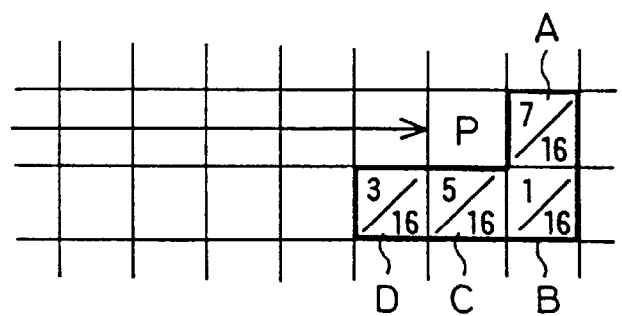

Prior to the description of the image data binary device shown in FIG. 27, the processing executed in the third embodiment is described briefly. FIGS. 29(a) through 29(c) show an error diffusion process applied for the third embodiment. In the drawing of FIG. 29(a), the procedure of binary coding pixels 222 included in an image 220 is carried out in an order specified by an arrow 221.

In the third embodiment, before multi-valued image data regarding a target pixel of binary coding or pixel of interest P undergoes the binary coding process, the multi-valued image data is corrected by adding error data $\Sigma e_P$ accumulated for the pixel of interest P and part of the error data accumulated for a pixel that is located in the vicinity of the pixel of interest P and has not yet undergone the binary coding process to the multi-valued image data for the pixel of interest P.

In accordance with a concrete procedure, a pixel E is selected as a pixel that is located in the vicinity of the pixel of interest P and has not yet undergone the binary coding process, as shown in FIG. 29(b). The whole value of error data $\Sigma e_P$ accumulated for the pixel of interest P and one eighth the value of error data $\Sigma e_E$ accumulated for the pixel E are added to the multi-valued image data regarding the pixel of interest P.

When X represents the value of the multi-valued image data regarding the pixel of interest P, a value X" of corrected multi-valued image data is given as:

$$X''=X+\Sigma e_P+\tfrac{1}{8}\Sigma e_E \qquad (7)$$

After the correction is completed for the multi-valued image data regarding the pixel of interest P, the values of the error data accumulated for the pixels P and E in the error memory 20 are updated in accordance with the following Equations (8):

$$\Sigma e_P \rightarrow 0$$
$$\Sigma e_E \rightarrow \tfrac{7}{8}\Sigma e_E \qquad (8)$$

The value X" of corrected multi-valued image data is then compared with a predetermined threshold value (for example, 128), so that the multi-valued image data regarding the pixel of interest P is binary coded. When Y (0 or 255) represents a value of binary-coded image data, an error 'e' arising by binary coding the multi-valued image data for the pixel of interest P is expressed as:

$$e=X''-Y \qquad (9)$$

The value of the error 'e' is then distributed at a predetermined ratio (ratio of error distribution) to pixels A, B, C, and D that are located in the vicinity of the pixel of interest P and have not yet undergone the binary coding process as shown in FIG. 29(c).

The errors distributed to the pixels prior to the binary coding are accumulated as error data for each pixel in the error memory 20.

The following describes the processes carried out in the image data binary device shown in FIG. 27, based on the drawings.

In case that P is the pixel of interest in the embodiment of FIG. 27, the data correction circuit 34 receives multi-valued image data regarding the pixel P. The multi-valued image data is, for example, 8-bit data and may take any value of 0 to 255 as the tone value.

The error data $\Sigma e_P$ distributed from the binary-coded peripheral pixels and accumulated for the pixel of interest P and the error data $\Sigma e_E$ distributed from the binary-coded peripheral pixels and accumulated for the pixel E are read from the error memory 20 and also inputted into the data correction circuit 34.

When the program enters the routine of FIG. 28, the data correction circuit 34 carries out a correction process at step S50. Namely, the data correction circuit 34 corrects the input multi-valued image data for the pixel of interest P by adding the error data $\Sigma e_P$ accumulated for the pixel of interest P and part of the error data $\Sigma e_E$ accumulated for the pixel E, that is, $\tfrac{1}{8}\Sigma e_E$, to the multi-valued image data.

When the error data $\Sigma e_P$ and $\Sigma e_E$ are read out, the error updating circuit 36 updates the error data $\Sigma e_P$ and $\Sigma e_E$ stored in the error memory 20 respectively to 0 and $\tfrac{7}{8}\Sigma e_E$ according to Equations (8) given above at step S51.

In a binary coding process executed at step S52, the comparator 24 receives the corrected multi-valued image data from the data correction circuit 34, compares the corrected multi-valued image data with a separately input reference value, and outputs one-bit data or binary image data based on the results of comparison. The value '128' that is an intermediate value between the value '0' and the value '255' is used as the reference value. The comparator 24 outputs the value '1' when the value of the corrected multi-valued image data outputted from the data correction circuit 34 is equal to or greater than the reference value '128'. The comparator outputs the value '0', on the other hand, when the value of the corrected multi-valued image data is smaller than the reference value '128'. This process binary codes the corrected multi-valued image data outputted from the data correction circuit 34.

The bit converter 28 converts the one-bit binary image data outputted from the comparator 24 to 8-bit binary image data. When the value of the image data outputted from the comparator 24 is equal to '0', the bit converter 28 outputs data of the value '0' as the 8-bit image data. When the value of the image data outputted from the comparator 24 is equal to '1', on the contrary, the bit converter 28 outputs data of the value '255' as the 8-bit image data.

In an error calculation process executed at step S54, the subtracter 26 receives the corrected multi-valued image data (image data before the binary coding) outputted from the data correction circuit 34 and the image data (image data after the binary coding) outputted from the bit converter 28, subtracts the image data after the binary coding from the image data before the binary coding, and calculates the error 'e' arising in the process of binary coding the multi-valued image data for the pixel of interest P.

In an error distribution process executed at subsequent step S56, the error distribution circuit 30 distributes the error 'e' obtained by the subtracter 26 into the pixels A, B, C, and D, which are located in the vicinity of the pixel of interest P and have not yet undergone the binary coding, as discussed in FIG. 29(c). An error accumulation process executed at step S58 then accumulates the distributed errors into the error memory 20 as error data for each pixel. In accordance with a concrete procedure, the error distribution circuit 30 multiplies the error 'e' by predetermined coefficients corresponding to the pixels A, B, C, and D, for example, those shown in Equations (3) given above, and adds the results of operations $e_A$, $e_B$, $e_C$, and $e_D$ to error data $\Sigma e_A$, $\Sigma e_B$, $\Sigma e_C$, and $\Sigma e_D$, for the pixels A, B, C, and D accumulated in the error memory 20, so as to update the values of the respective error data $\Sigma e_A$, $\Sigma e_B$, $\Sigma e_C$, and $\Sigma e_D$.

After the series of processes are concluded for the pixel of interest P, the target of the binary coding shifts from the pixel P to the next pixel A and the same processes are repeated for the next pixel of interest A.

Figure 30:
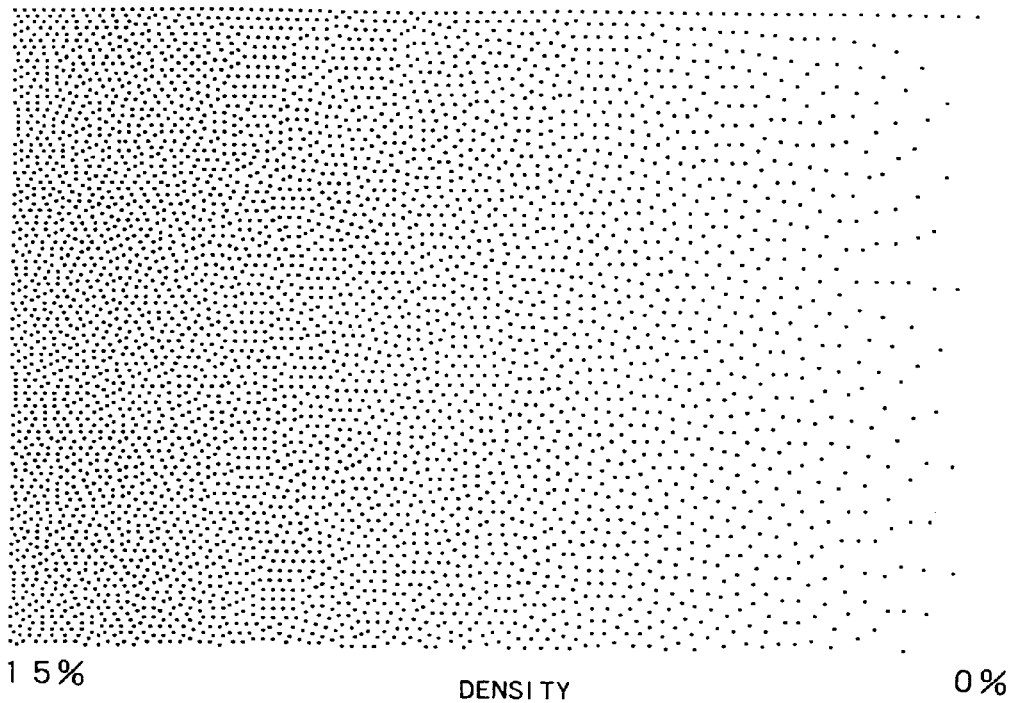
FIG. 30 shows the printing result with a printer for a low-density area of 0% to 15% when the image data binary device of FIG. 27 is applied.
Figure 31:
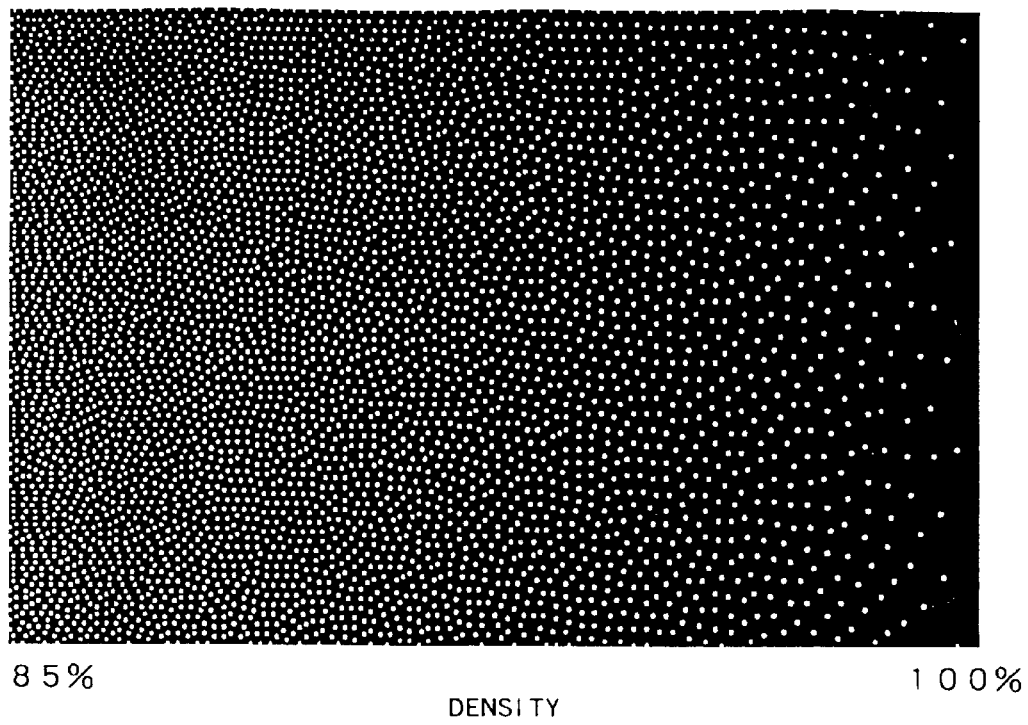
FIG. 31 shows the printing result with a printer for a high-density area of 85% to 100% when the image data binary device of FIG. 27 is applied.

FIGS. 30 and 31 respectively show the results of printing with a printer when the image data binary device of FIG. 27 is applied. FIG. 30 shows the printing result for a low-density area of 0% to 15%, whereas FIG. 31 shows the printing result for a high-density area of 85% to 100%. In these drawings, the density continuously varies in the respective ranges along the width of the image.

Figure 32:
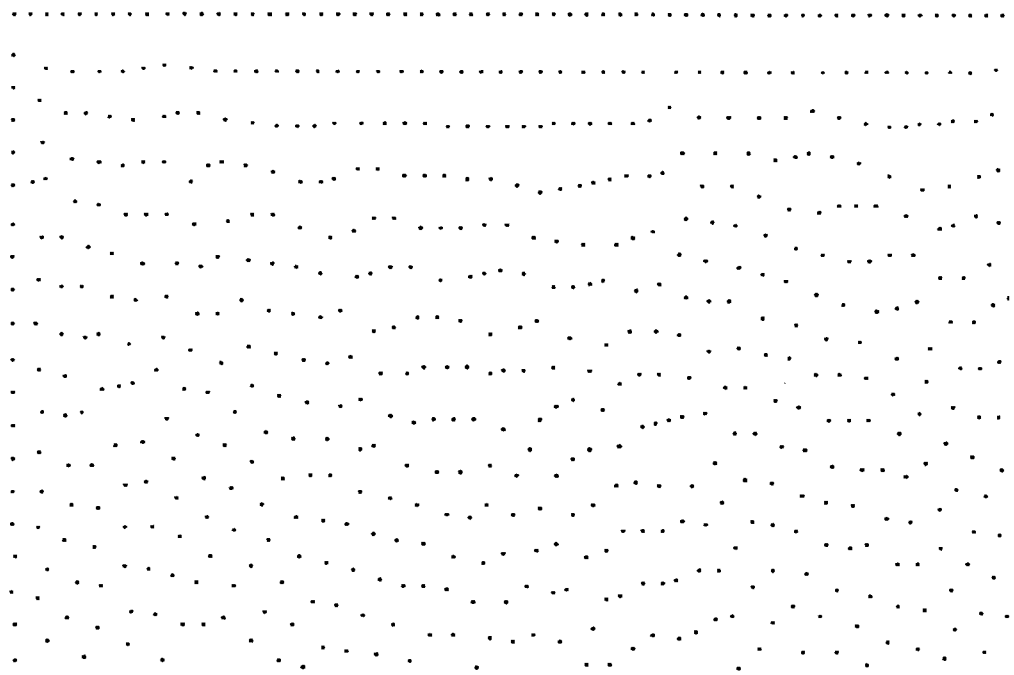
FIG. 32 shows the printing result with a printer for the density of 1% when the image data binary device of FIG. 27 is applied.
Figure 33:
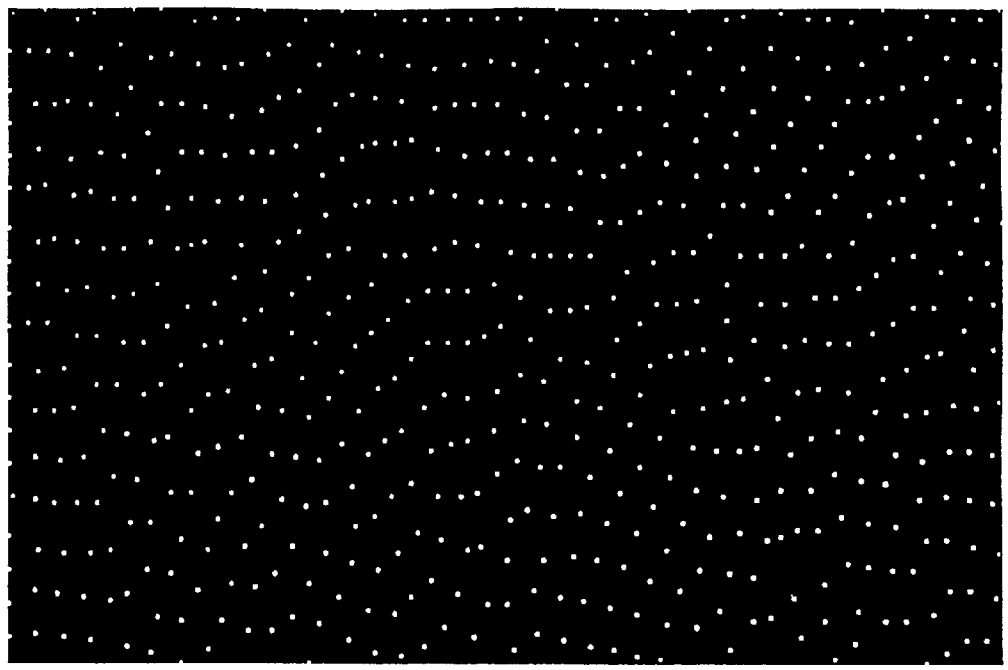
FIG. 33 shows the printing result with a printer for the density of 99% when the image data binary device of FIG. 27 is applied.

FIG. 32 shows the printing result specifically selected for the density of 1% among the low-density area of FIG. 30, and FIG. 33 shows the printing result specifically selected for the density of 99% among the high-density area of FIG. 31. As shown in FIGS. 32 and 33, the structure of the third embodiment enables the black dots and white dots to be arranged in a substantially homogeneous manner, thus remarkably improving the quality of picture.

Figure 34:
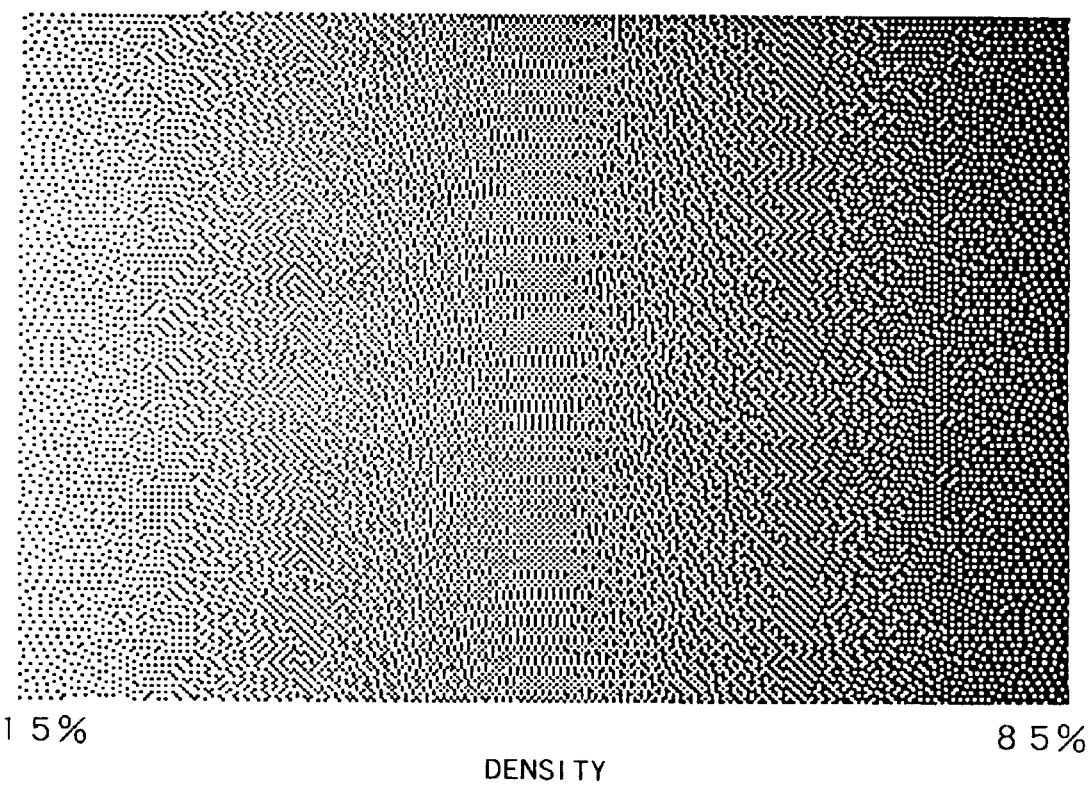
FIG. 34 shows the printing result with a printer for an intermediate-density area of 15% to 85% when the image data binary device of FIG. 27 is applied.
Figure 68:
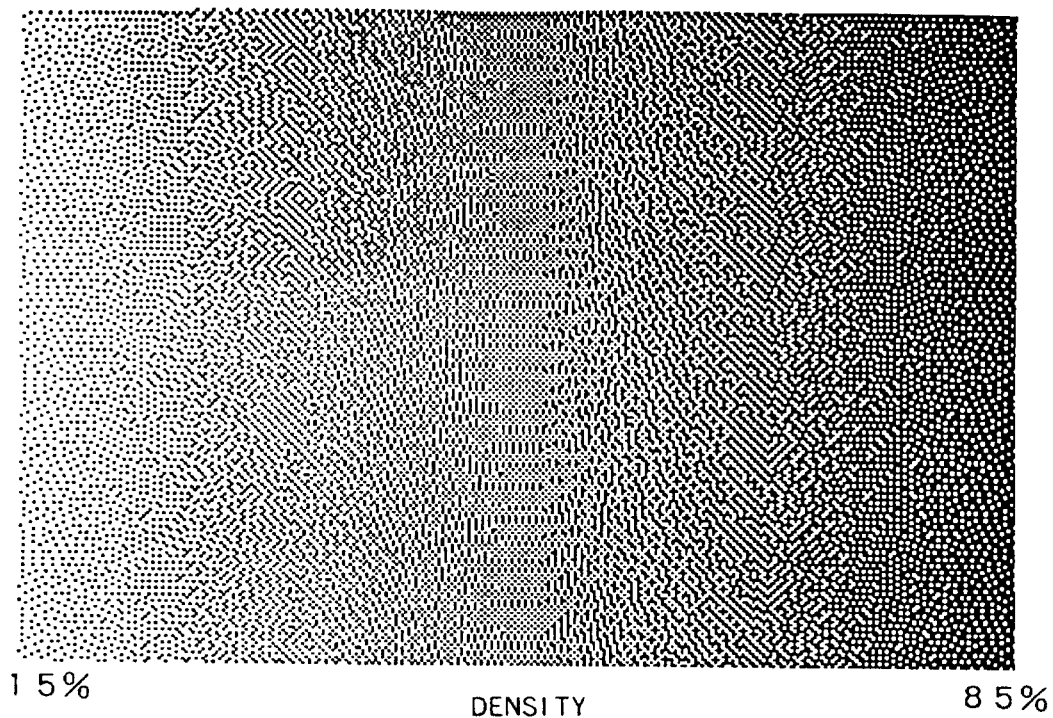
FIG. 68 shows the printing result with a printer for an intermediate-density range of 15% to 85% when the conventional image data binary device is applied.

FIG. 34 shows the printing result with a printer for an intermediate-density area of 15% to 85% when the image data binary device of FIG. 27 is applied. There is no significant difference between the printing result of FIG. 34 by the method of the third embodiment and that of FIG. 68 by the conventional process in this intermediate-density area.

In the third embodiment, the multi-valued image data for the pixel of interest P is corrected by adding a fixed fraction (⅛ in the embodiment) of the error data $\Sigma e_E$ accumulated for the pixel E to the multi-valued image data. The fraction (ratio of addition) can be set suitably corresponding to the multi-valued image data regarding the pixel of interest. This further improves the quality of the binary-coded image and shortens the required time for binary coding.

Figure 35:
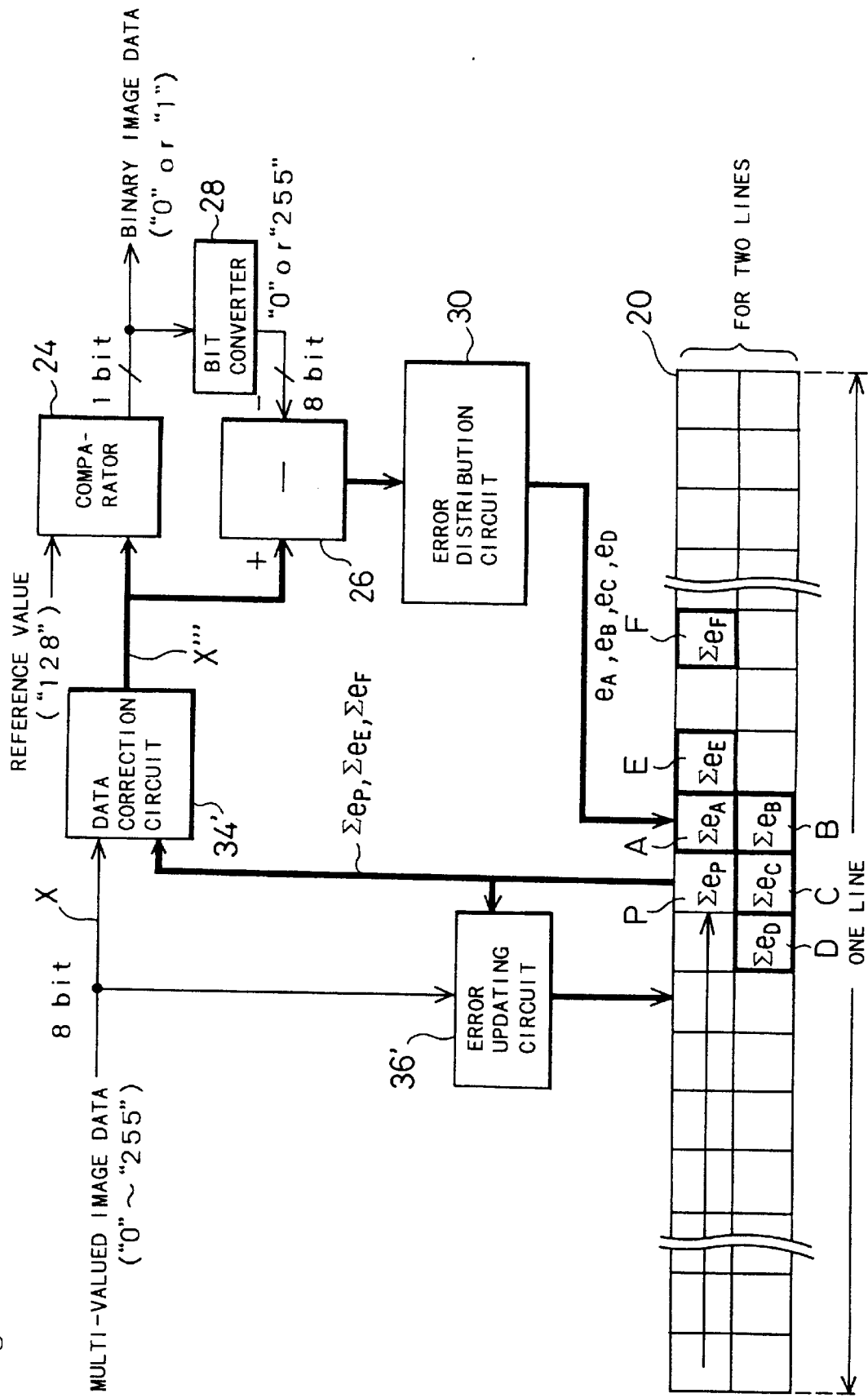
FIG. 35 is a block diagram illustrating another image data binary device as a fourth embodiment according to the present invention.

FIG. 35 is a block diagram illustrating another image data binary device as a fourth embodiment according to the present invention. Referring to FIG. 35, the image data binary device of the fourth embodiment includes a data correction circuit 34' and an error updating circuit 36' in place of the data correction circuit 34 and the error updating circuit 36 included in the image data binary device of the third embodiment shown in FIG. 27.

Prior to the description of the image data binary device shown in FIG. 35, the processing executed in the fourth embodiment is described briefly. FIGS. 36(a) through 36(c) show a method applied for the fourth embodiment to correct the multi-valued image data regarding the pixel of interest P.

In this embodiment, the multi-valued image data for the pixel of interest P is corrected by adding error data $\Sigma e_P$ accumulated for the pixel of interest P, error data $\Sigma e_E$ accumulated for the pixel E, and error data $\Sigma e_F$ accumulated for the pixel F to the multi-valued image data. Ratios of addition $W_E$ and $W_F$ with respect to the error data $\Sigma e_E$ and $\Sigma e_F$ accumulated for the pixels E and F (see FIG. 36(b)) are not fixed but varied according to the value of the multi-valued image data for the pixel of interest P as shown in FIG. 36(c).

A value $X'''$ of corrected multi-valued image data is thus given as below, based on the ratios of addition $W_E$ and $W_F$ corresponding to the value of the multi-valued image data for the pixel of interest P:

$$X''' = X + \Sigma e_P + W_E \Sigma e_E + W_F \Sigma e_F \tag{10}$$

After the correction is completed for the multi-valued image data regarding the pixel of interest P, the values of the error data accumulated for the pixels P, E and F in the error memory 20 are updated in accordance with the following Equations (11):

$$\Sigma e_P \to 0$$

$$\Sigma e_E \to (1-W_E) \cdot \Sigma e_E$$

$$\Sigma e_F \to (1-W_F) \cdot \Sigma e_F \tag{11}$$

Figure 37:
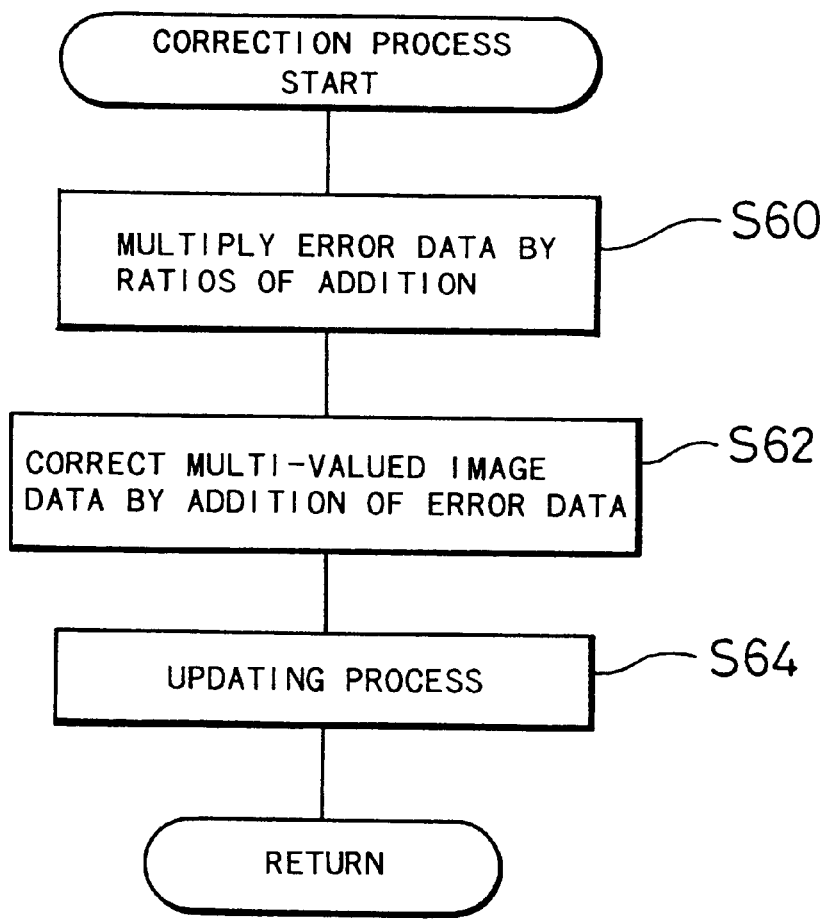
FIG. 37 is a flowchart showing a correction process of the fourth embodiment which can be executed at step S50 in the flowchart of FIG. 28.

The following describes the processes executed by the image data binary device shown in FIG. 35. FIG. 37 is a flowchart showing a correction process of the fourth embodiment which can be executed at step S50 in the flowchart of FIG. 28.

Referring to FIG. 35, the data correction circuit 34' receives multi-valued image data X for the pixel of interest P. The error data $\Sigma e_P$ accumulated for the pixel of interest P, the error data $\Sigma e_E$ accumulated for the pixel E, and the error data $\Sigma e_F$ accumulated for the pixel F are read from the error memory 20 and also inputted into the data correction circuit 34'.

When the program starts the correction process shown in FIG. 37, the data correction circuit 34' first determines the ratios of addition $W_E$ and $W_F$ corresponding to the value X of the multi-valued image data for the pixel of interest P, and multiplies the error data $\Sigma e_E$ accumulated for the pixel E and the error data $\Sigma e_F$ accumulated for the pixel F respectively by the ratios of addition $W_E$ and $W_F$ at step S60.

The multi-valued image data for the pixel of interest P is then corrected according to Equation (10) at step S62 by adding the error data $\Sigma e_P$ accumulated for the pixel of interest P, the product of the ratio of addition $W_E$ and the error data $\Sigma e_E$ accumulated for the pixel E, and the product of the ratio of addition $W_F$ and the error data $\Sigma e_F$ accumulated for the pixel F to the multi-valued image data X for the pixel of interest P.

When the error data $\Sigma e_P$, $\Sigma e_E$, and $\Sigma e_F$ are read out, the error updating circuit 36' updates the error data $\Sigma e_P$, $\Sigma e_E$, and $\Sigma e_F$ stored in the error memory 20 respectively to 0, $(1-W_E)\cdot\Sigma e_E$, and $(1-W_F)\cdot\Sigma e_F$ according to Equations (11) given above at step S64.

The means for obtaining the ratios of addition $W_E$ and $W_F$ corresponding to the value X of the multi-valued image data for the pixel of interest P may be realized in the following manner. By way of example, one method provides a memory that receives the multi-valued image data regarding the pixel of interest P as address inputs and stores the ratios of addition $W_E$ and $W_F$ corresponding to the values X of the multi-valued image data at the respective addresses.

An alternative method provides a memory that receives the multi-valued image data regarding the pixel of interest P and the error data accumulated for the pixels E and F as address inputs and stores the values of corrected multi-valued image data $X+W_E\Sigma e_E+W_F\Sigma e_F$ corresponding to the values X of the multi-valued image data and the values of the error data $\Sigma e_E$ and $\Sigma e_F$ at the respective addresses.

The means for obtaining the updated data $(1-W_E)\cdot\Sigma e_E$ or $(1-W_F)\cdot\Sigma e_F$ in the error updating circuit 36' may be realized in the following manner. By way of example, one method provides a memory that receives the error data accumulated for the pixels E or F as address inputs and stores the values of updated data $(1-W_E)\cdot\Sigma e_E$ or $(1-W_F)\cdot\Sigma e_F$ corresponding to the values of the error data $\Sigma e_E$ or $\Sigma e_F$ at the respective addresses.

The subsequent processes executed in the fourth embodiment are identical with those of the third embodiment shown in the flowchart of FIG. 28.

Figure 38:
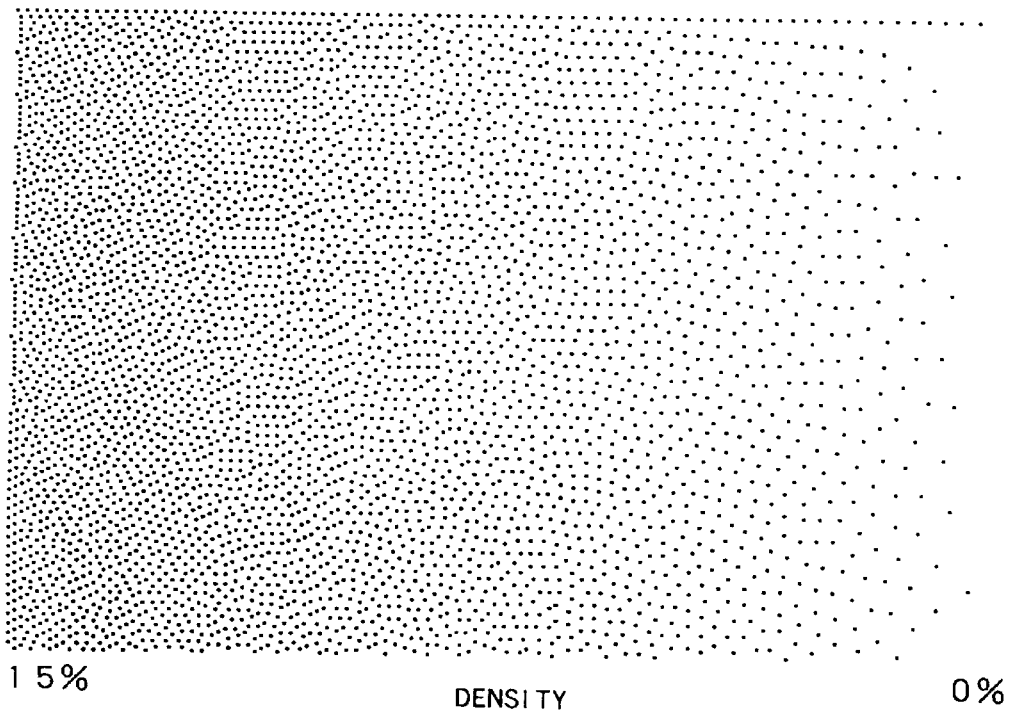
FIG. 38 shows the printing result with a printer for a low-density area of 0% to 15% when the image data binary device of FIG. 35 is applied.
Figure 39:
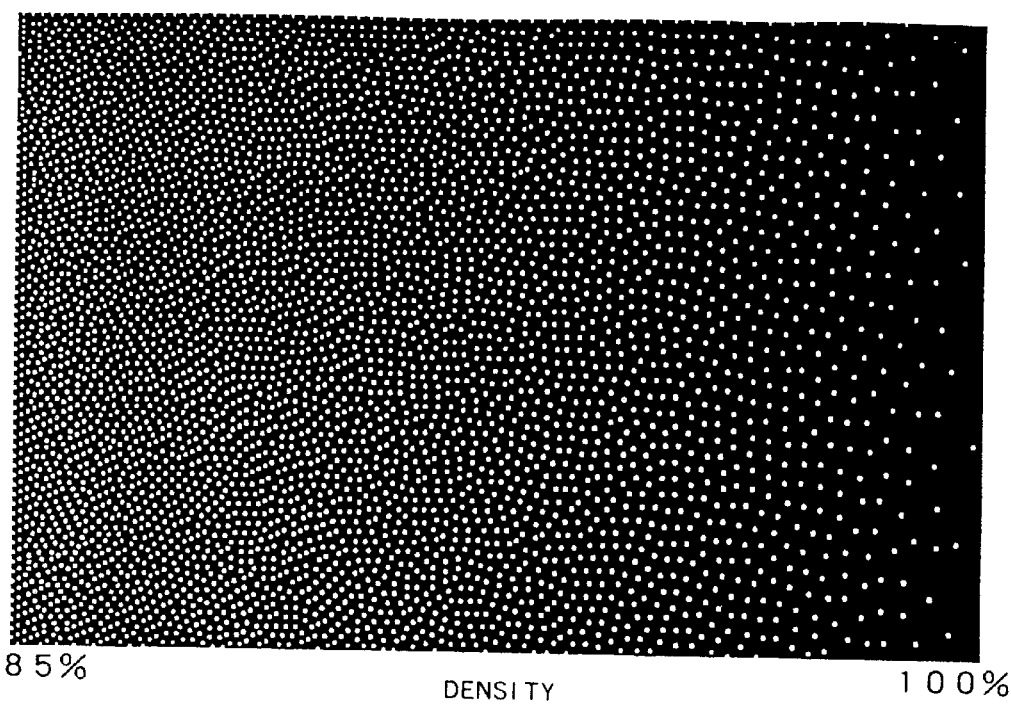
FIG. 39 shows the printing result with a printer for a high-density area of 85% to 100% when the image data binary device of FIG. 35 is applied.

FIGS. 38 and 39 respectively show the results of printing with a printer when the image data binary device of FIG. 35 is applied. FIG. 38 shows the printing result for a low-density area of 0% to 15%, whereas FIG. 39 shows the printing result for a high-density area of 85% to 100%.

Figure 40:
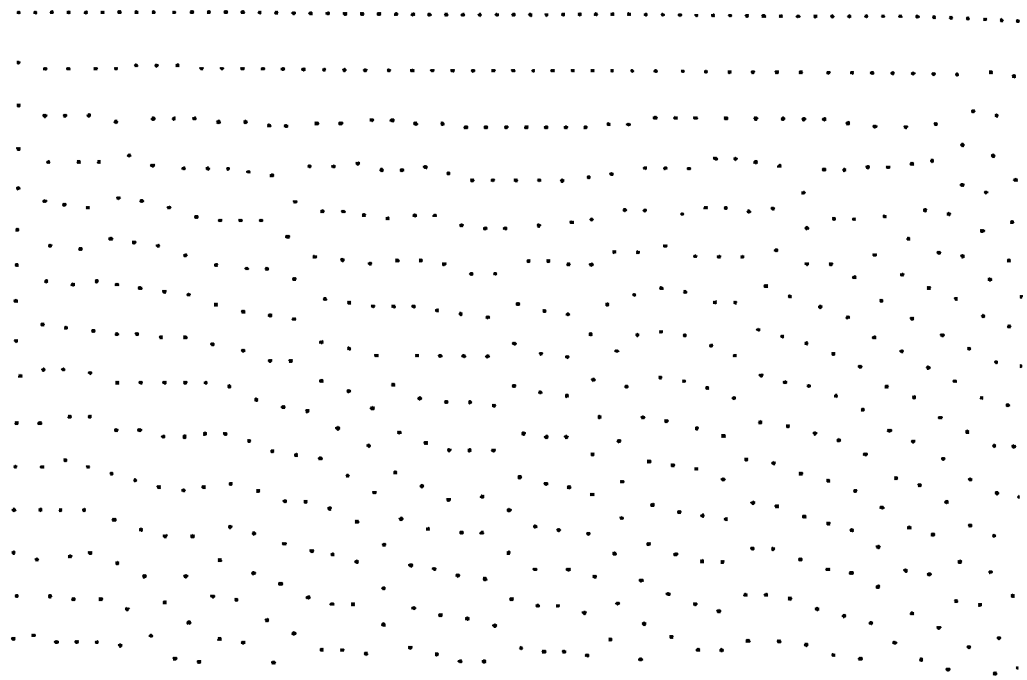
FIG. 40 shows the printing result with a printer for the density of 1% when the image data binary device of FIG. 35 is applied.
Figure 41:
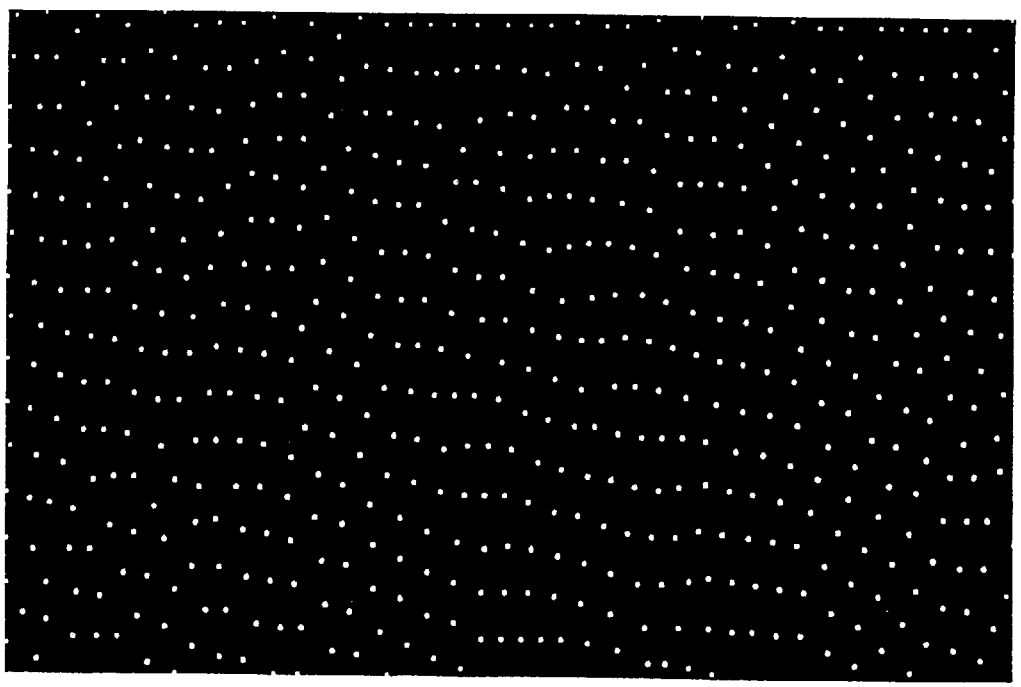
FIG. 41 shows the printing result with a printer for the density of 99% when the image data binary device of FIG. 35 is applied.

FIG. 40 shows the printing result specifically selected for the density of 1% among the low-density area of FIG. 38, and FIG. 41 shows the printing result specifically selected for the density of 99% among the high-density area of FIG. 39.

As shown in FIGS. 40 and 41, the structure of the fourth embodiment enables the black dots and white dots to be arranged in a substantially homogeneous manner, thus remarkably improving the quality of picture.

Compared with the printing result by the method of the third embodiment, the printing result by the method of the fourth embodiment shows a little improvement both in the low-density area of 1% and the high-density area of 99%.

The processing carried out in this embodiment for the density area of 10% to 90% is identical with that in the conventional method, so that there is no significant difference in time required for the binary coding between the method of the fourth embodiment and the conventional method.

Figure 42:
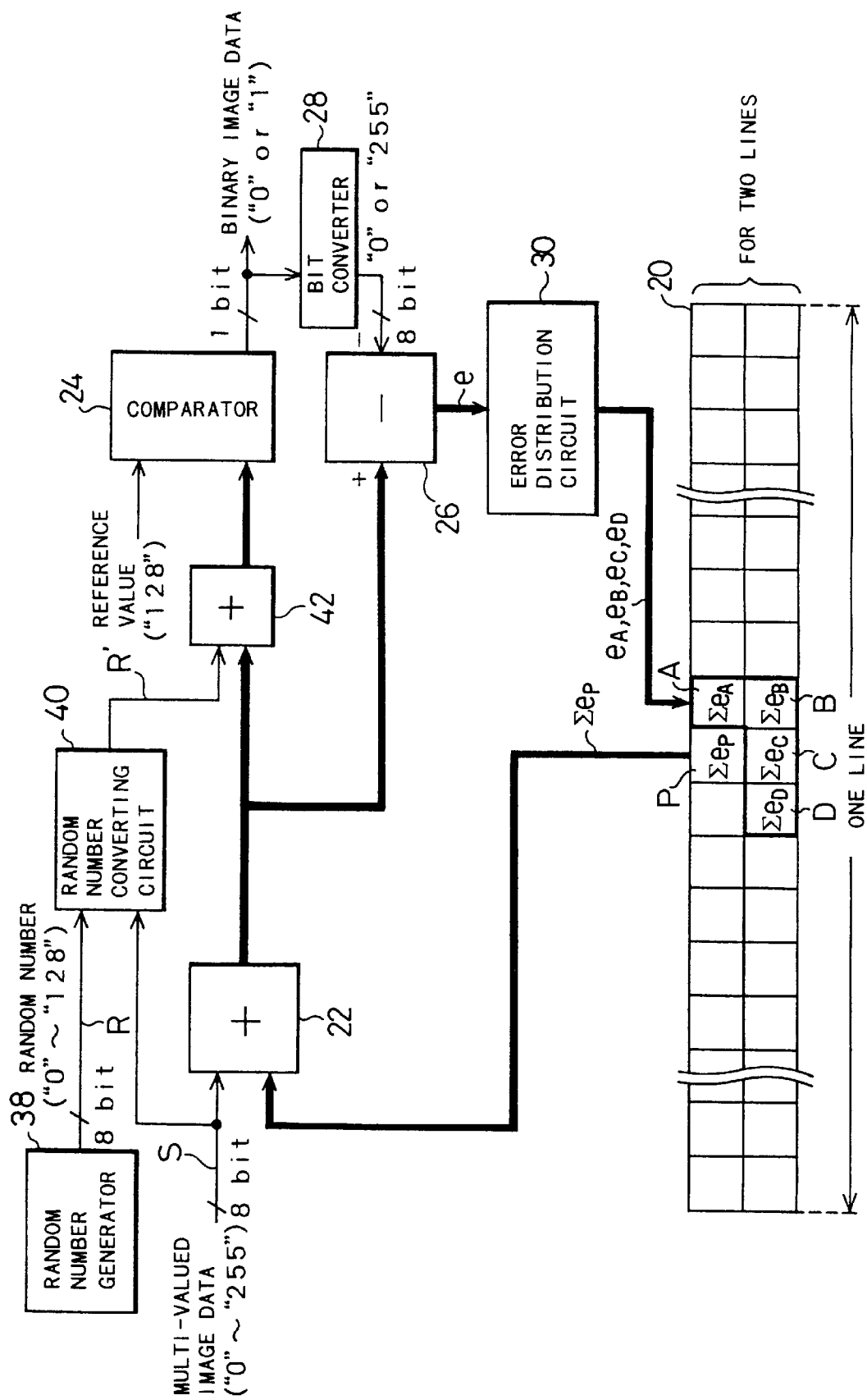
FIG. 42 is a block diagram illustrating an image data binary device as a fifth embodiment according to the present invention.

FIG. 42 is a block diagram illustrating an image data binary device as a fifth embodiment according to the present invention. Referring to FIG. 42, the image data binary device of the fifth embodiment includes an error memory 20, an adder 22, a comparator 24, a subtracter 26, a bit converter 28, an error distribution circuit 30, a random number generator 38, a random number converting circuit 40, and a second adder 42.

Figure 43:
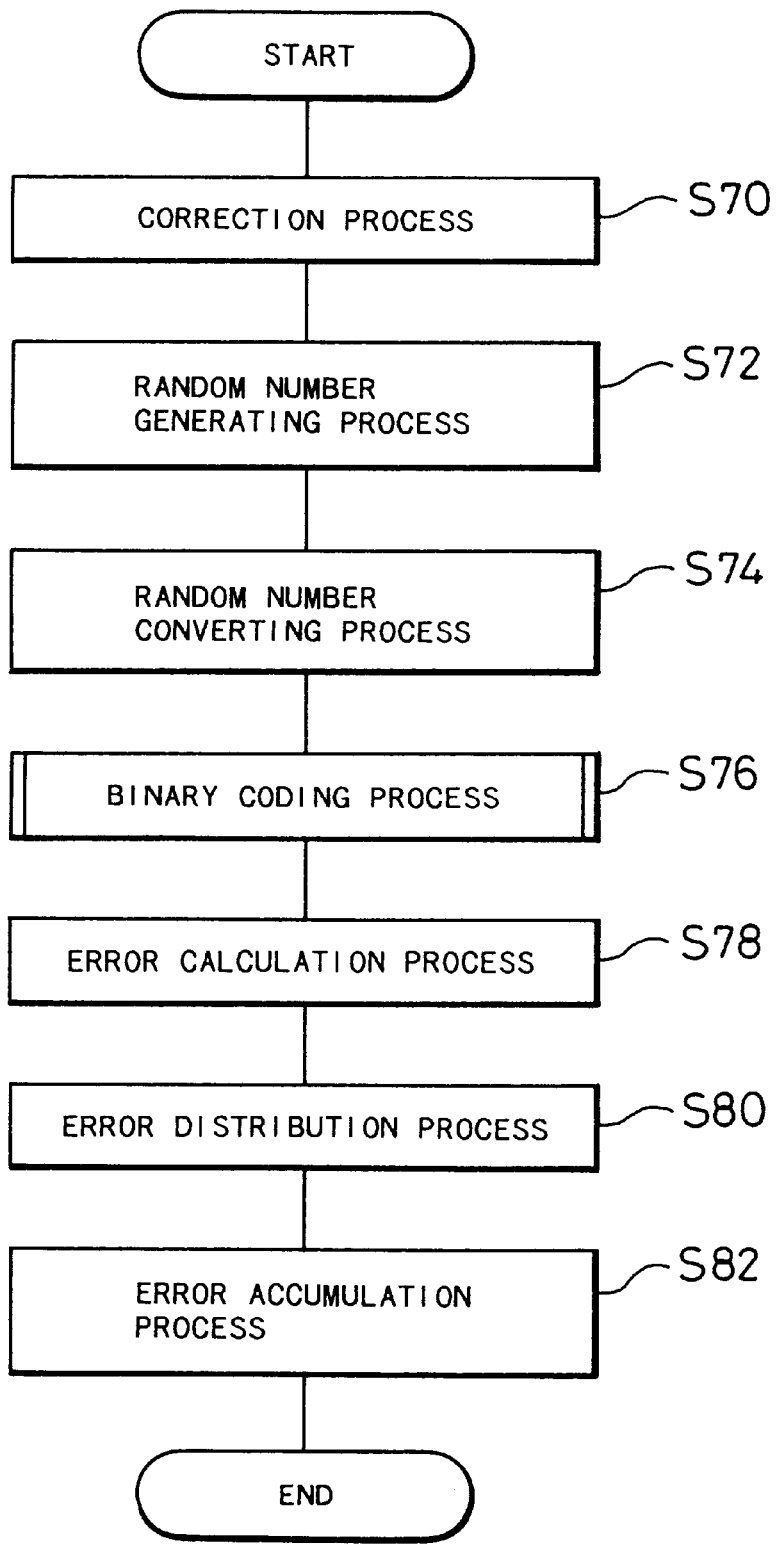
FIG. 43 is a flowchart showing an image data binary coding routine executed by the image data binary device of FIG. 42.
Figure 44:
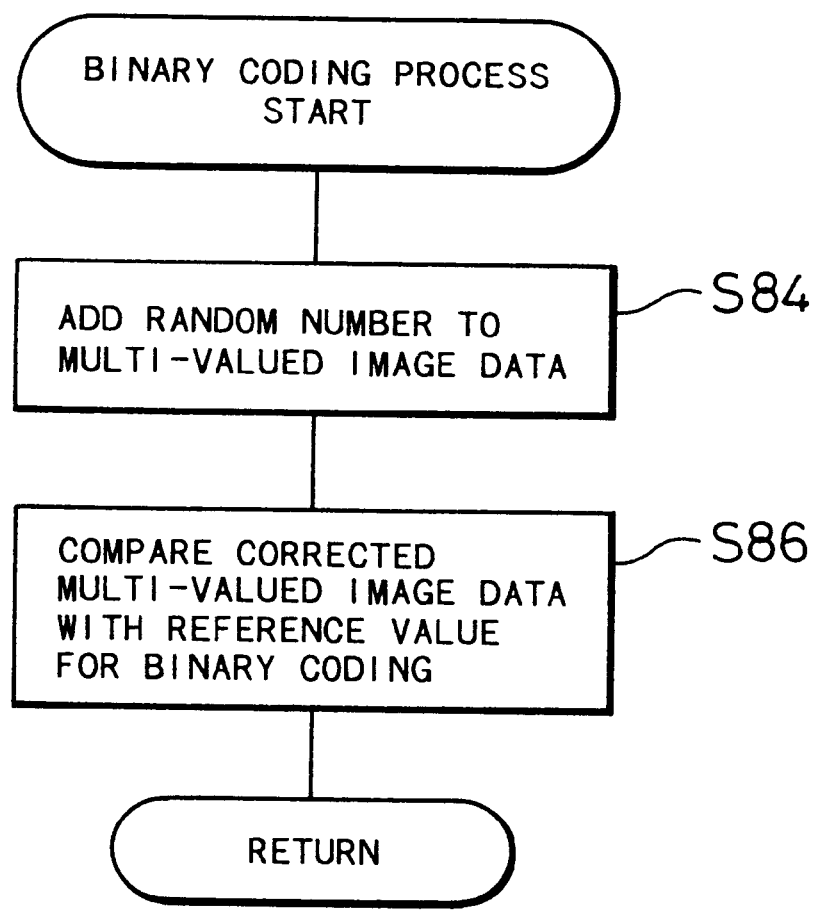
FIG. 44 is a flowchart showing details of the binary coding process executed at step S76 in the flowchart of FIG. 43.

FIG. 43 is a flowchart showing an image data binary coding routine executed by the image data binary device of FIG. 42, and FIG. 44 is a flowchart showing details of the binary coding process executed at step S76 in the flowchart of FIG. 43.

The following describes the image data binary device of the fifth embodiment based on the drawings of FIGS. 42, 43, and 44.

In case that P is the pixel of interest in the embodiment of FIG. 42, the adder 22 receives multi-valued image data regarding the pixel of interest P. The multi-valued image data is, for example, 8-bit data and may take any value of 0 to 255 as the tone value. The multi-valued image data is also given to the random number converting circuit 40.

The error data $\Sigma e_P$ distributed from the peripheral pixels and accumulated for the pixel of interest P is read from the error memory 20 and inputted into the adder 22. After the error data $\Sigma e_P$ is read out, the value of the error data $\Sigma e_P$ accumulated in the error memory 20 is initialized to zero.

When the program enters the image data binary coding routine of FIG. 43, a correction process is first carried out at step S70. Namely the adder 22 adds the error data to the input multi-valued image data regarding the pixel of interest P, so as to correct the multi-valued image data for the pixel of interest P.

In a random number generating process executed at step S72, the random number generator 38 generates a random number of 0 to 128 and outputs the random number to the random number converting circuit 40. In a random number converting process executed at subsequent step S74, the random number converting circuit 40 converts the input random number according to the separately input value of the multi-valued image data regarding the pixel of interest P and outputs the converted random number. The conversion is implemented to allow a dynamic range of the output random number (that is, a possible range of the random number) to be varied according to the value of the multi-valued image data.

When R and S respectively denote the input random number and the value of the multi-valued image data, a converted random number R' to be outputted is given by the following Equation (12):

$$R' = \frac{\text{MIN}(S, 225-S)}{128} \cdot R \qquad (12)$$

wherein MIN represents a function of selecting the minimum among two values parted by a comma in parentheses.

Conversion of the random number R by Equation (12) varies the dynamic range of the converted random number R' according to the value of the multi-valued image data as discussed below.

Figure 45:
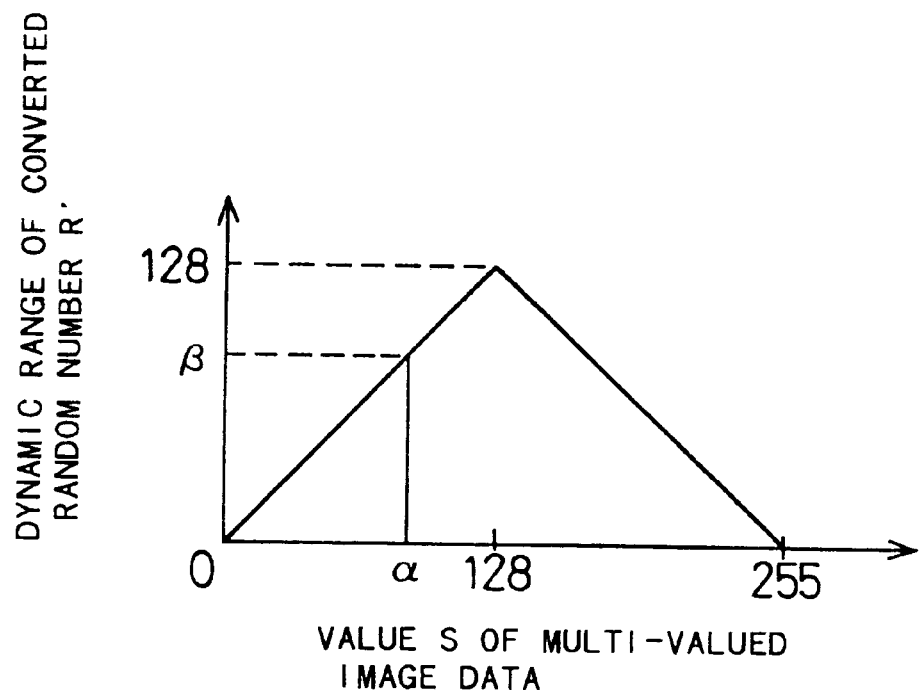
FIG. 45 is a characteristic chart showing a variation in dynamic range of the converted random number R' when the conversion is carried out by Equation (12)

FIG. 45 is a characteristic chart showing a variation in dynamic range of the converted random number R' when the conversion is carried out by Equation (12). In the graph of FIG. 45, the value S of the multi-valued image data is plotted as abscissa and the dynamic range of the converted random number R' as ordinate. The dynamic range of the converted random number R' is varied in a shape of a triangular pulse between 0 and 128 according to the value S of the multi-valued image data. As the value S of the multi-valued image data becomes closer to either the minimum value '0' or the maximum value '255', the converted random number R' has a narrower dynamic range. As the value S of the multi-valued image data becomes closer to the intermediate value '128', the converted random number R' has a wider dynamic range. By way of example, in case that the value S of the input multi-valued image data is 'α' as shown in FIG. 45, the dynamic range of the converted random number R' is from 0 to β (a range shown by the vertical solid line). Namely any one value in the range of 0 to β corresponding to the input random number R is outputted as the converted random number R'.

The random number converting circuit 40 can be readily constructed with a look-up table. More concretely, the random number converting circuit 40 includes a memory that receives the random number R and the value S of the multi-valued image data as address inputs and stores the corresponding random numbers R' at the respective addresses.

The program then executes a binary coding process at step S76 based on the converted random number and the corrected multi-valued image data outputted from the adder 22. In accordance with a concrete procedure, as shown in the flowchart of FIG. 44, the second adder 42 adds the converted random number R' outputted from the random number converting circuit 40 to the value of the corrected multi-valued image data outputted from the adder 22 at step S84.

At subsequent step S86, the comparator 24 receives the corrected multi-valued image data including the converted random number added thereto and outputted from the second adder 42, compares the corrected multi-valued image data with a separately input reference value, and outputs one-bit data or binary image data based on the results of comparison. The value '128' that is an intermediate value between the value '0' and the value '255' is used as the reference value. The comparator 24 outputs the value '1' when the value of the corrected multi-valued image data outputted from the second adder 42 is equal to or greater than the reference value '128'. The comparator outputs the value '0', on the other hand, when the value of the corrected multi-valued image data is smaller than the reference value '128'. This process binary codes the corrected multi-valued image data including the converted random number added thereto and outputted from the second adder 42.

The bit converter 28 converts the one-bit binary image data outputted from the comparator 24 to 8-bit binary image data. When the value of the image data outputted from the comparator 24 is equal to '0', the bit converter 28 outputs data of the value '0' as the 8-bit image data. When the value of the image data outputted from the comparator 24 is equal to '1', on the contrary, the bit converter 28 outputs data of the value '255' as the 8-bit image data.

Referring back to the flowchart of FIG. 43, in an error calculation process executed at step S78, the subtracter 26 receives the corrected multi-valued image data (image data before the binary coding) outputted from the adder 22 and the image data (image data after the binary coding) outputted from the bit converter 28, and subtracts the image data after the binary coding from the image data before the binary coding in order to obtain the difference as the error 'e'.

In an error distribution process executed at subsequent step S80, the error distribution circuit 30 distributes the error 'e' obtained by the subtracter 26 into the pixels A, B, C, and D, which are located in the vicinity of the pixel of interest P and have not yet undergone the binary coding, as discussed in FIG. 58. An error accumulation process executed at step S82 then accumulates the distributed errors into the error memory 20 as error data for each pixel. In accordance with a concrete procedure, the error distribution circuit 30 multiplies the error 'e' by predetermined coefficients corresponding to the pixels A, B, C, and D, for example, those shown in Equations (3) given above, and adds the results of operations $e_A$, $e_B$, $e_C$, and $e_D$, to error data $\Sigma e_A$, $\Sigma e_B$, $\Sigma e_C$, and $\Sigma e_D$, for the pixels A, B, C, and D accumulated in the error memory 20, so as to update the values of the respective error data $\Sigma e_A$, $\Sigma e_B$, $\Sigma e_C$, and $\Sigma e_D$.

After the series of processes are concluded for the pixel of interest P, the target of the binary coding shifts from the pixel P to the next pixel A and the same processes are repeated for the next pixel of interest A.

Although the random number converting circuit 40 converts the random number R according to Equation (12) in the above embodiment, the conversion may be carried out according to the following Equation (13):

$$R' = \left\{ \sin\left(\frac{2\pi \cdot S}{255} - \frac{\pi}{2}\right) + 1 \right\} \cdot \frac{R}{2} \quad (13)$$

Like Equation (12), R, S, and R' in Equation (13) respectively denote the input random number, the value of the multi-valued image data, and the converted random number to be outputted.

Figure 46:
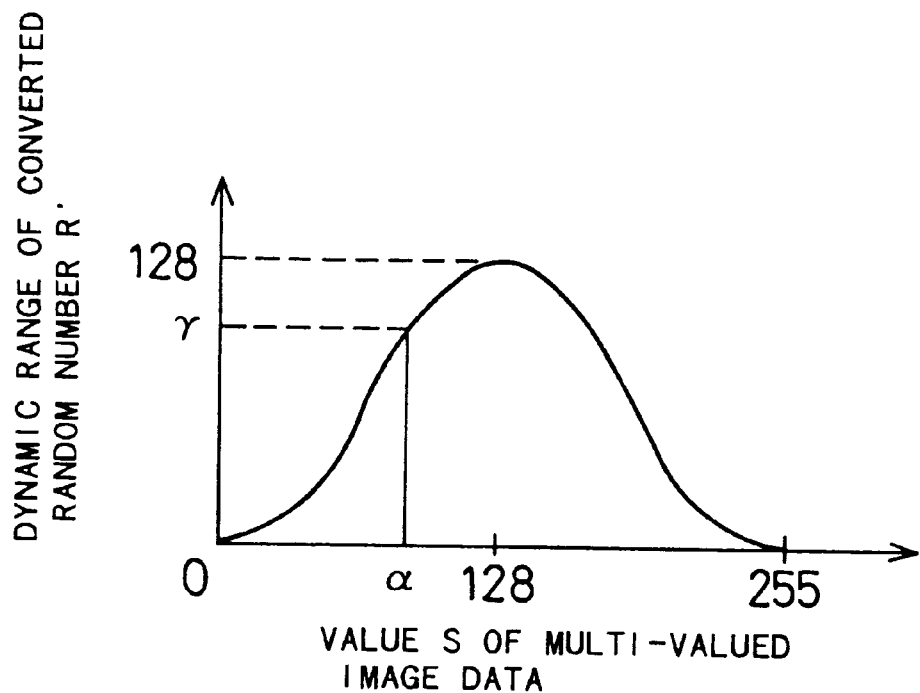
FIG. 46 is a characteristic chart showing a variation in dynamic range of the converted random number R' when the conversion is carried out by Equation (13)

Conversion of the random number R by Equation (13) varies the dynamic range of the converted random number R' according to the value of the multi-valued image data as shown in FIG. 46.

FIG. 46 is a characteristic chart showing a variation in dynamic range of the converted random number R' when the conversion is carried out by Equation (13). Like FIG. 45, in the graph of FIG. 46, the value S of the multi-valued image data is plotted as abscissa and the dynamic range of the converted random number R' as ordinate. The dynamic range of the converted random number R' is varied in a shape of a sine wave pulse between 0 and 128 according to the value S of the multi-valued image data. In the same manner as FIG. 45, as the value S of the multi-valued image data becomes closer to either the minimum value '0' or the maximum value '255', the converted random number R' has a narrower dynamic range. As the value S of the multi-valued image data becomes closer to the intermediate value '128', the converted random number R' has a wider dynamic range. By way of example, in case that the value S of the input multi-valued image data is 'α' as shown in FIG. 46, any one value in the range of 0 to γ corresponding to the input random number R is outputted as the converted random number R'.

As discussed above, the structure of the fifth embodiment adds the converted random number R' to the value of the multi-valued image data in the second adder 42, thereby destroying the regularity. Even when the input multi-valued image data has an intermediate tone value, this structure effectively prevents textures from occurring in an image obtained as the binary-coded image data.

Figure 47:
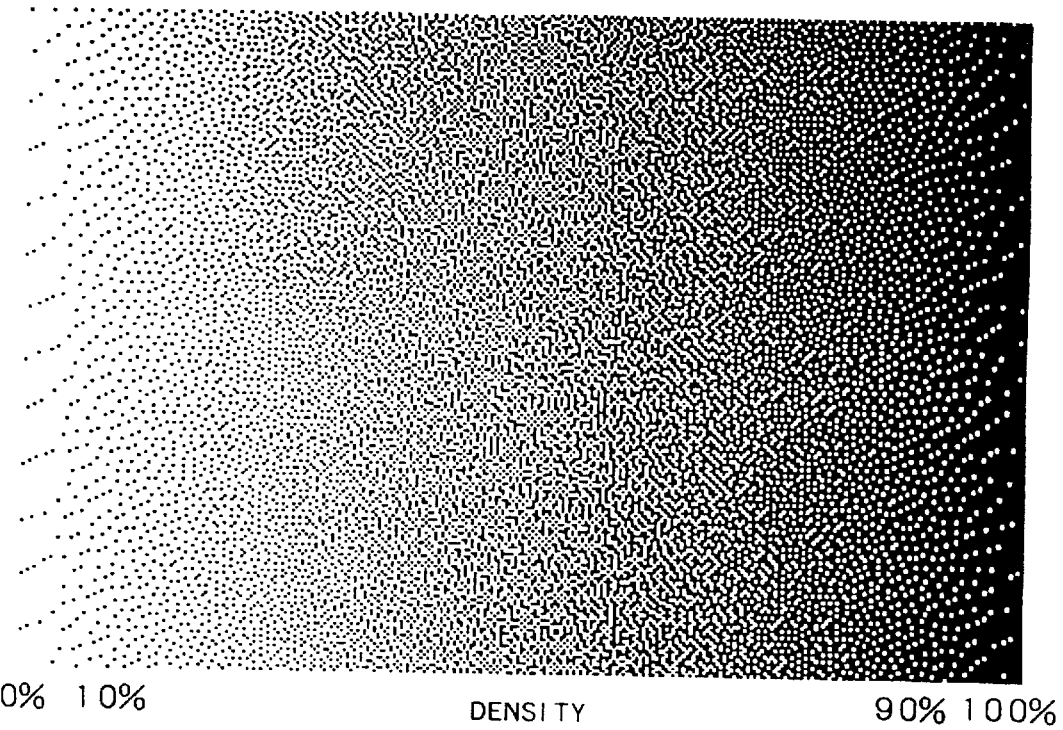
FIG. 47 shows the printing result with a printer for the whole density range of 0% to 100% when the random number R is converted according to Equation (12) in the structure of FIG. 42.
Figure 48:
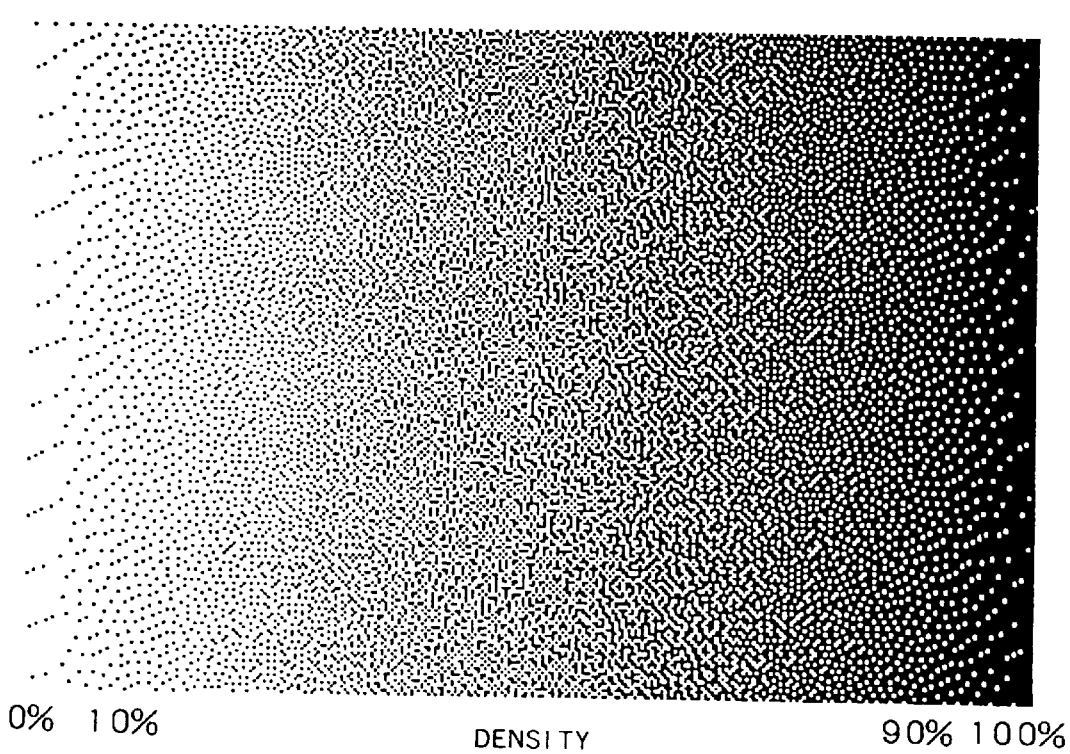
FIG. 48 shows the printing result with a printer for the whole density range of 0% to 100% when the random number R is converted according to Equation (13) in the structure of FIG. 42.

FIGS. 47 and 48 show the printing results with a printer for the whole density range of 0% to 100% when the image data binary device of FIG. 42 is applied. In the drawings of FIGS. 47 and 48, the density continuously varies from the left to the right in the range of 0% to 100% along the width of the image. FIG. 47 shows the printing result when the random number R is converted according to Equation (12), whereas FIG. 48 shows the same when the random number R is converted according to Equation (13).

Figure 67:
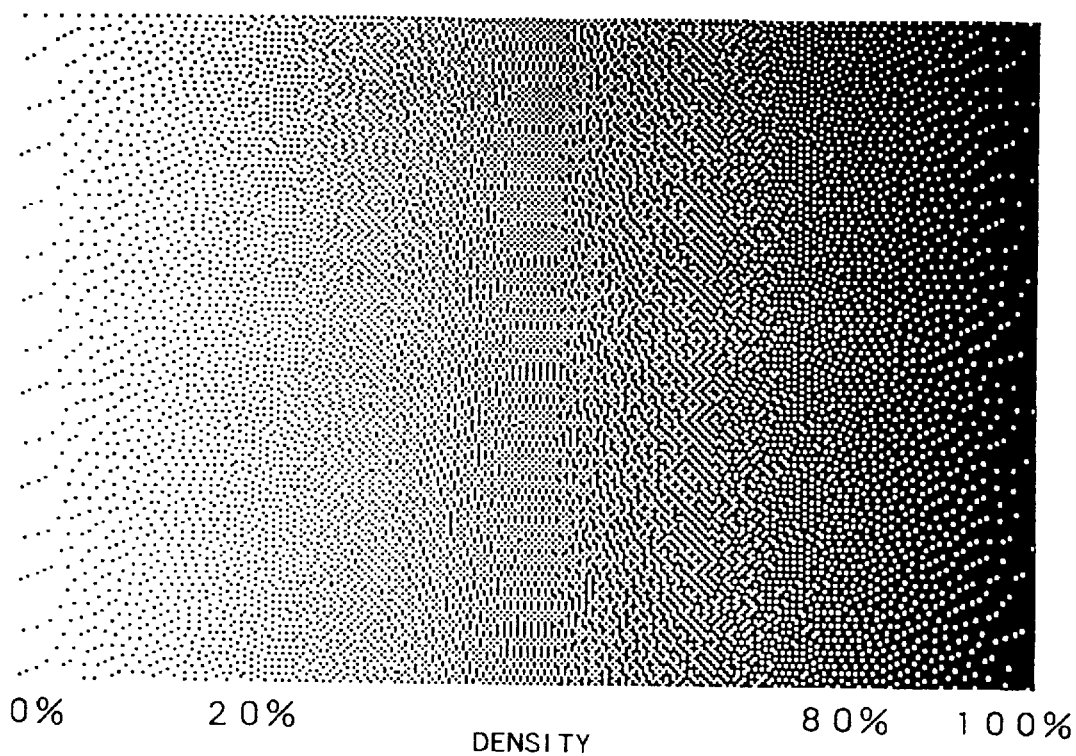
FIG. 67 shows the printing result with a printer for the whole density range of 0% to 100% when the conventional image data binary device is applied.

As shown in FIGS. 47 and 48, the printing results of the fifth embodiment with the image data binary device of FIG. 42 have substantially no textures in the intermediate-density area, which are observed in the printing result of FIG. 67 by the conventional method.

In the fifth embodiment, the random number R generated by the random number generator 38 is converted according to the value S of the multi-valued image data by either Equation (12) or Equation (13). The converted random number R' has a narrower dynamic range as the value S of the multi-valued image data (that is, the tone value) becomes closer to the minimum value '0' or the maximum value '255' as shown in FIGS. 45 and 46. Namely the effect of depressing the occurrence of textures is little on the multi-valued image data having a relatively low tone value or a relatively high tone value wherein no significant textures are originally observed. Even when the input multi-valued image data has a relatively low tone value, this structure preferably maintains the quality of picture.

Figure 49:
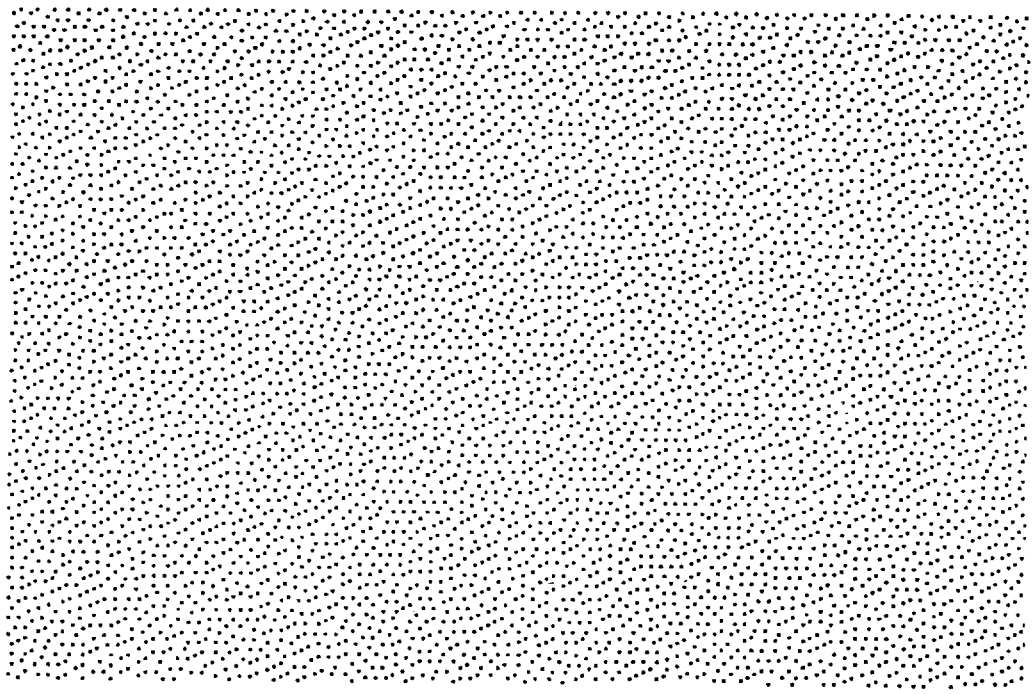
FIG. 49 shows the printing result with a printer for the density of 10% when the random number R is converted according to Equation (12) in the structure of FIG. 42.
Figure 50:
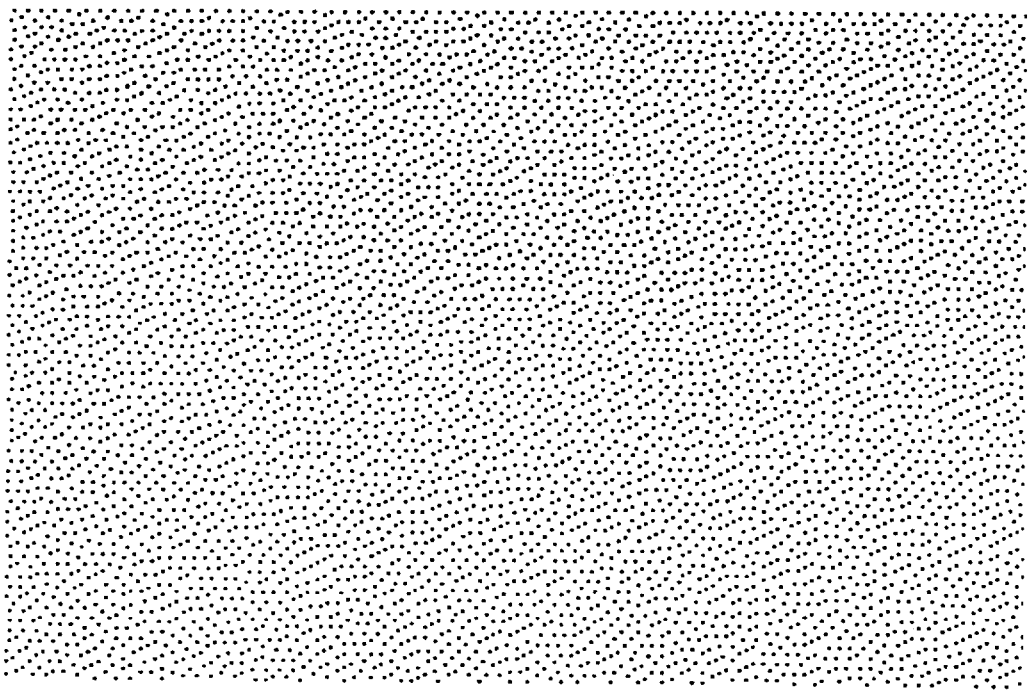
FIG. 50 shows the printing result with a printer for the density of 10% when the random number R is converted according to Equation (13) in the structure of FIG. 42.

FIGS. 49 and 50 show the printing results with a printer for the density of 10% when the image data binary device of FIG. 42 is applied. In both the drawings of FIGS. 49 and 50, the whole image has a homogeneous density. FIG. 49 shows the printing result when the random number R is converted according to Equation (12), whereas FIG. 50 shows the same when the random number R is converted according to Equation (13).

In a relatively low-density area, black dots are dispersed in a substantially homogeneous manner and the resulting image does not have any significant perturbation due to the removal of textures as shown in FIGS. 49 and 50. Although the printing result is not specifically shown for a relatively high-density area, white dots are dispersed in a substantially homogeneously manner and the resulting image does not have any significant turbulence due to the removal of textures. Namely the quality of picture is maintained both in the relatively low-density area and in the relatively high-density area.

Figure 51:
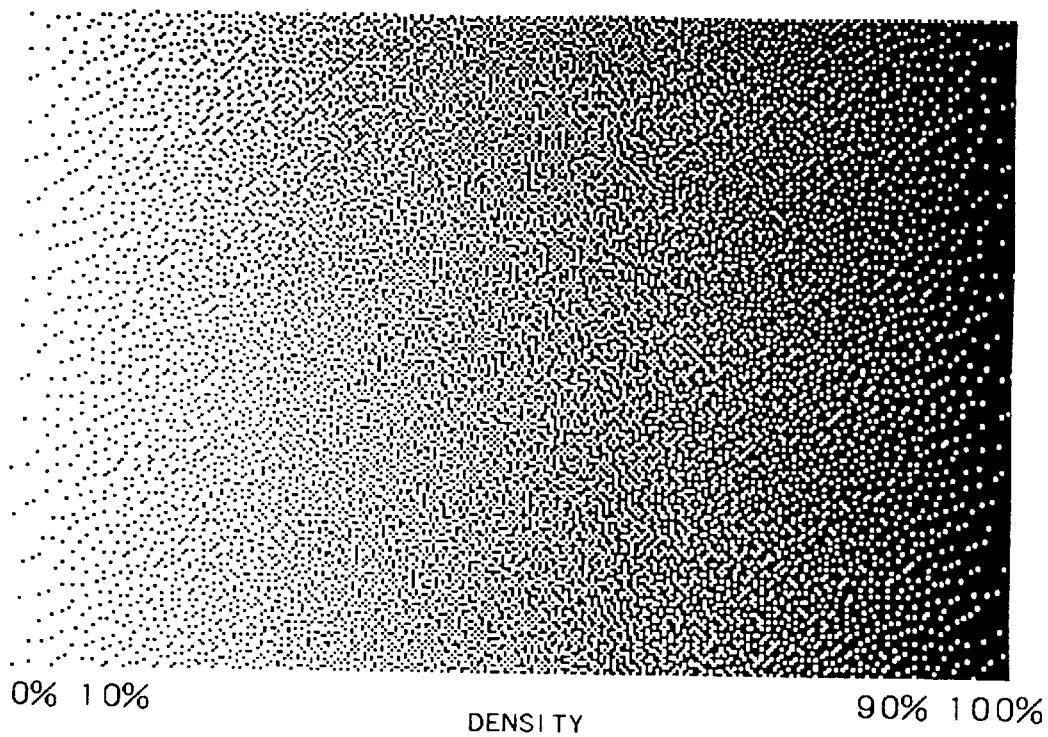
FIG. 51 shows the printing result with a printer for the whole density range of 0% to 100% under the condition of a fixed dynamic range of the random value.
Figure 52:
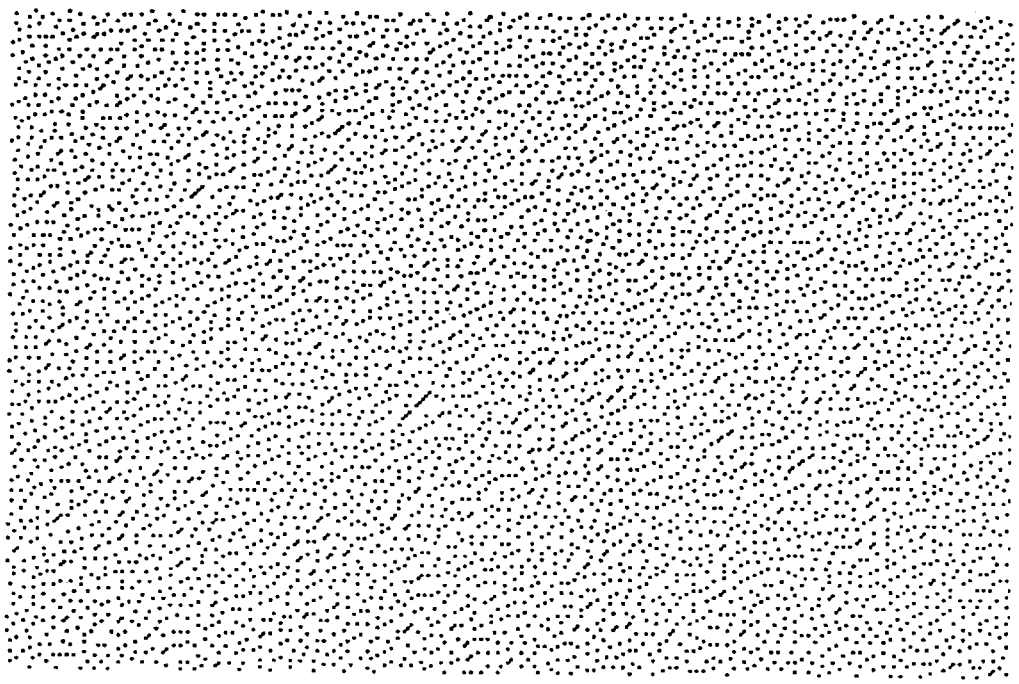
FIG. 52 shows the printing result with a printer for the density of 10% under the condition of a fixed dynamic range of the random value.

In order to clarify the effect of the fifth embodiment, the following describes the result when the random number R, which is generated by the random number generator 38 in the structure of FIG. 42 but is not converted, is added to the value S of the multi-valued image data while the dynamic range of the random number is fixed irrespective of the value S of the multi-valued image data. FIG. 51 shows the printing result with a printer for the whole density range of 0% to 100% under the condition of a fixed dynamic range of the random value. In the drawing of FIG. 51, the density continuously varies from the left to the right in the range of 0% to 100% along the width of the image. FIG. 52 shows the printing result specifically selected for the density of 10% among the whole density range shown in FIG. 51. In the drawing of FIG. 52, the whole image has a homogeneous density.

As shown in FIGS. 51 and 52, the resulting image by the reference structure has a significant turbulence due to the removal of textures both in the relatively low-density area and in the relatively high-density area. In this case, the values of corrected multi-valued image X''' can be readily obtained.

This clearly shows that the quality of picture is deteriorated both in the relatively low-density area and in the relatively high-density area when the dynamic range of the random number is not varied according to the value of the multi-valued image data like FIG. 45 or FIG. 46 of this embodiment but is fixed.

In the fifth embodiment discussed above, the converted random number R' is added to the value of the corrected multi-valued image data, which is given to one input of the comparator 24. In accordance with another possible structure, the converted random number R' may be added to a fixed value instead of the value of the multi-valued image data, and the sum is given as a reference value to the other input of the comparator 24. This alternative structure is described below as a sixth embodiment.

Figure 53:
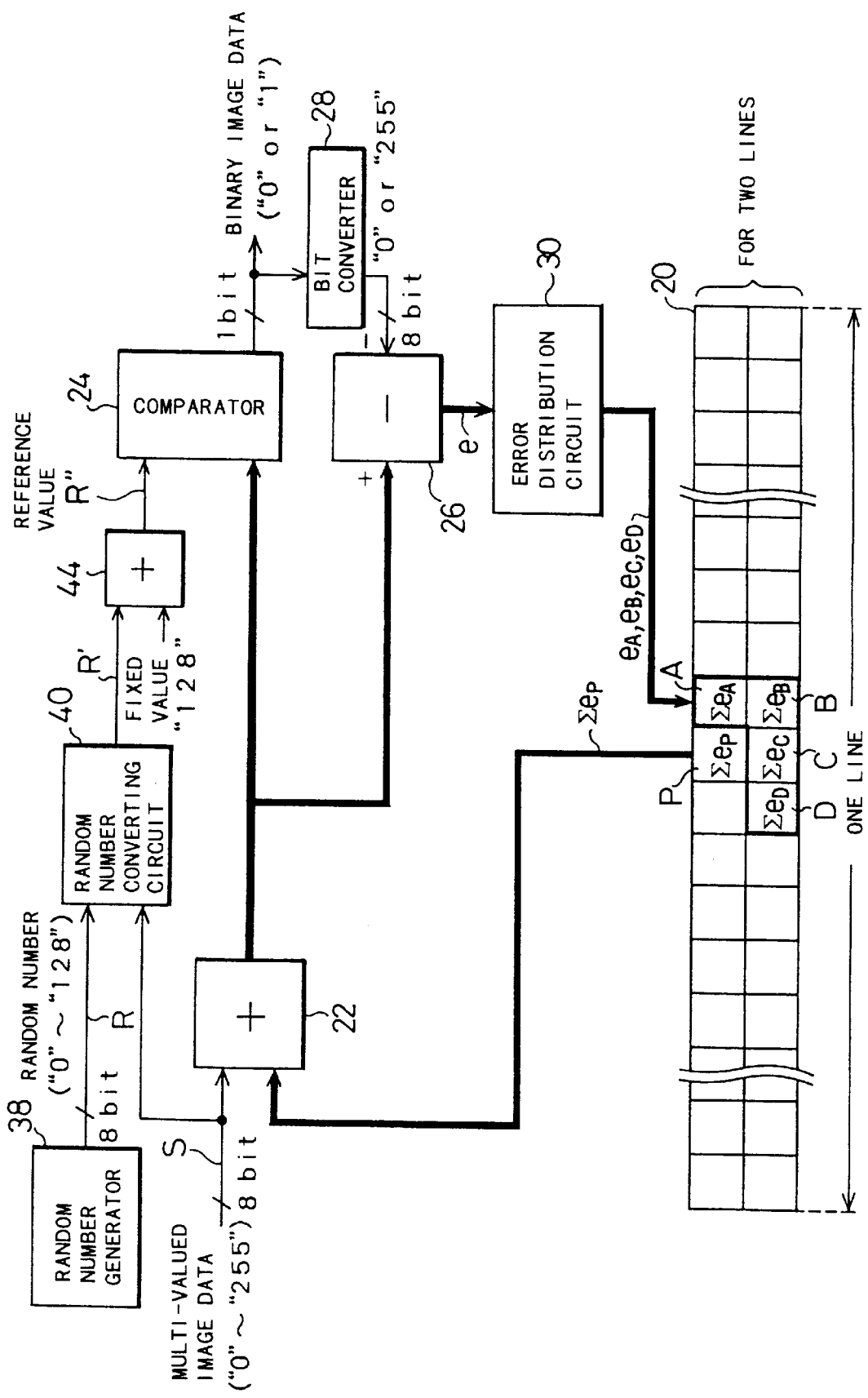
FIG. 53 is a block diagram illustrating an image data binary device as a sixth embodiment according to the present invention.

FIG. 53 is a block diagram illustrating an image data binary device as a sixth embodiment according to the present invention. Referring to FIG. 53, the image data binary device of the sixth embodiment includes an error memory 20, an adder 22, a comparator 24, a subtracter 26, a bit converter 28, an error distribution circuit 30, a random number generator 38, a random number converting circuit 40, and a second adder 44.

Figure 54:
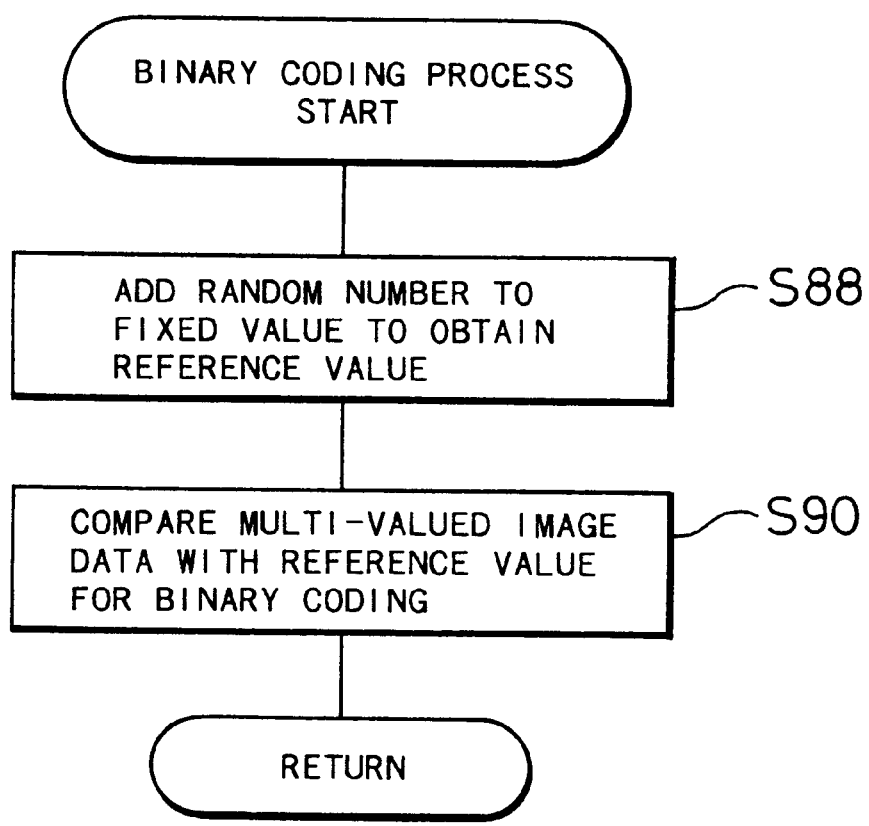
FIG. 54 is a flowchart showing another binary coding process which may be executed at step S76 in the flowchart of FIG. 43.

An image data binary coding process executed by the image data binary device shown in FIG. 53 is similar to the routine shown in the flowchart of FIG. 43, except the binary coding process executed at step S76. FIG. 54 is a flowchart showing another binary coding process which may be executed at step S76 in the flowchart of FIG. 43.

The following describes the image data binary device of the sixth embodiment based on the drawings of FIGS. 53 and 54. The image data binary device of the sixth embodiment shown in FIG. 53 has a similar structure to that of the image data binary device of the fifth embodiment shown in FIG. 42, and the same constituents are not specifically mentioned here.

In a binary coding process executed in the sixth embodiment, the second adder 44 adds the random number R' converted by and outputted from the random number converting circuit 40 to a fixed value and outputs a sum R''' as a reference value to the comparator 24 at step S88. The value '128' that is the reference value used in the fifth embodiment is applied for the fixed value.

The comparator 24 receives the corrected multi-valued image data outputted from the adder 22, compares the corrected multi-valued image data with the reference value, and outputs a one-bit data or binary image data based on the results of comparison at step S90.

The structure of the sixth embodiment adds the converted random value R' not to the multi-valued image data inputted into the comparator 24 but to the reference value inputted into the comparator 24. Like the fifth embodiment, this sixth embodiment can destroy the regularity. Even when the input multi-valued image data has an intermediate tone value, this structure effectively prevents textures from occurring in an image obtained as the binary-coded image data.

In the sixth embodiment, the effect of depressing the occurrence of textures is little on the multi-valued image data having a relatively low tone value or a relatively high tone value wherein no significant textures are originally observed. Like the fifth embodiment, this structure preferably maintains the quality of picture.

Although the random number converting circuit 40 and the second adder 44 are arranged as separate circuits in the sixth embodiment, the second adder 44 may be omitted. In the latter case, the addition of the random number R' to the fixed value '128' should be included in the conversion process of the random value in the random number converting circuit 40. Namely the random number R is converted to a random number R''' according to the following Equation (14) or Equation (15) in the random number converting circuit 40:

$$R'' = \frac{\text{MIN}(S, 255-S)}{128} \cdot R + 128 = R' + 128 \quad (14)$$

$$R'' = \left\{ \sin\left(\frac{2\pi \cdot S}{255} - \frac{\pi}{2}\right) + 1 \right\} \cdot \frac{R}{2} + 128 = R' + 128 \quad (15)$$

In the sixth embodiment discussed above, the converted random number R' is added to a fixed value and the sum is given as a reference value to the comparator 24. In accordance with still another possible structure, the converted random number R' may be added to the value S of the multi-valued image data in place of the fixed value, and the sum is given as a reference value to the comparator 24. This alternative structure is described below as a seventh embodiment.

Figure 55:
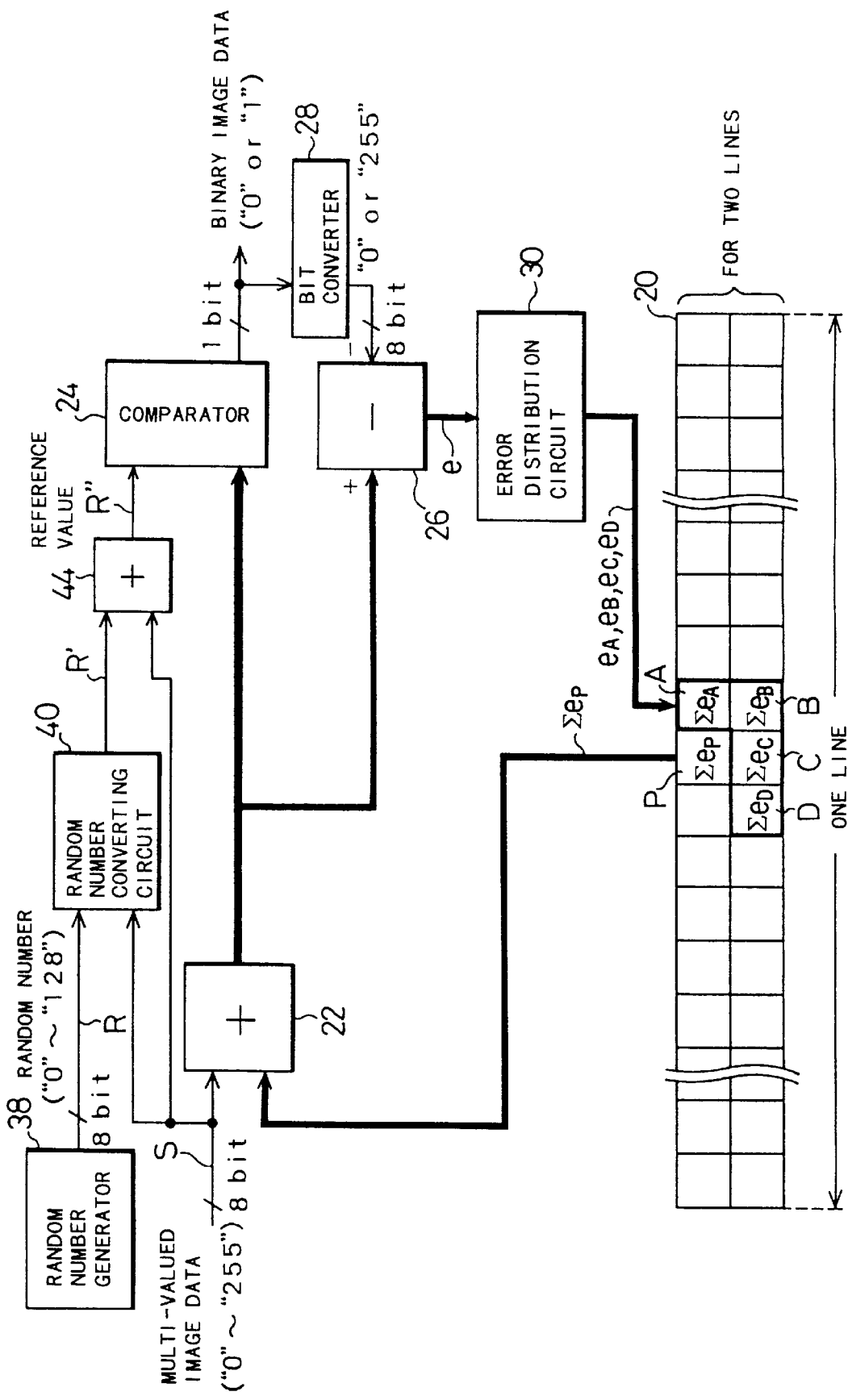
FIG. 55 is a block diagram illustrating an image data binary device as a seventh embodiment according to the present invention.

FIG. 55 is a block diagram illustrating an image data binary device as a seventh embodiment according to the present invention. Referring to FIG. 55, the image data binary device of the seventh embodiment includes an error memory 20, an adder 22, a comparator 24, a subtracter 26, a bit converter 28, an error distribution circuit 30, a random number generator 38, a random number converting circuit 40, and a second adder 44.

Figure 56:
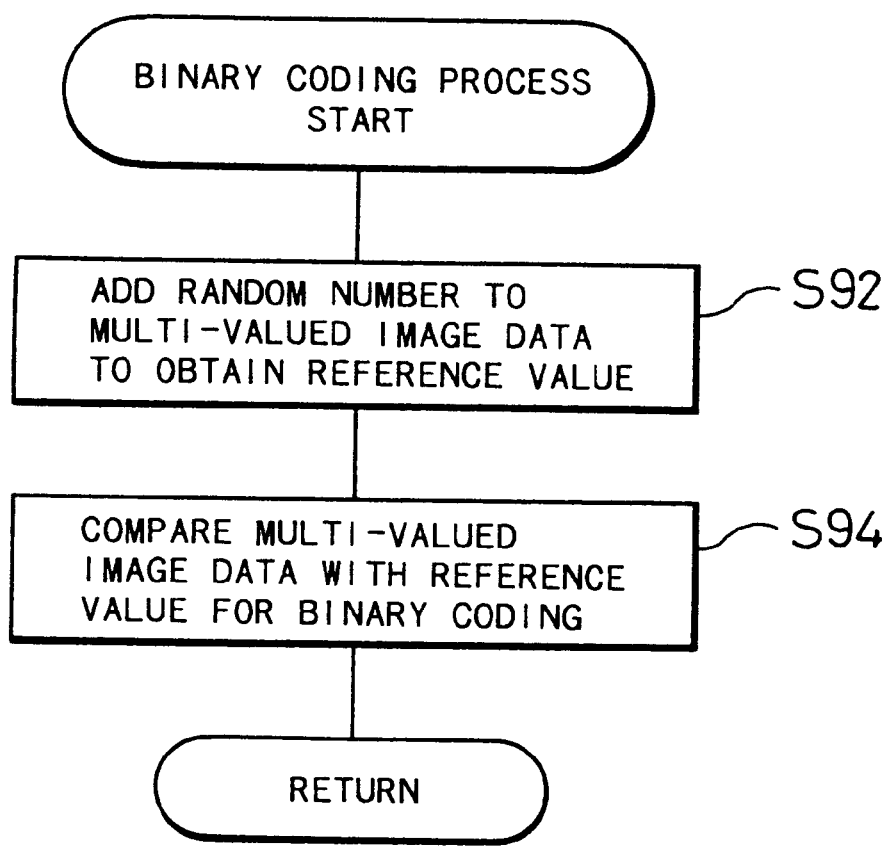
FIG. 56 is a flowchart showing still another binary coding process which may be executed at step S76 in the flowchart of FIG. 43.

An image data binary coding process executed by the image data binary device shown in FIG. 55 is similar to the routine shown in the flowchart of FIG. 43, except the binary coding process executed at step S76. FIG. 56 is a flowchart showing still another binary coding process which may be executed at step S76 in the flowchart of FIG. 43.

The following describes the image data binary device of the seventh embodiment based on the drawings of FIGS. 55 and 56. The image data binary device of the seventh embodiment shown in FIG. 55 has a similar structure to that of the image data binary device of the fifth embodiment shown in FIG. 42, and the same constituents are not specifically mentioned here.

In a binary coding process executed in the seventh embodiment, the second adder 44 adds the random number R' converted by and outputted from the random number converting circuit 40 not to a fixed value but to the value S of the input multi-valued image data, and outputs a sum R''' as a reference value to the comparator 24 at step S92.

The comparator 24 receives the corrected multi-valued image data outputted from the adder 22, compares the corrected multi-valued image data with the reference value, and outputs a one-bit data or binary image data based on the results of comparison at step S94.

The structure of the seventh embodiment adds the converted random value R' to the value S of the multi-valued image data that is the reference value. Like the sixth embodiment, this seventh embodiment can destroy the regularity. Even when the input multi-valued image data has an intermediate tone value, this structure effectively prevents textures from occurring in an image obtained as the binary-coded image data.

In the seventh embodiment, the effect of depressing the occurrence of textures is little on the multi-valued image data having a relatively low tone value or a relatively high tone value wherein no significant textures are originally observed. Like the fifth embodiment, this structure preferably maintains the quality of picture.

Although the random number converting circuit 40 and the second adder 44 are arranged as separate circuits in the seventh embodiment, the second adder 44 may be omitted. In the latter case, the addition of the random number R' to the value S of the multi-valued image data should be included in the conversion process of the random value in the random number converting circuit 40. Namely the random number R is converted to a random number R''' according to the following Equation (16) or Equation (17) in the random number converting circuit 40:

$$R''' = \frac{\text{MIN}(S, 255-S)}{128} \cdot R + S = R' + S \quad (16)$$

$$R''' = \left\{\sin\left(\frac{2\pi \cdot S}{255} - \frac{\pi}{2}\right) + 1\right\} \cdot \frac{R}{2} + S = R' + S \quad (17)$$

The present invention is not restricted to the above embodiments, but there may be many modifications, changes, and alterations without departing from the scope or spirit of the main characteristics of the present invention.

It should be clearly understood that the above embodiments are only illustrative and not restrictive in any sense.

The scope and spirit of the present invention are limited only by the terms of the appended claims.

What is claimed is:

1. A method of binary coding multi-valued image data for each pixel, said method comprising the steps of:

(a) adding first error data accumulated for a target pixel of binary coding and at least part of second error data accumulated for a specific pixel which is located in the vicinity of said target pixel and which is to be processed by binary coding after said target pixel, so as to correct the multi-valued image data;

(b) comparing the corrected multi-valued image data with a predetermined reference value and binary coding the corrected multi-valued image data based on a result of the comparison;

(c) obtaining an error that is difference between the corrected multi-valued image data and the binary-coded image data for said target pixel;

(d) distributing the error obtained for said target pixel into pixels which are to be processed by binary coding after said target pixel;

(e) accumulating the distributed errors as error data for each pixel; and (f) repeating said steps (a) through (e) while updating said target pixel.

2. A method in accordance with claim 1, wherein said step (a) comprises the step of updating said first error data and said second error data according to a specified rule.

3. A method in accordance with claim 1, wherein said step (a) comprises the steps of:

(a-1) multiplying said second error data by a coefficient K ($0 \leq K \leq 1$) determined depending upon the multi-valued image data for said target pixel to obtain a product data; and (a-2) adding said first error data and said product data to the multi-valued image data for said target pixel to correct the multi-valued image data.

4. An apparatus for binary coding multi-valued image data for each pixel, said apparatus comprising: correction means for adding first error data accumulated for a target pixel of binary coding and at least part of second error data accumulated for a specific pixel which is located in the vicinity of said target pixel and which is to be processed by binary coding after said target pixel, so as to correct the multi-valued image data; updating means for updating said first error data and said second error data according to a specified rule; binary coding means for comparing the corrected multi-valued image data with a predetermined reference value and binary coding the corrected multi-valued image data based on a result of the comparison; error calculation means for obtaining an error that is difference between the corrected multi-valued image data and the binary-coded image data for said target pixel; error distribution means for distributing the error obtained for said target pixel into pixels which are to be processed by binary coding after said target pixel; and error accumulation means for accumulating the distributed errors as error data for each pixel.

* * * * *